Aug. 9, 1966

C. L. CHUMLEY 3,265,205

PAPER CURRENCY DETECTOR HAVING MAGNETIC AND OPTICAL SENSING MEANS

Filed Sept. 5, 1963

21 Sheets-Sheet 1

Aug. 9, 1966 C. L. CHUMLEY 3,265,205

PAPER CURRENCY DETECTOR HAVING MAGNETIC AND OPTICAL SENSING MEANS

Filed Sept. 5, 1963 21 Sheets-Sheet 5

Aug. 9, 1966 C. L. CHUMLEY 3,265,205

PAPER CURRENCY DETECTOR HAVING MAGNETIC AND OPTICAL SENSING MEANS

Filed Sept. 5, 1963 21 Sheets-Sheet 6

Aug. 9, 1966

C. L. CHUMLEY 3,265,205

PAPER CURRENCY DETECTOR HAVING MAGNETIC AND OPTICAL SENSING MEANS

Filed Sept. 5, 1963

21 Sheets-Sheet 8

Aug. 9, 1966

C. L. CHUMLEY 3,265,205

PAPER CURRENCY DETECTOR HAVING MAGNETIC AND OPTICAL SENSING MEANS

Filed Sept. 5, 1963

21 Sheets-Sheet 9

Aug. 9, 1966

C. L. CHUMLEY 3,265,205

PAPER CURRENCY DETECTOR HAVING MAGNETIC AND OPTICAL SENSING MEANS

Filed Sept. 5, 1963

21 Sheets-Sheet 11

Aug. 9, 1966 C. L. CHUMLEY 3,265,205

PAPER CURRENCY DETECTOR HAVING MAGNETIC AND OPTICAL SENSING MEANS

Filed Sept. 5, 1963 21 Sheets-Sheet 15

Aug. 9, 1966 C. L. CHUMLEY 3,265,205

PAPER CURRENCY DETECTOR HAVING MAGNETIC AND OPTICAL SENSING MEANS

Filed Sept. 5, 1963 21 Sheets-Sheet 17

Aug. 9, 1966 C. L. CHUMLEY 3,265,205

PAPER CURRENCY DETECTOR HAVING MAGNETIC AND OPTICAL SENSING MEANS

Filed Sept. 5, 1963 21 Sheets-Sheet 19

Aug. 9, 1966

C. L. CHUMLEY 3,265,205

PAPER CURRENCY DETECTOR HAVING MAGNETIC AND OPTICAL SENSING MEANS

Filed Sept. 5, 1963

21 Sheets-Sheet 21

United States Patent Office 3,265,205
Patented August 9, 1966

3,265,205

PAPER CURRENCY DETECTOR HAVING MAGNETIC AND OPTICAL SENSING MEANS

Calvin L. Chumley, Glendale, Mo., assignor to National Rejectors, Inc., St. Louis, Mo., a corporation of Missouri Filed Sept. 5, 1963, Ser. No. 306,767
48 Claims. (Cl. 209—75)

Figure 1:
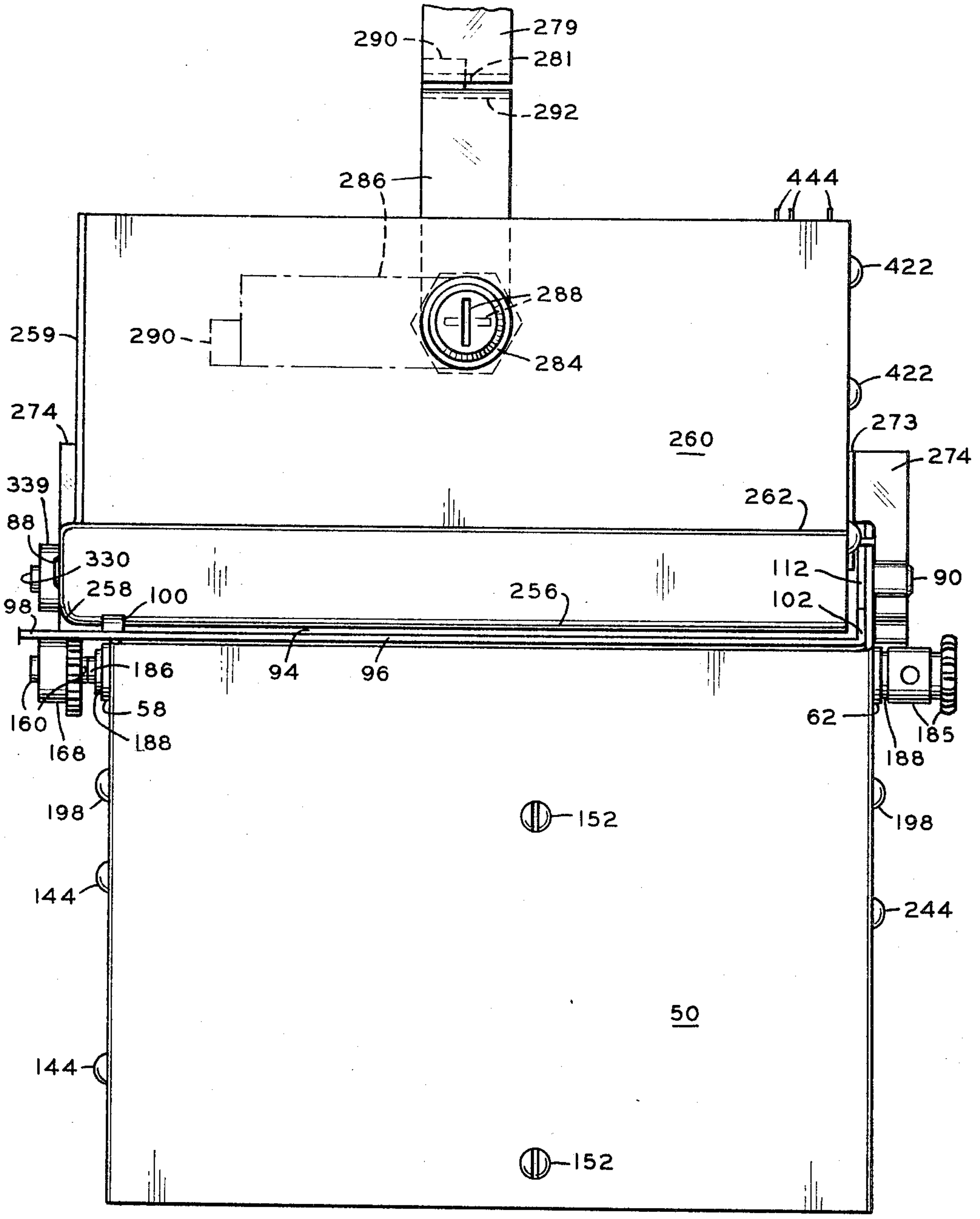

This invention relates to improvements in paper currency detectors. More particularly, this invention relates to improvements in paper currency detectors which can reject counterfeit paper currency.

It is, therefore, an object of the present invention to provide a paper currency detector which can reject counterfeit paper currency.

A number of currency detectors have been proposed, and some of those currency detectors have been built. Many of those currency detectors were incapable of rejecting counterfeit currency, and other of those currency detectors were large and bulky. It would be desirable to provide a currency detector which could reject counterfeit currency and which was small and compact. The present invention provides such a currency detector; and it does so by providing magnetic and optical sensing of each inserted bill, by sensing each inserted bill while that bill is at rest, and by having each patron move his bill part way into the area where that bill is to be sensed. It is, therefore, an object of the present invention to provide a currency detector which provides magnetic and optical sensing of each inserted bill, which senses each inserted bill while that bill is at rest, and which causes each patron to move his bill part way into the area where that bill is to be sensed.

The currency detector provided by the present invention uses an inertial member to control the magnetic sensing of each inserted bill. Specifically, the currency detector provided by the present invention mounts an inertial member so it can oscillate relative to an inserted bill, and it mounts a magnetic head on that inertial member. Prior to the time the inserted bill is to be sensed magnetically, the inertial member is moved to a position where it holds the magnetic head away from the inserted bill; but, when that bill is to be sensed magnetically, the inertial member moves from that position and moves the magnetic head into engagement with that bill. As the inertial member is moved to the said position, a biasing force of increasing magnitude acts upon that inertial member; and that biasing force urges that inertial member away from the said position and into a second position wherein the magnetic head is in engagement with the bill. When the inserted bill is to be sensed magnetically, the inertial element is released from the first said position; and it will respond to the bias thereon to move into the said second position. The inertial member has a large mass to volume ratio, and that mass to volume ratio enables that member to respond to the bias thereon to move the magnetic head toward the inserted bill at a predetermined rate. In using a biased inertial member, the present invention makes it unnecessary for the currency detector to use a synchronous motor; and that is desirable because synchronous motors are expensive and provide relatively low values of starting torque. Also in using a biased inertial member, the present invention frees the currency detector from variations in the speed of the magnetic sensing which could otherwise be caused by line voltage variations or by back lash in gear trains. It is, therefore, an object of the present invention to provide a currency detector wherein an inertial member carries a magnetic head, wherein that inertial member is moved against a biasing force to a position where it holds that magnetic head away from an inserted bill, and wherein the inertial member is subsequently released so it can respond to the bias thereon to move the magnetic head toward the bill at a predetermined rate of speed.

In moving to the first said position and in then moving to the said second position, the inertial member does not make a complete revolution. Instead, that inertial member moves through an angle of less than three hundred and sixty degrees to the first said position, and then moves back through that angle toward the inserted bill. This is desirable because it enables the magnetic head to be connected to the circuit therefor by flexible leads rather than by slip rings; and hence the electrical "noise" which slip rings produce can be obviated. It is, therefore, an object of the present invention to provide a currency detector with an inertial member that carries a magnetic head and that does not make a complete revolution.

The inertial member of the currency detector provided by the present invention is moved to the first said position and then released; and that position is spaced from the inserted bill a fixed distance. As a result, the inertial member will always have the same distance in which to reach the desired predetermined speed. This means that the magnetic sensing of inserted bills will be done in a uniform and predictable manner. It is, therefore, an object of the present invention to move the inertial member of a currency detector to a position which is a fixed distance from an inserted bill and then to release that inertial member.

By moving the inertial member of the currency detector to the first said position and then releasing it so it can move the magnetic head into engagement with the inserted bill, the present invention provides just one magnetic sensing of each inserted bill and avoids all risk of repetitive magnetic sensing of that bill. This is desirable because repetitive magnetic sensing of an inserted bill could lead to the dispensing of too much change or of too much product.

The currency detector of the present invention uses a motor-driven eccentric to move the inertial member to the first said position and then uses that eccentric to release that inertial member for movement away from that position. That eccentric is desirable because it enables the inertial member to be moved by a motor which has a low starting torque and a low running torque. It is, therefore, an object of the present invention to provide a currency detector wherein a motor-driven eccentric moves an inertial member to a first position and then releases that inertial member.

The inertial member of the currency detector provided by the present invention normally holds the magnetic head out of the path of an inserted bill, and thereby facilitates full and easy insertion of that bill. After the inertial member has moved the magnetic head into engagement with the inserted bill to magnetically sense that bill, that inertial member will move that magnetic head out of the path of that bill, and thereby facilitate full and free movement of that bill toward the cash box or back to the patron. It is, therefore, an object of the present invention to provide a currency detector with an inertial member that normally holds the magnetic head out of the path of an inserted bill and that subsequently moves that magnetic head into engagement with, and then out of engagement with, an inserted bill.

The inertial member for the currency detector provided by the present invention is a pendulum. Such an inertial member is desirable because it fits within a space that is only about a quadrant in angular extent. As a result, that inertial member makes possible a small and compact currency detector. It is, therefore, an object of the present invention to provide a currency detector wherein the inertial member is a pendulum.

Presently-available photographic equipment and presently-available photo-copying machines can produce facsimiles of paper currency which will be accepted by currency detectors that rely upon optical sensing. However, that equipment and those machines can not produce facsimiles of paper currency which will be accepted by the currency detector of the present invention; because that currency detector utilizes magnetic sensing as well as optical sensing. In addition, a photograph or a photo-copy of an authentic bill would not be accepted by the currency detector of the present invention even if a portion of an authentic bill were to be pasted or otherwise affixed to that portion of the photograph or photo-copy which was to be sensed magnetically; because that currency detector has a thickness detector which would prevent acceptance of such a photograph or photo-copy. Specifically, the currency detector provided by the present invention has a feeler which is mounted on and movable with the inertial member and which will engage any object, whether unitary or composite in nature, which is appreciably thicker than an authentic bill; and that feeler will respond to such engagement to retard the speed of that inertial member to such an extent that the magnetic head will not be able to supply an "accept" signal. That feeler will, however, move freely past an authentic bill; and hence that feeler will not keep the magnetic head from providing an "accept" signal when an authentic bill is inserted. As a result, the present invention is able to accept authentic bills while being able to reject any object, whether unitary or composite in nature, which is appreciably thicker than an authentic bill.

The currency detector provided by the present invention has rollers that are normally spaced apart to permit a patron to insert the leading edge of a bill between them; and the confronting faces of those rollers are subsequently caused to bear against and grip that bill so those rollers can move that bill into the area where it will be sensed. A bill-blocking member has fingers that are normally disposed in the path of the inserted bill, and those fingers are spaced from the confronting faces of the rollers distances which are slightly greater than the maximum widths of the bills which are to be accepted by the currency detector. Such spacing is desirable because it makes certain that each authentic inserted bill will have a chance to lie flat and not be bowed upwardly, in whole or in part. It is, therefore, an object of the present invention to provide a currency detector with rollers and with a bill-blocking member which has fingers that are normally disposed in the path of an inserted bill and which are spaced from the confronting faces of the rollers distances which are slightly greater than the maximum widths of the bills which are to be accepted by the currency detector.

The currency detector of the present invention has switches with actuators that must be raised by the leading edge of an inserted bill; and those actuators are formed so the leading edge of the bill will be guided downwardly toward the surface on which that bill is to rest while it is being sensed. The actuators for those switches are disposed inwardly of the confronting faces of the said rollers, and they will coact with those confronting faces to provide holding forces at laterally and longitudinally spaced areas on each inserted bill. Those holding forces will tend to hold the inserted bill, adjacent the surface on which that bill is to rest while it is being sensed, until the trailing edge of that bill moves inwardly of the confronting faces of the rollers; and thereafter those switch actuators will continue to urge that bill against that surface. Subsequently further rollers, which are disposed inwardly of the switch actuators, will have the confronting faces thereof moved into engagement with the bill to help the switch actuators urge the bill against the said surface while that bill is being sensed. In this way, the switch actuators will successively coact with the first said rollers and with the further rollers to apply holding forces to each inserted bill. It is, therefore, an object of the present invention to provide switches with actuators that are intermediate two sets of rollers and that successively coact with those sets of rollers to apply holding forces to each inserted bill.

The bill-blocking member of the currency detector of the present invention has further fingers which are spaced from the first said fingers of that member distances greater than the maximum widths of the bills to be accepted by that currency detector. Those further fingers are adjacent but are disposed inwardly of the slot through which bills are inserted into the currency detector; and those further fingers are normally out of the path of inserted bills. However, after an inserted bill has been accepted, the bill-blocking member will move the first said fingers thereof out of the path of the bill and will move the further fingers thereof into the path of that bill. The movement of the first said fingers out of the path of the bill will permit that bill to be moved to the cash box, and the movement of the further fingers into the path of that bill will keep a patron from pulling that bill back out of the currency detector. The two sets of fingers on the bill-blocking member are dimensioned so the first said fingers will fully block movement of an inserted bill to the cash box whenever the further fingers are out of the path of that bill, and so the further fingers will fully block withdrawal of that bill whenever the first said fingers free that bill for movement to the cash box. As a result, the bill-blocking member of the present invention will effectively limit the inward movement of an inserted bill until that bill has been accepted and will thereafter effectively block any attempted withdrawal of that bill. It is, therefore, an object of the present invention to provide a currency detector with a bill-blocking member that has fingers which selectively block and permit movement of an insertd bill to the cash box, that has further fingers which selectively permit and block withdrawal of an inserted bill from the currency detector, and that has the various fingers thereof dimensioned so a bill can not be withdrawn from the currency detector whenever the first said fingers free that bill for movement to the cash box.

The currency detector of the present invention has a switch adjacent the slot through which accepted bills pass to the cash box, and that switch has an actuator which will keep that switch from being actuated until a bill has been accepted and has been moved part way out through the said slot. Thereafter, that actuator will physically block any efforts of a patron to pull that bill back out of the currency detector. Yet, that actuator will permit rejected bills to be returned to the patrons. As a result, the switch and the actuator therefor will permit rejected bills to be returned to the patrons, will permit accepted bills to pass to the cash box, and will keep patrons from pulling accepted bills back out of the currency detector. It is, therefore, an object of the present invention to provide a switch, for a currency detector, with an actuator which will permit a rejected bill to be returned to the patron, which will not actuate that switch until a bill has been accepted and has been moved part way out of the currency detector, and which will subsequently physically block any efforts of a patron to pull that bill back out of the currency detector.

It is desirable, in a currency detector, for the slot through which bills are inserted to be quite shallow; because a shallow entry slot precludes the insertion of many undesirable objects which could be inserted into a deep entry slot. Yet, a shallow entry slot of standard design can resist the insertion of an authentic bill with a heavily wrinkled leading edge. It would be desirable to provide an entry slot, for a currency detector, which was narrow but which could readily accept all authentic bills—even bills with heavily wrinkled leading edges. The present invention provides such an entry slot; and it does so by forming that slot in two vertically-directed walls which subtend a dihedral angle that has a vertically-directed apex. The resulting corner slot has an apex which provides point, rather than line, contact between that slot and the leading edge of a bill during the insertion of that leading edge; and that point contact facilitates the acceptance of all bills—even bills with heavily wrinkled leading edges. It is, therefore, an object of the present invention to provide a currency detector with a corner entry slot.

The currency detector of the present invention has a lower section and an upper section; and that upper section can be moved toward and away from that lower section. The upper section has a platen which overlies and confronts a platen on the lower section; and when the upper section is moved toward the lower section, the two platens will be close to each other and will define the upper and lower limits of the area where inserted bills will be sensed. However, when the upper section is moved away from the lower section, the two platens will be spaced apart; and free access can then be had to the said area to facilitate the removal of objects from that area. Portions of the upper and lower sections of the currency detector will form part of the exterior of the change-making device or vending machine in which that currency detector is mounted; and a suitable latching arrangement will be provided to normally hold the platen of the upper section immediately adjacent the platen of the lower section. As a result, full access to the inserted area in which inserted bills are sensed will ordinarily be blocked; and that is desirable. However, the latching arrangement will permit authorized persons to move the upper section of the currency detector away from the lower section and thereby provide full access to the area in which inserted bills are sensed; and that latching arrangement will be actuated by a key which can be inserted into a lock that extends to the exterior of the change-making device or vending machine. This is desirable because it permits authorized persons to gain full access to the area in which inserted bills are sensed without having to open up the housing for the change-making device or vending machine. It is, therefore, an object of the present invention to provide a currency detector which has an upper section that can be moved toward and away from a lower section, which has portions of those sections forming part of the exterior of the change making device or vending machine in which that currency detector is mounted, and which has a latching mechanism that normally holds the upper section adjacent the lower section but which can be actuated by a key that is inserted into a lock that extends to the exterior of the change-making device or vending machine.

The lower section of the currency detector of the present invention has a bill-receiving platform on which the leading edge of a bill can be rested before that leading edge is inserted into the entry slot of that currency detector; and that bill-receiving platform is spaced below the level of the platen of that lower section by an offset. The platen of the upper section of the currency detector has a downwardly-directed offset which is adjacent the offset of the lower section; and those offsets coact to keep stiff objects from being moved into the area where inserted bills are tested. Also those offsets coact to force an inserted bill to bend and bow along an infinite number of lines, which are generally parallel to the long axis of that bill, as that bill is inserted into the currency detector; and that bowing and bending tends to smooth out any wrinkles which extend transversely of that long axis. That smoothing action is very desirable because it will minimize or eliminate wrinkles which are in, and extend transversely of, the path of the magnetic head. In addition, the offset of the lower section will keep liquids that might be spilled onto the bill-receiving platform from flowing to the area where inserted bills are sensed. It is, therefore, an object of the present invention to provide the lower section of a currency detector with an offset that disposes the bill-receiving platform of that section below the level of the platen of that section, and to provide the upper platen of that currency detector with a downwardly-directed offset which is adjacent the offset of the lower section.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

Figure 2:
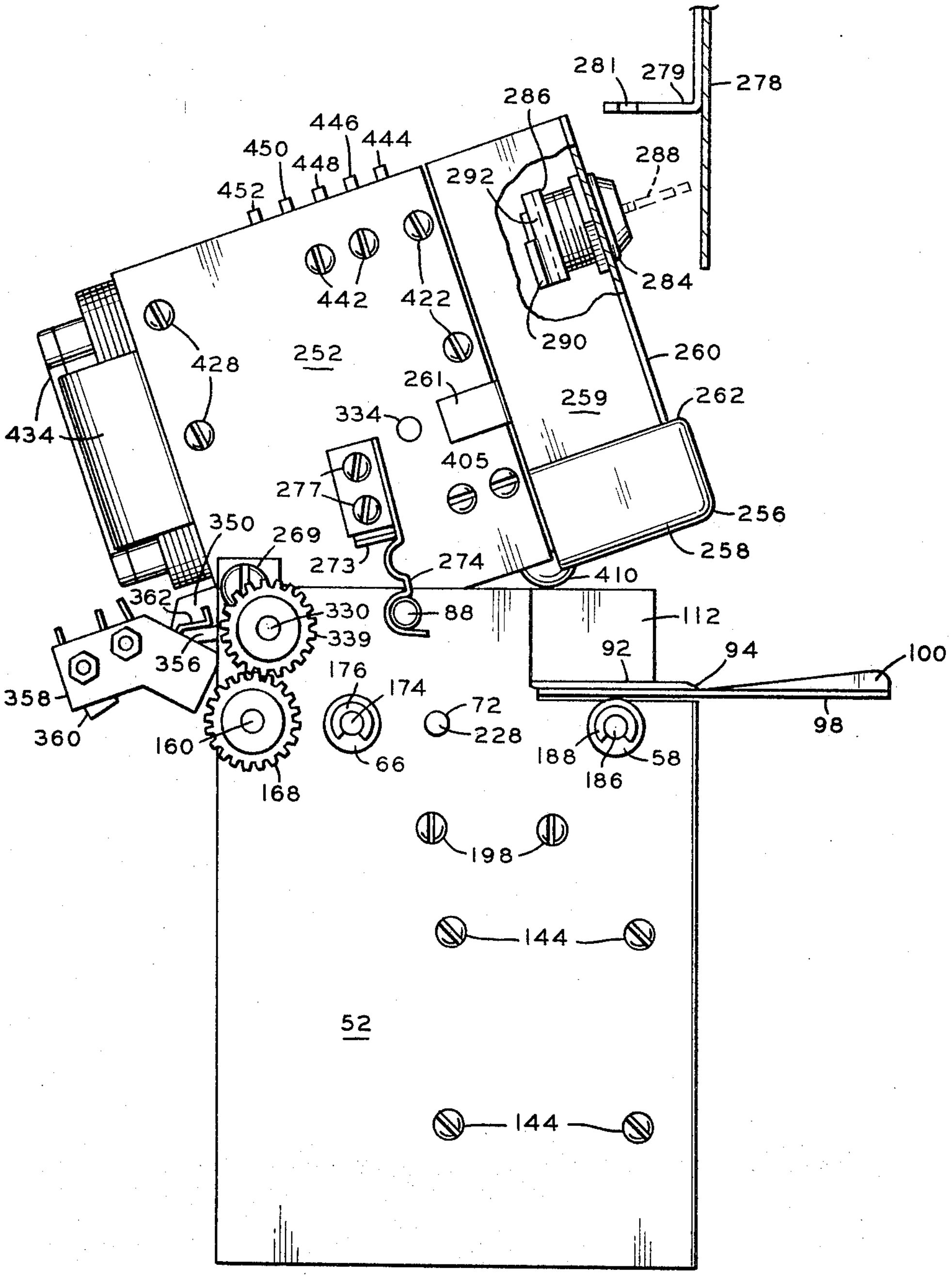
Figures 3, 4:
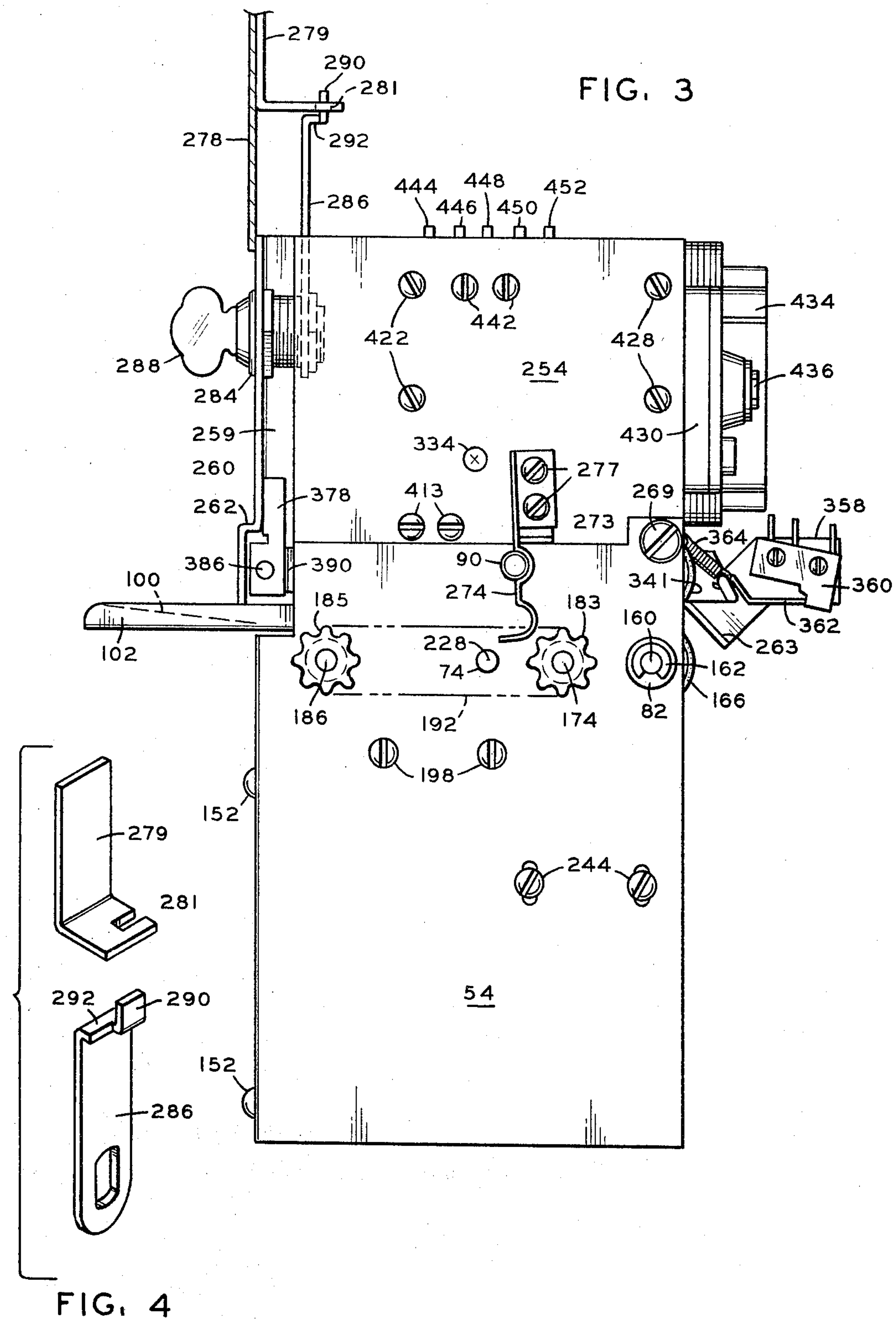
Figure 5:
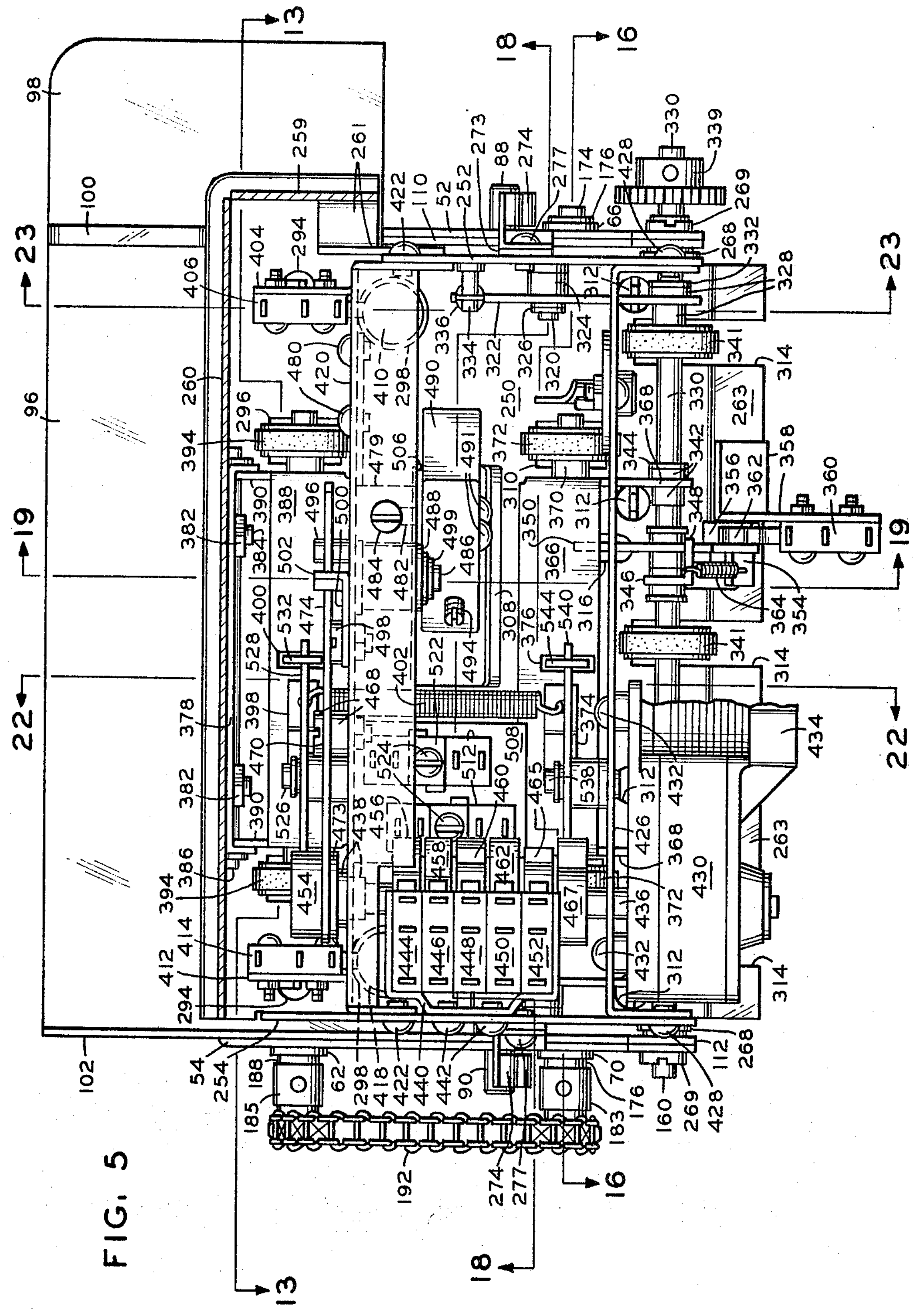
Figure 6:
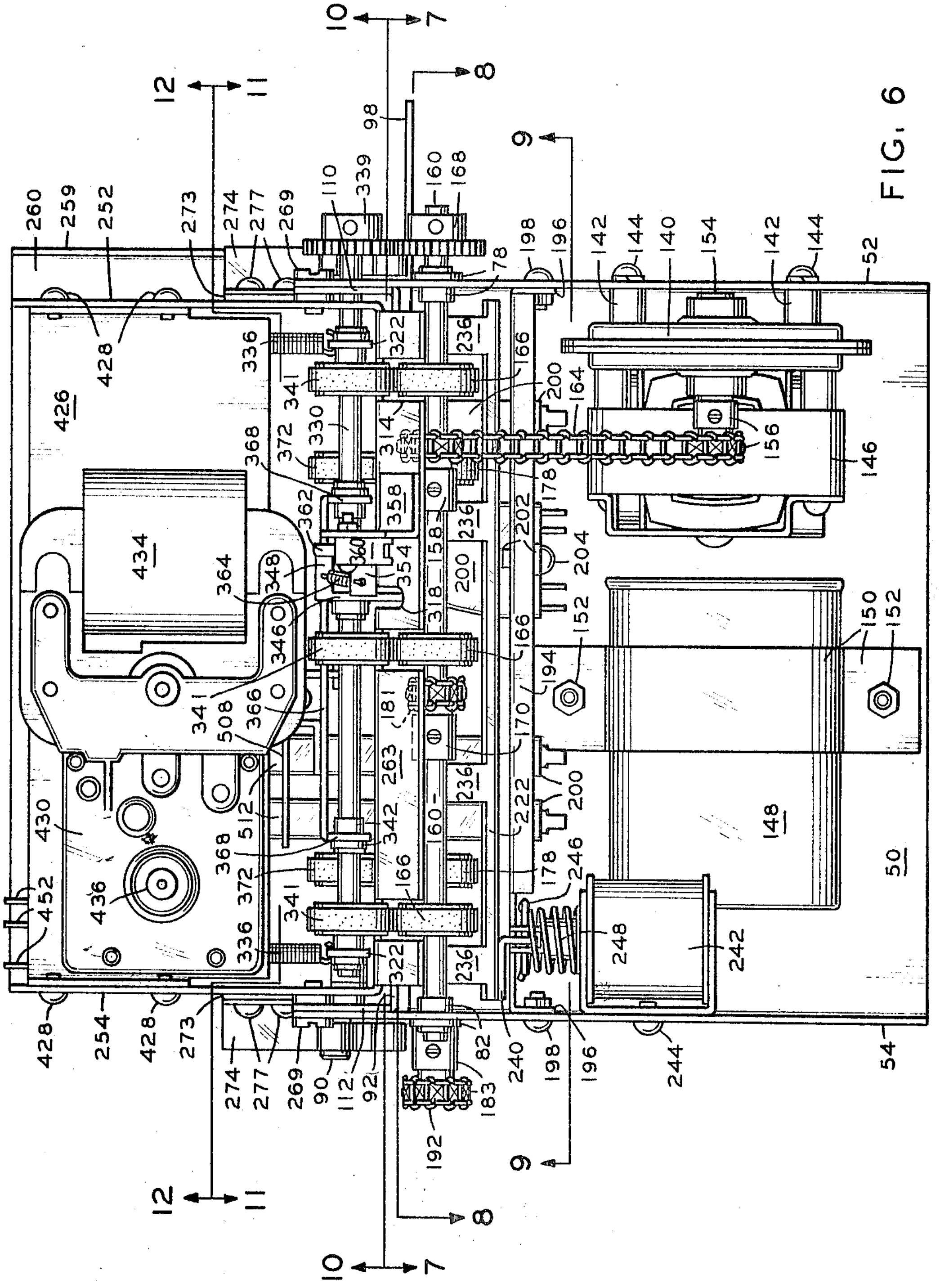
Figure 7:
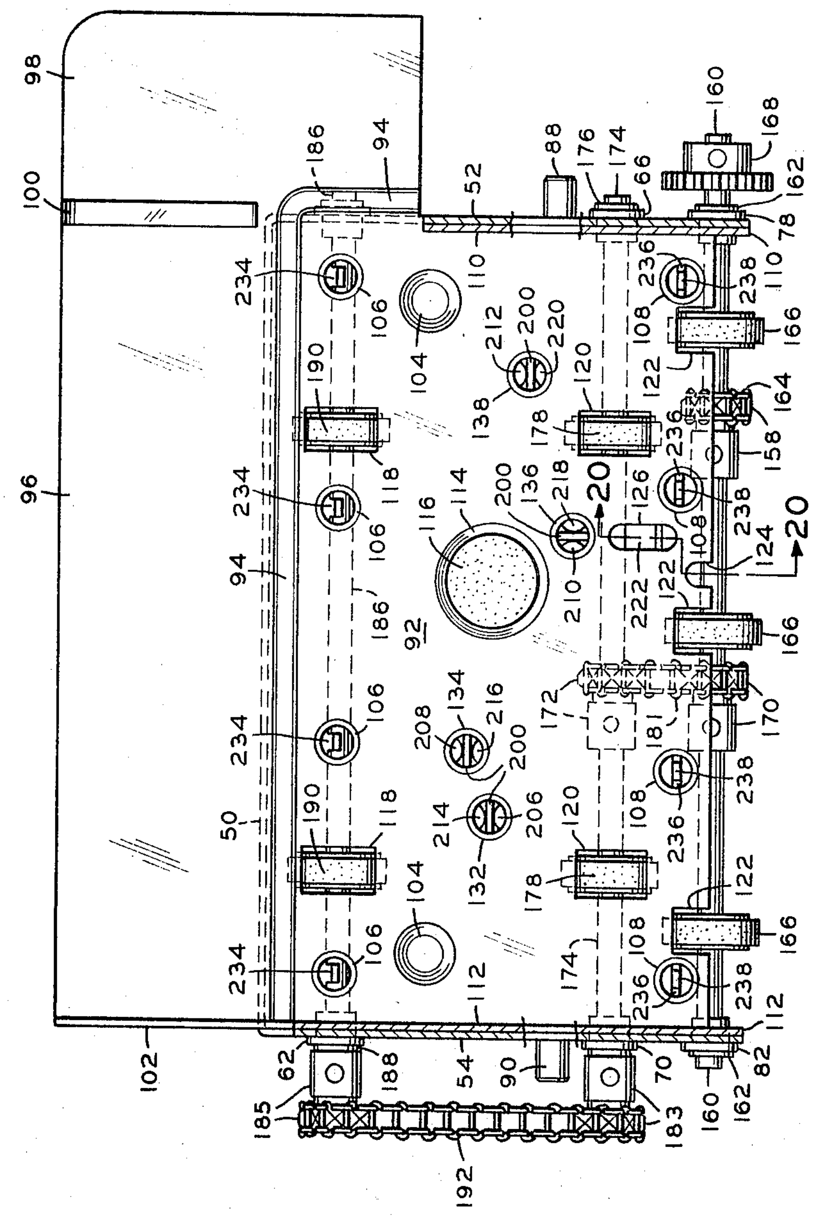
Figure 8:
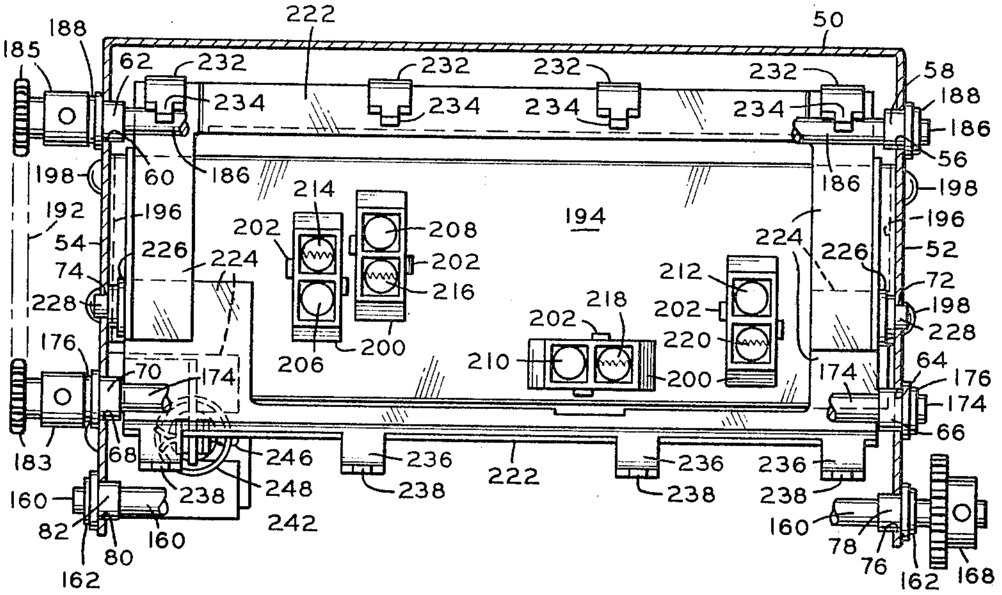
Figure 9:
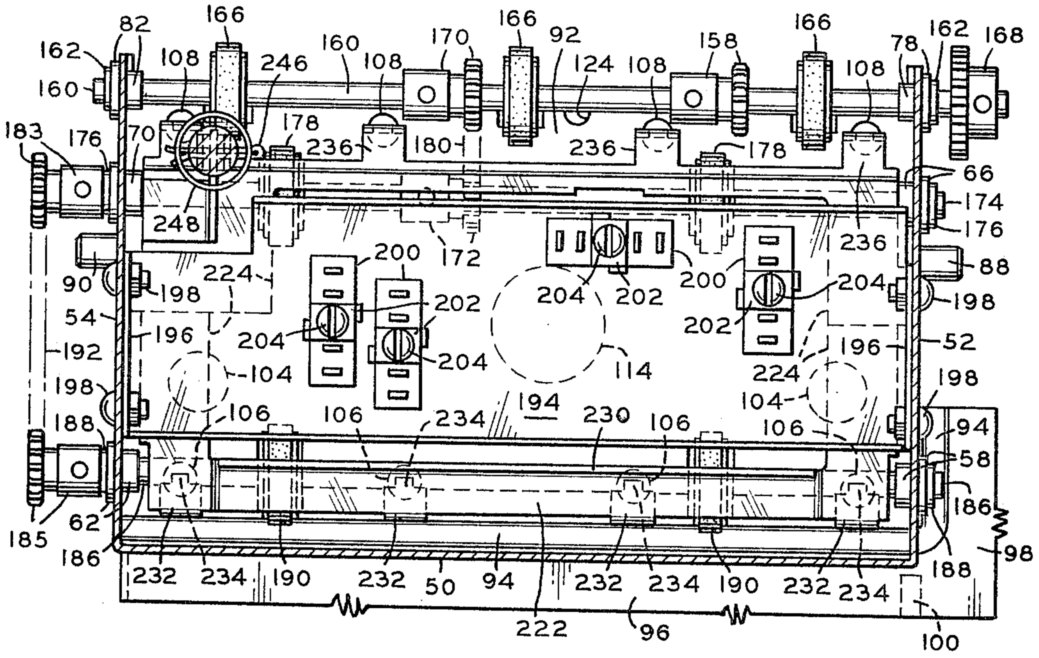
Figure 10:
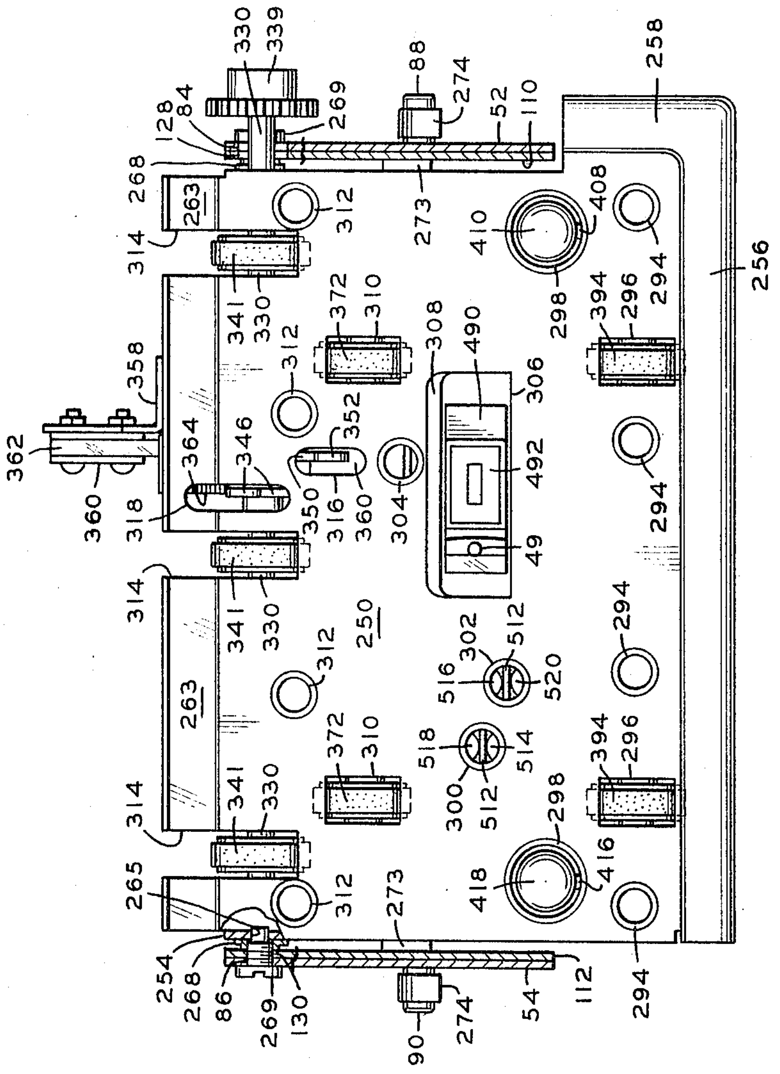
Figure 11:
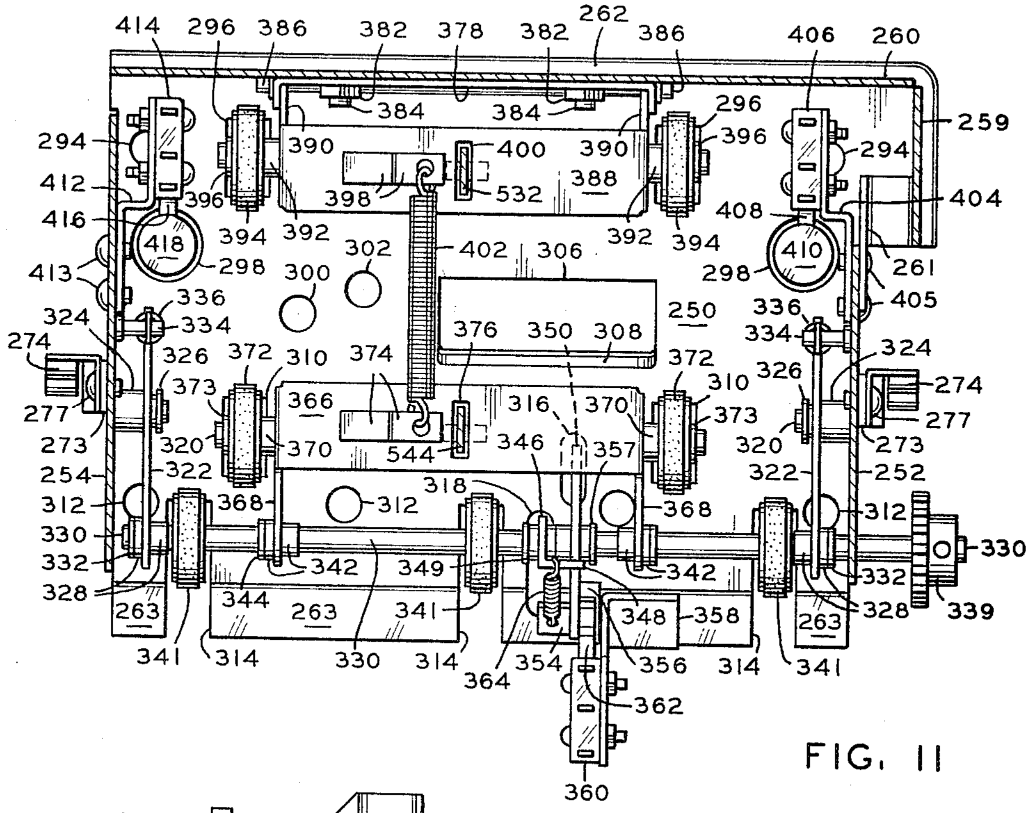
Figure 12:
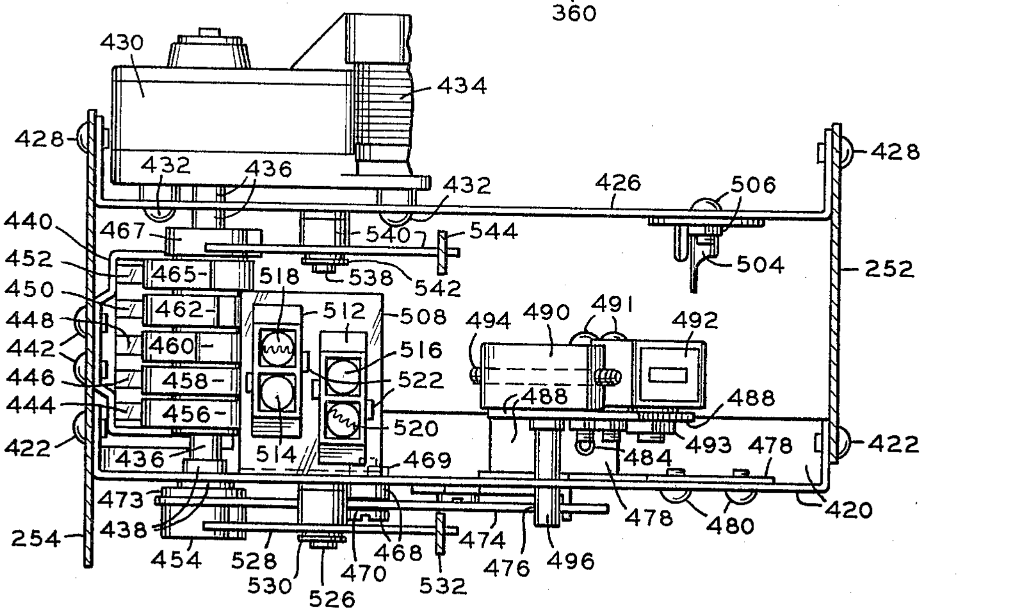
Figure 13:
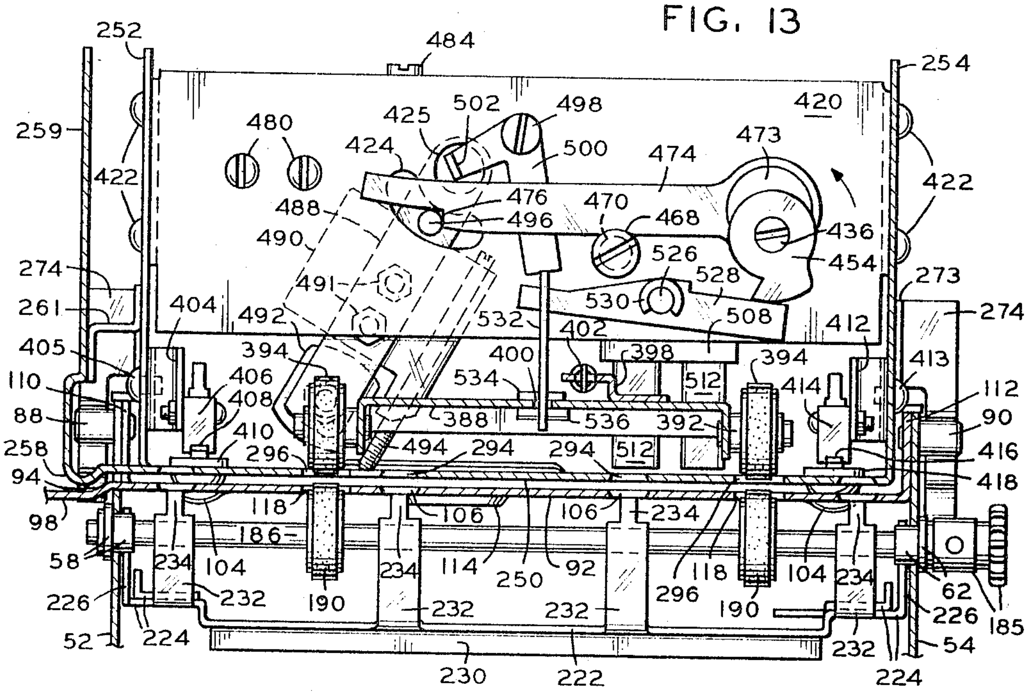
Figure 14:
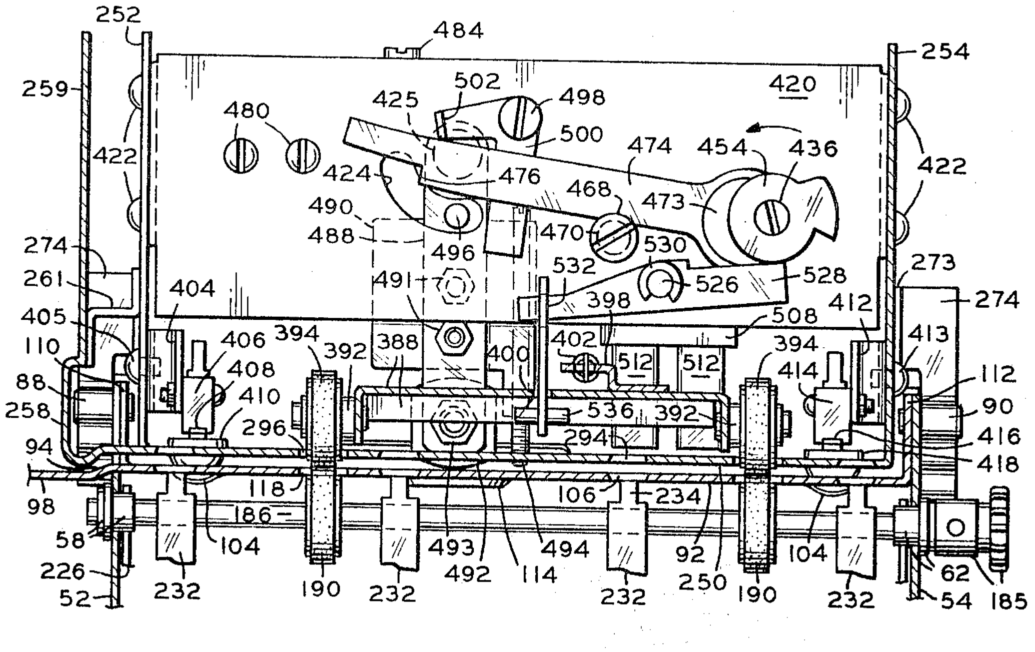
Figure 15:
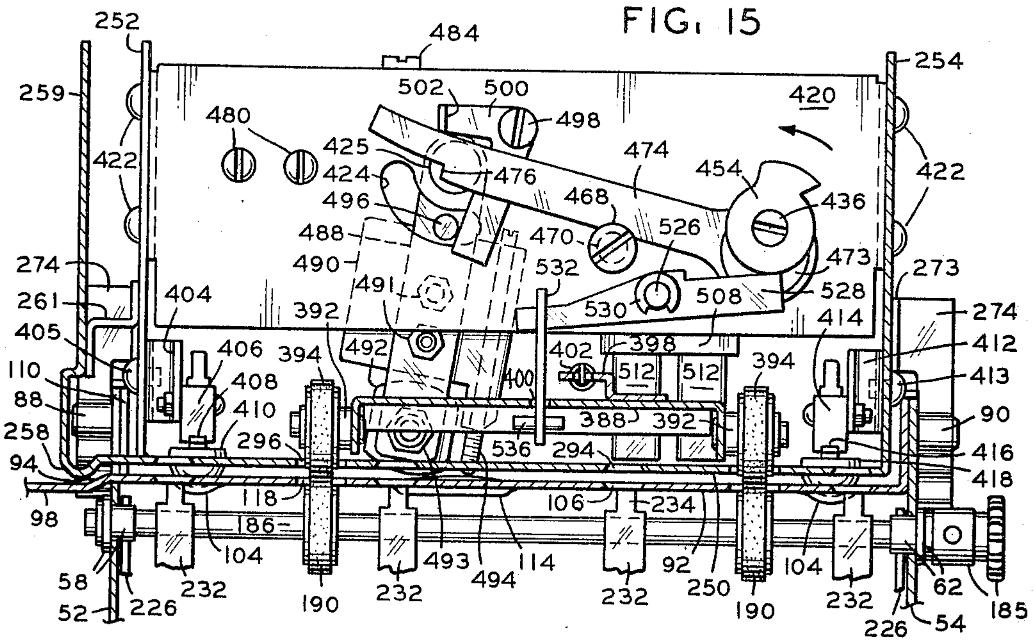

In the drawing, FIG. 1 is a front elevational view of one embodiment of currency detector that is made in accordance with the principles and teachings of the present invention, FIG. 2 is an elevational view of the left-hand side of the currency detector of FIG. 1, as the upper section of that currency detector has been moved away from the lower section of that currency detector, FIG. 3 is an elevational view of the right-hand side of the currency detector of FIG. 1, FIG. 4 is an exploded perspective view of a bracket and a latch which normally hold the upper section of the currency detector of FIG. 1 in the position shown by FIGS. 1 and 3, FIG. 5 is a partially broken-away, partially-sectioned plan view of the currency detector of FIG. 1, FIG. 6 is a rear elevational view of the currency detector of FIG. 1, FIG. 7 is a partially-broken, sectional view through the currency detector of FIG. 1, and it is taken along the plane indicated by the line 7—7 in FIG. 6, FIG. 8 is another partially-broken, sectional view through the currency detector of FIG. 1, and it is taken along the plane indicated by the line 8—8 in FIG. 6, FIG. 9 is a further sectional view through the currency detector of FIG. 1, and it is taken along the plane indicated by the line 9—9 in FIG. 6, FIG. 10 is yet another partially-broken, sectional view through the currency detector of FIG. 1, and it is taken along the plane indicated by the line 10—10 in FIG. 6, FIG. 11 is still another sectional view through the currency detector of FIG. 1, and it is taken along the plane indicated by the line 11—11 in FIG. 6, FIG. 12 is a still further sectional view through the currency detector of FIG. 1, and it is taken along the plane indicated by the line 12—12 in FIG. 6, FIG. 13 is a vertical section through the currency detector of FIG. 1, and it is taken along the broken plane indicated by the broken line 13—13 in FIG. 5, FIG. 14 is a vertical section taken along the broken plane indicated by the broken line 13—13 in FIG. 5, but it shows the components of the currency detector after the shaft of the timing motor of that currency detector has rotated about ninety degrees, FIG. 15 is another vertical section taken along the broken plane indicated by the broken line 13—13 in FIG. 5, but it shows the components of the currency detector after the shaft of the timing motor of that currency detector has rotated a total of slightly less than one hundred and eighty degrees.

Figure 16:
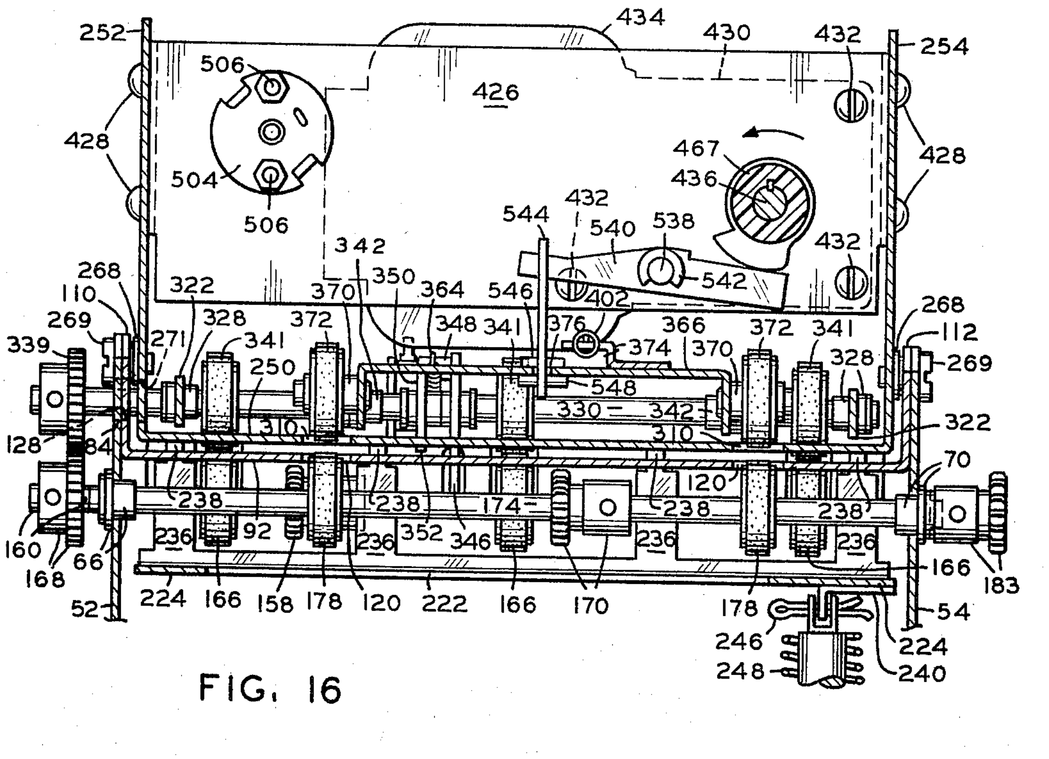
Figures 17, 18:
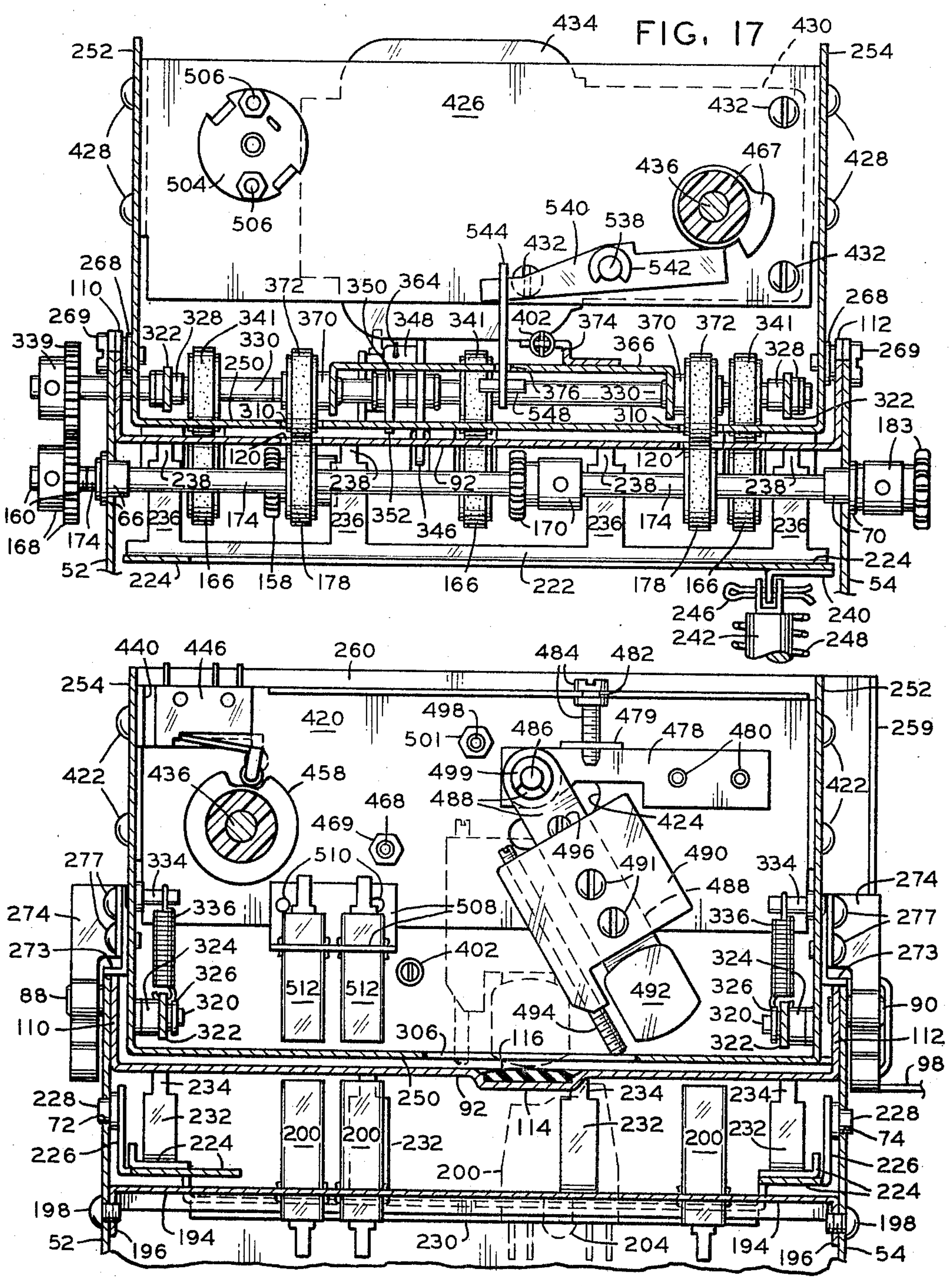
Figure 19:
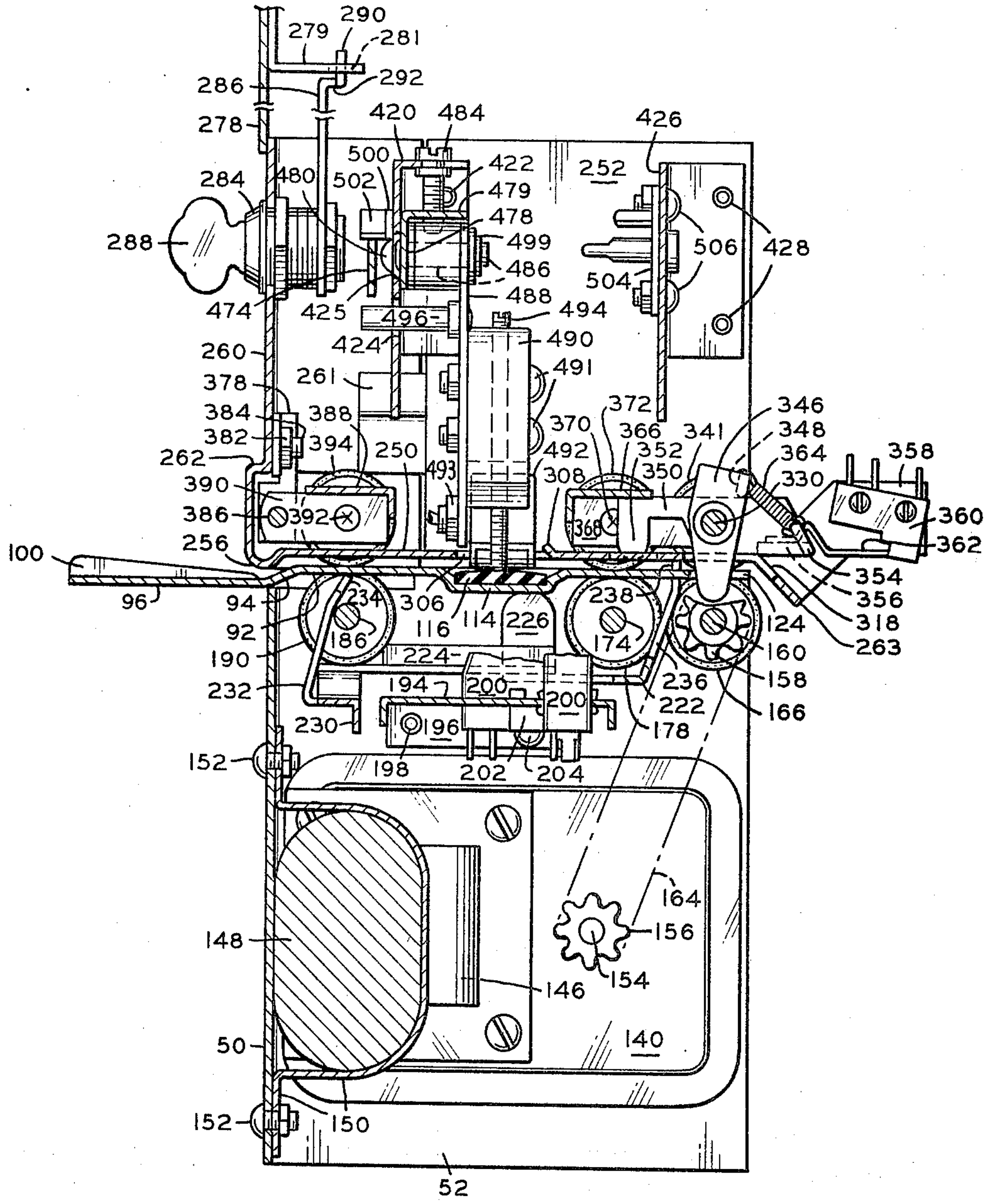
Figure 20:
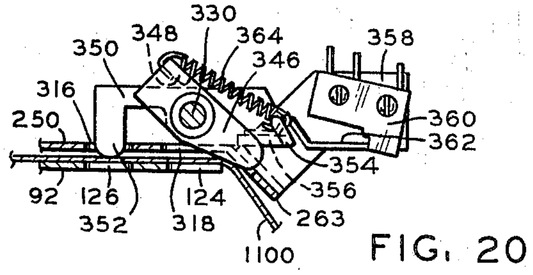
Figures 21, 23:
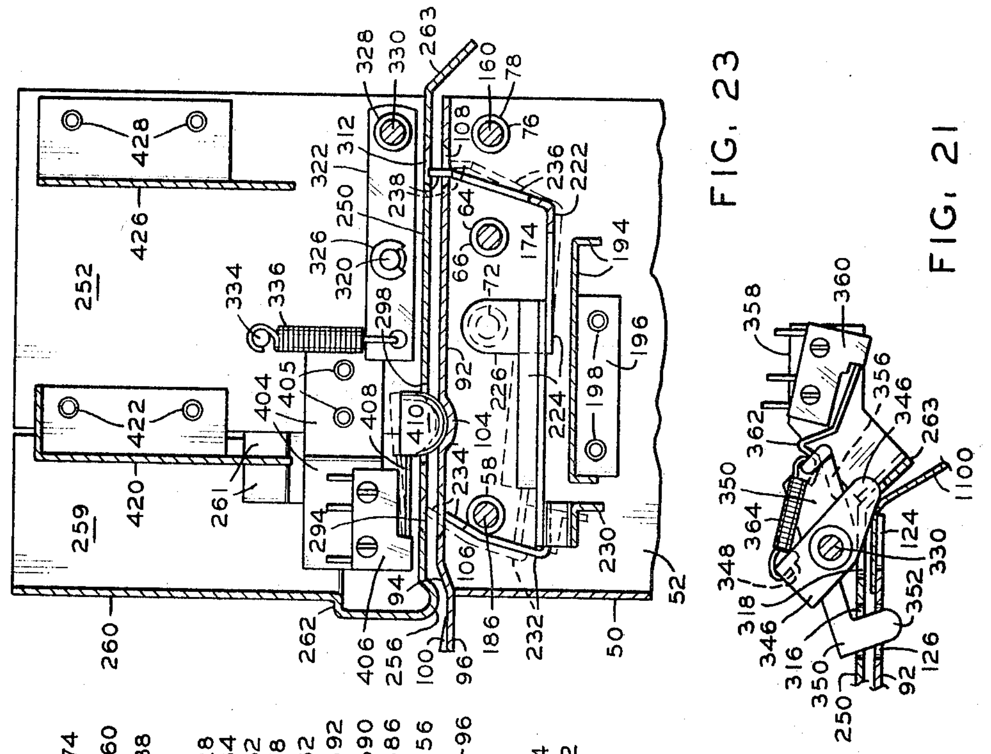
Figure 22:
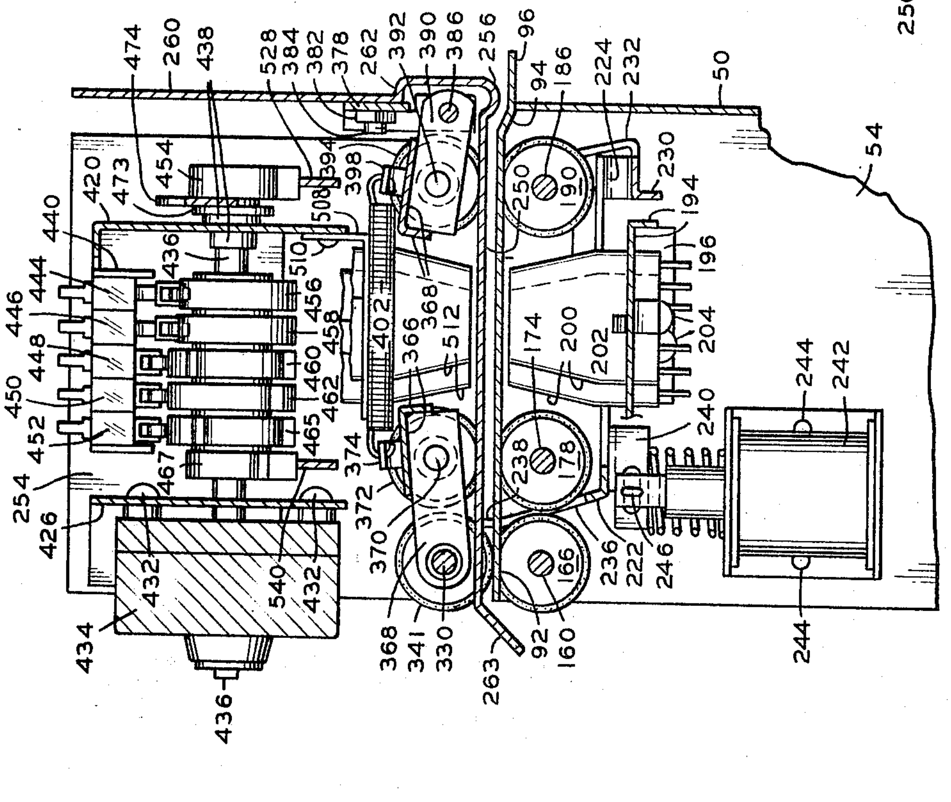
Figure 24:
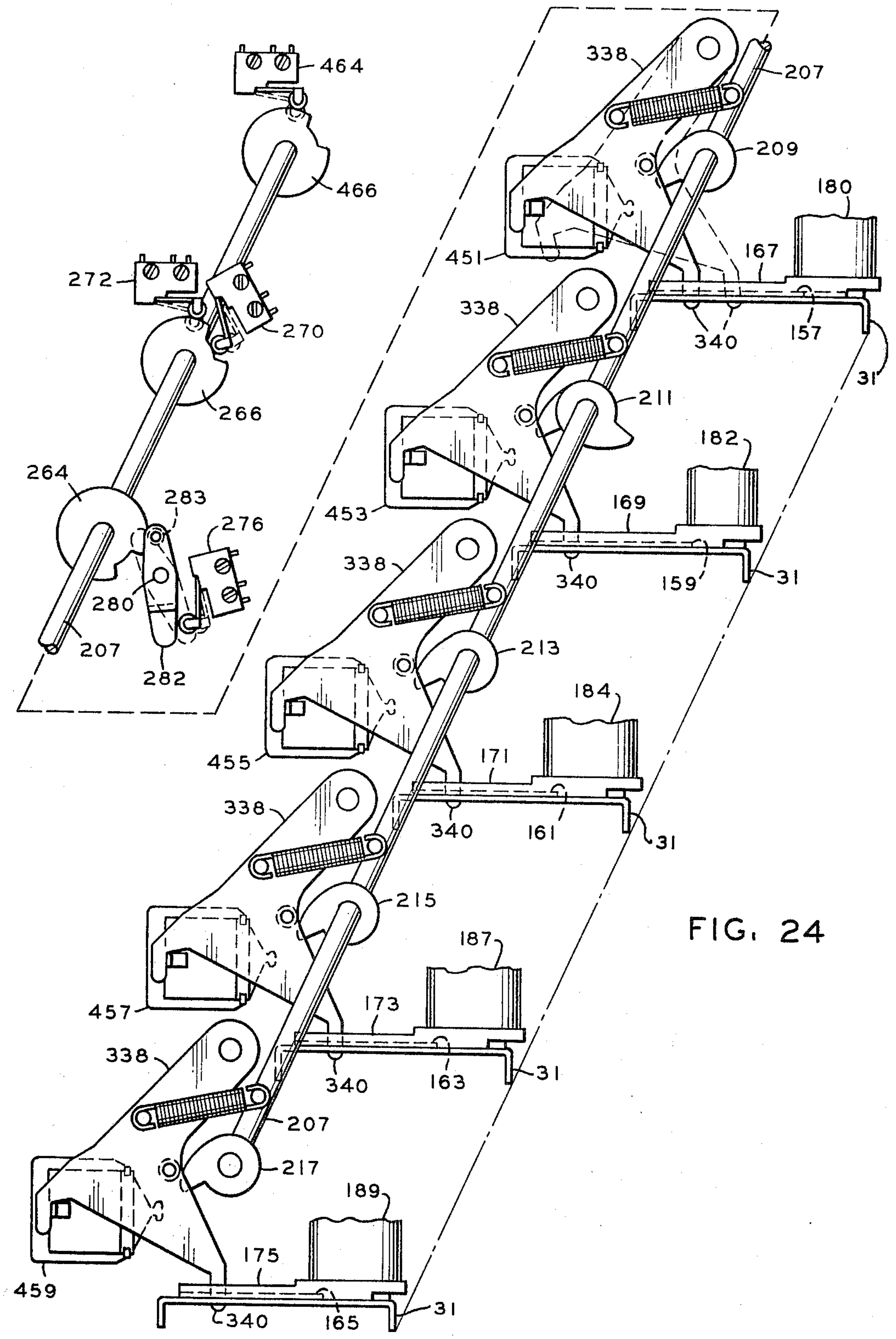
Figures 25, 31:
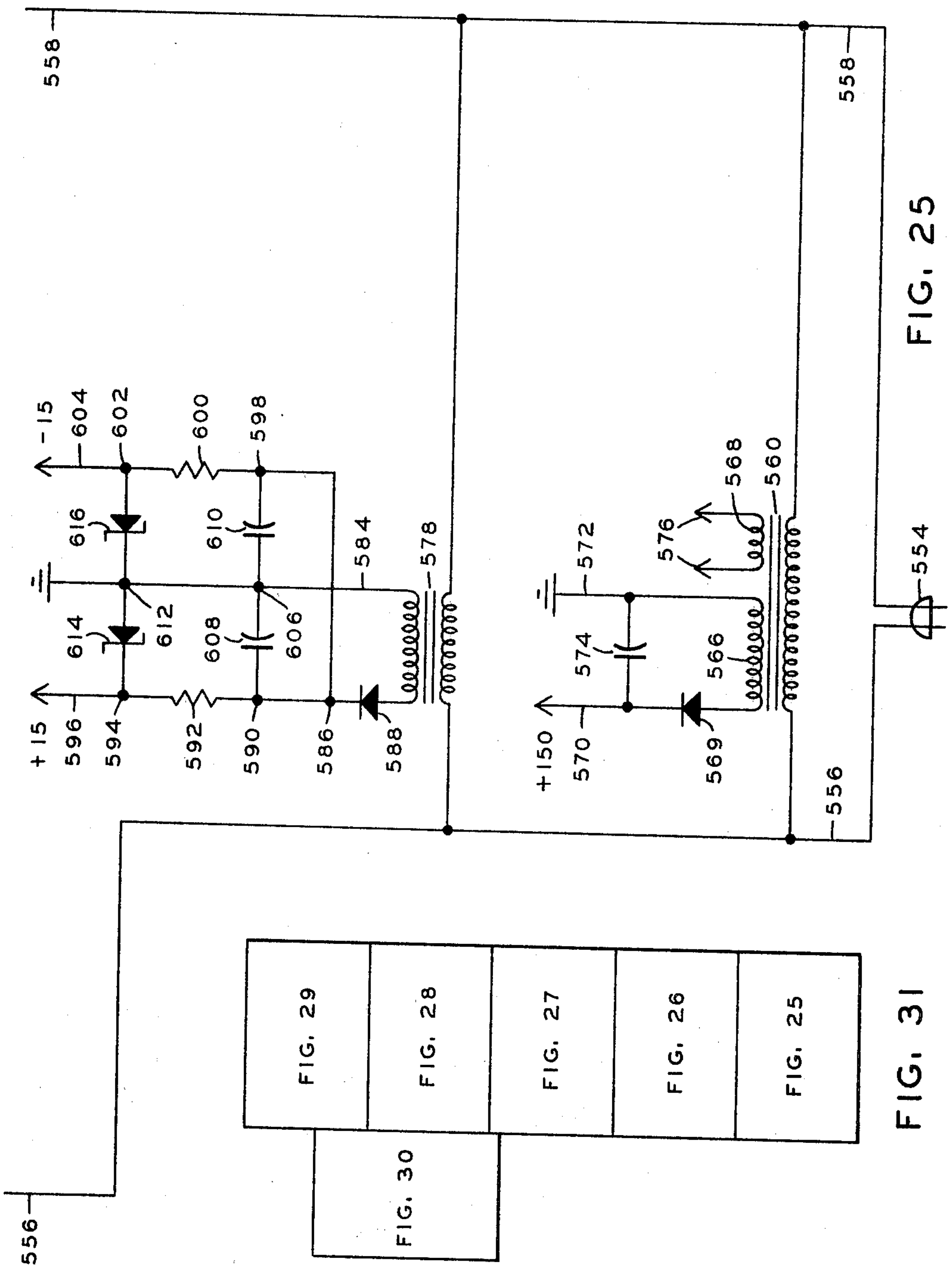
Figure 26:
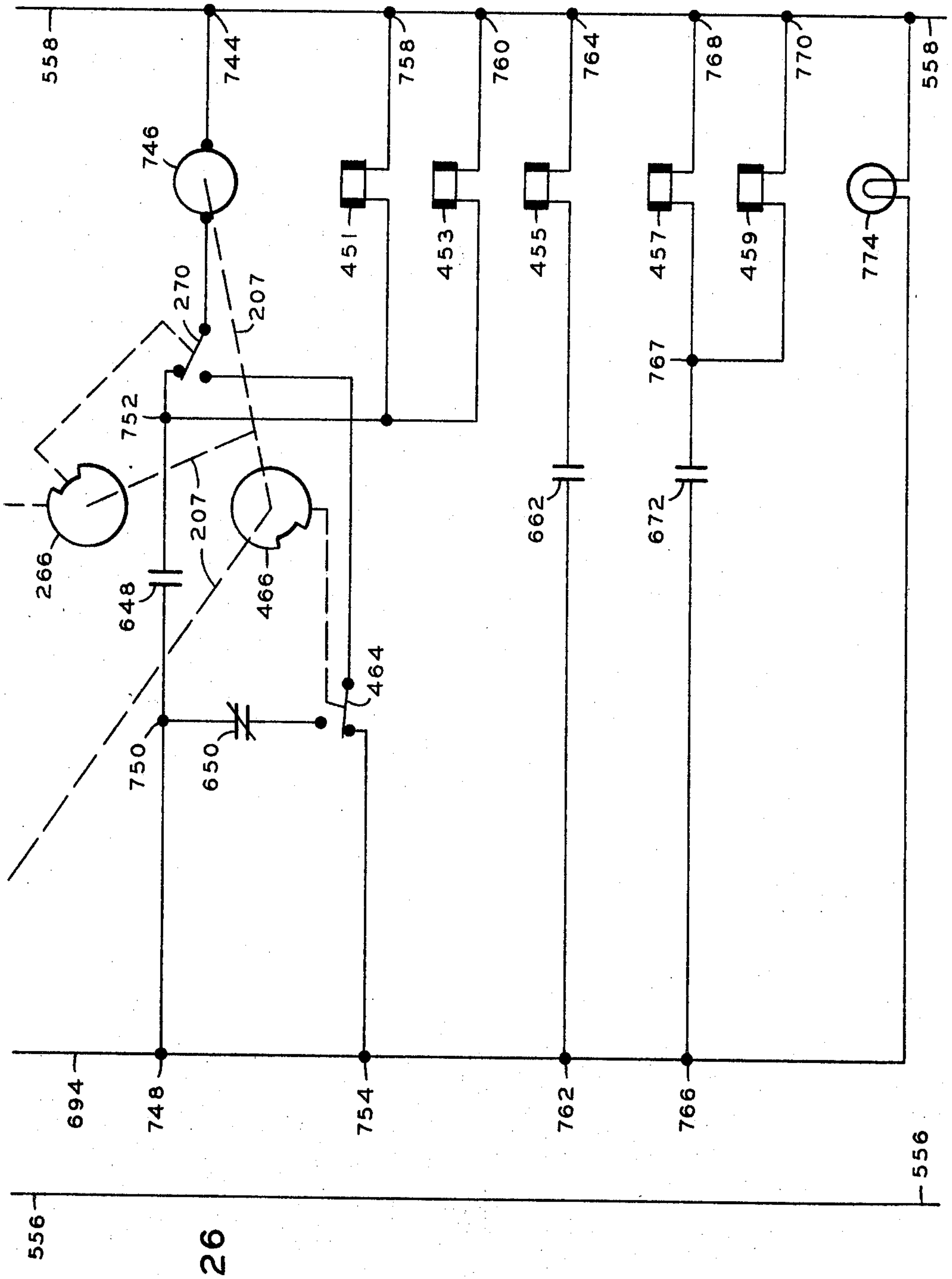
Figure 27:
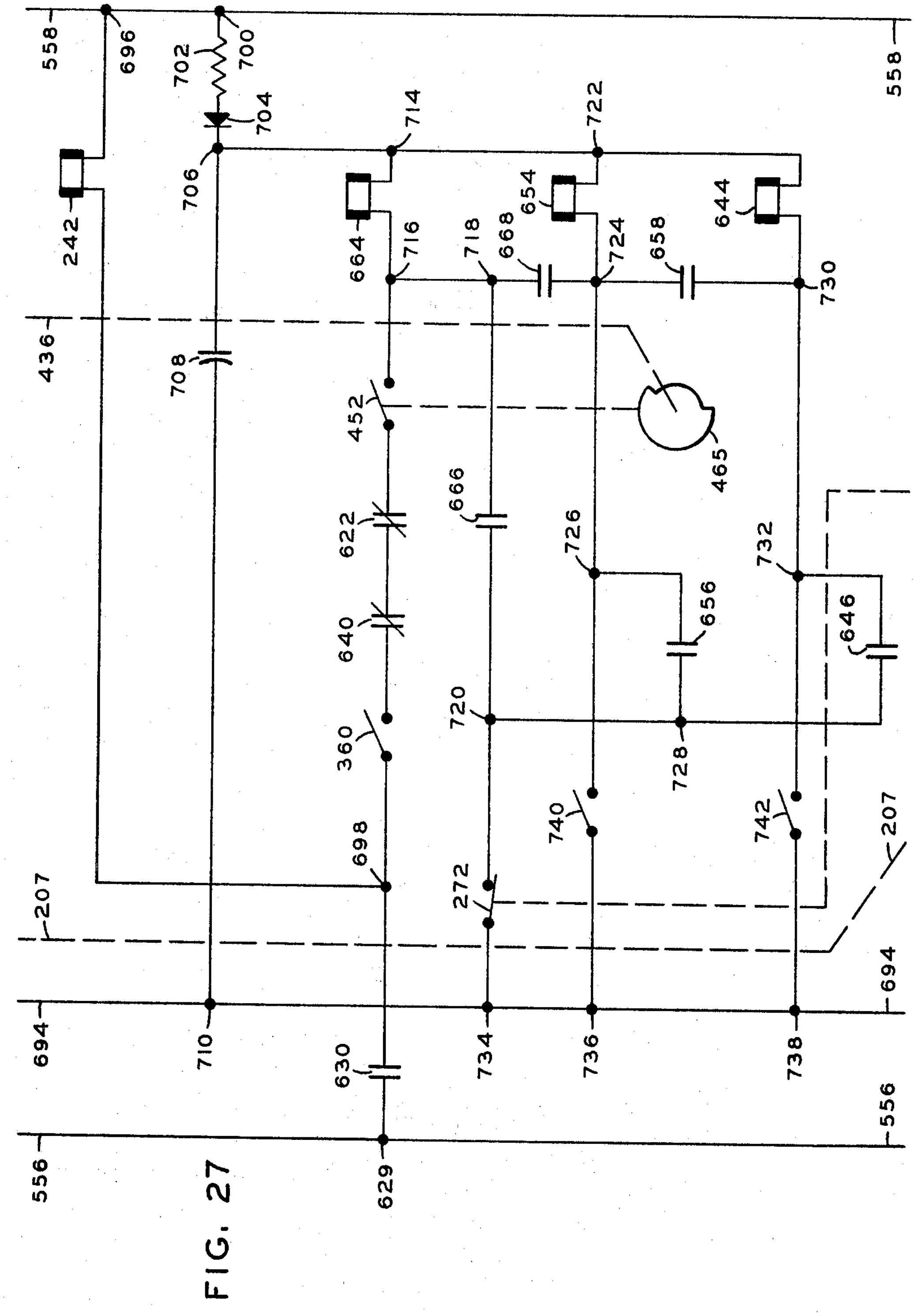
Figure 28:
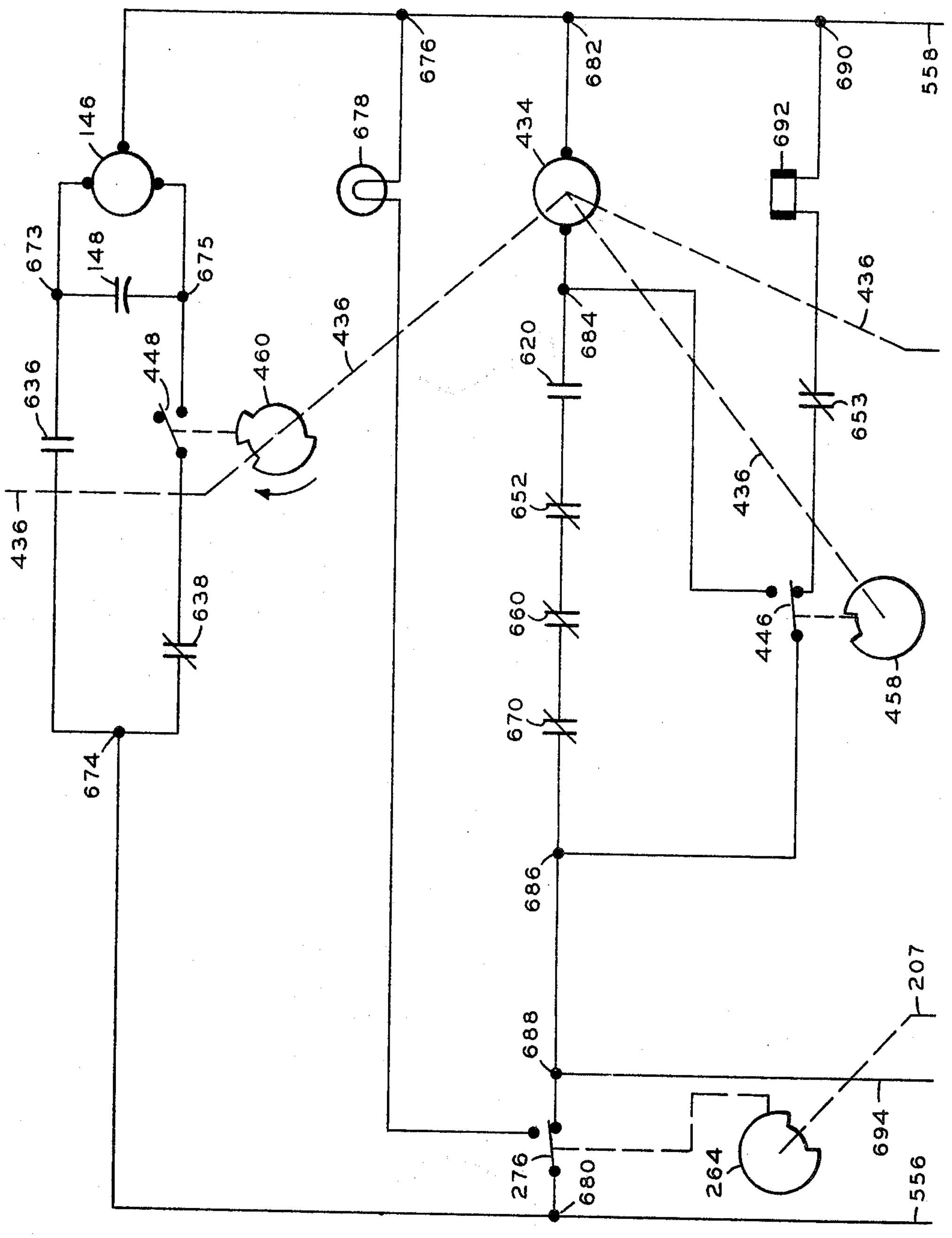
Figure 29:
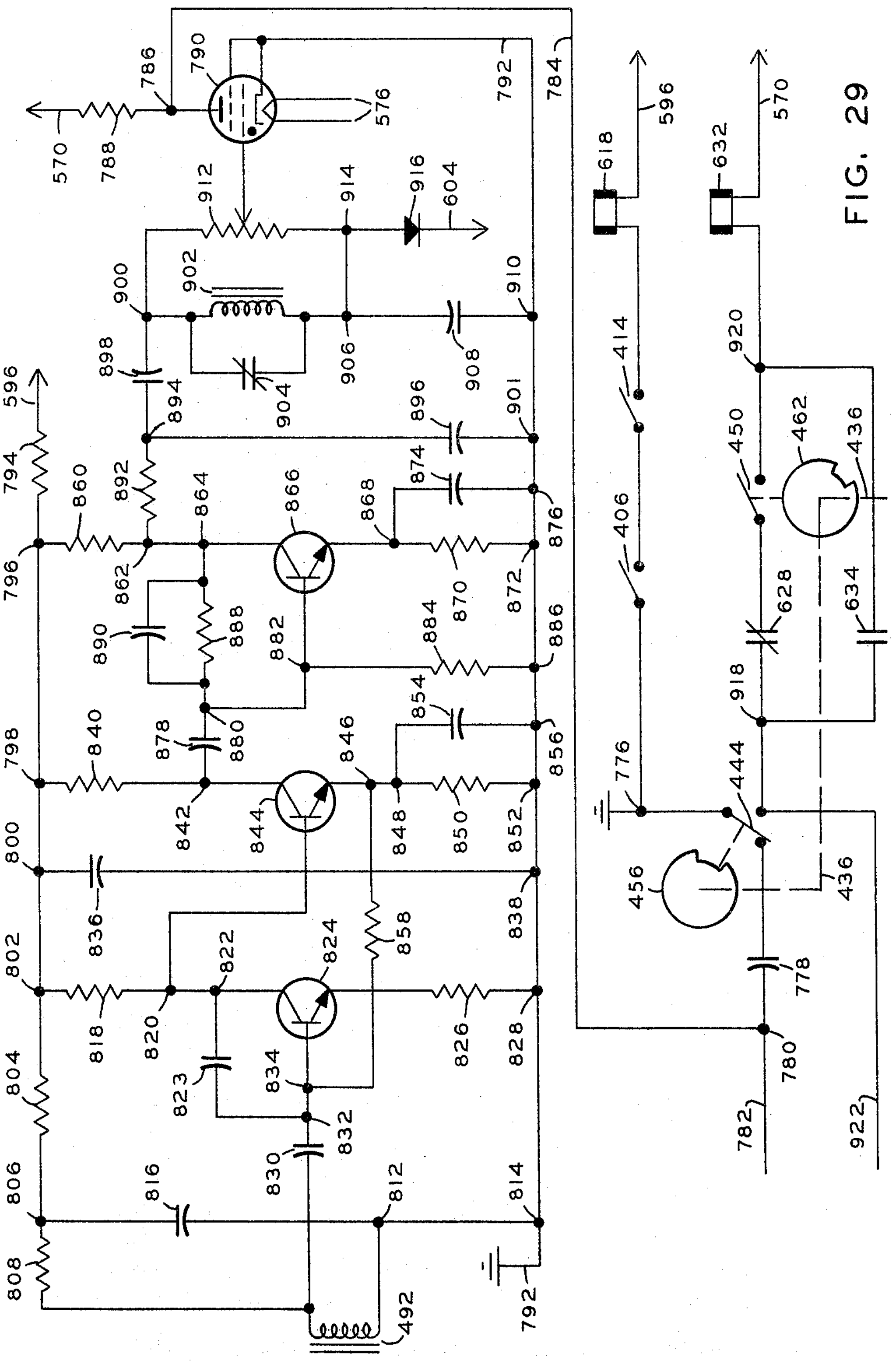
Figure 30:
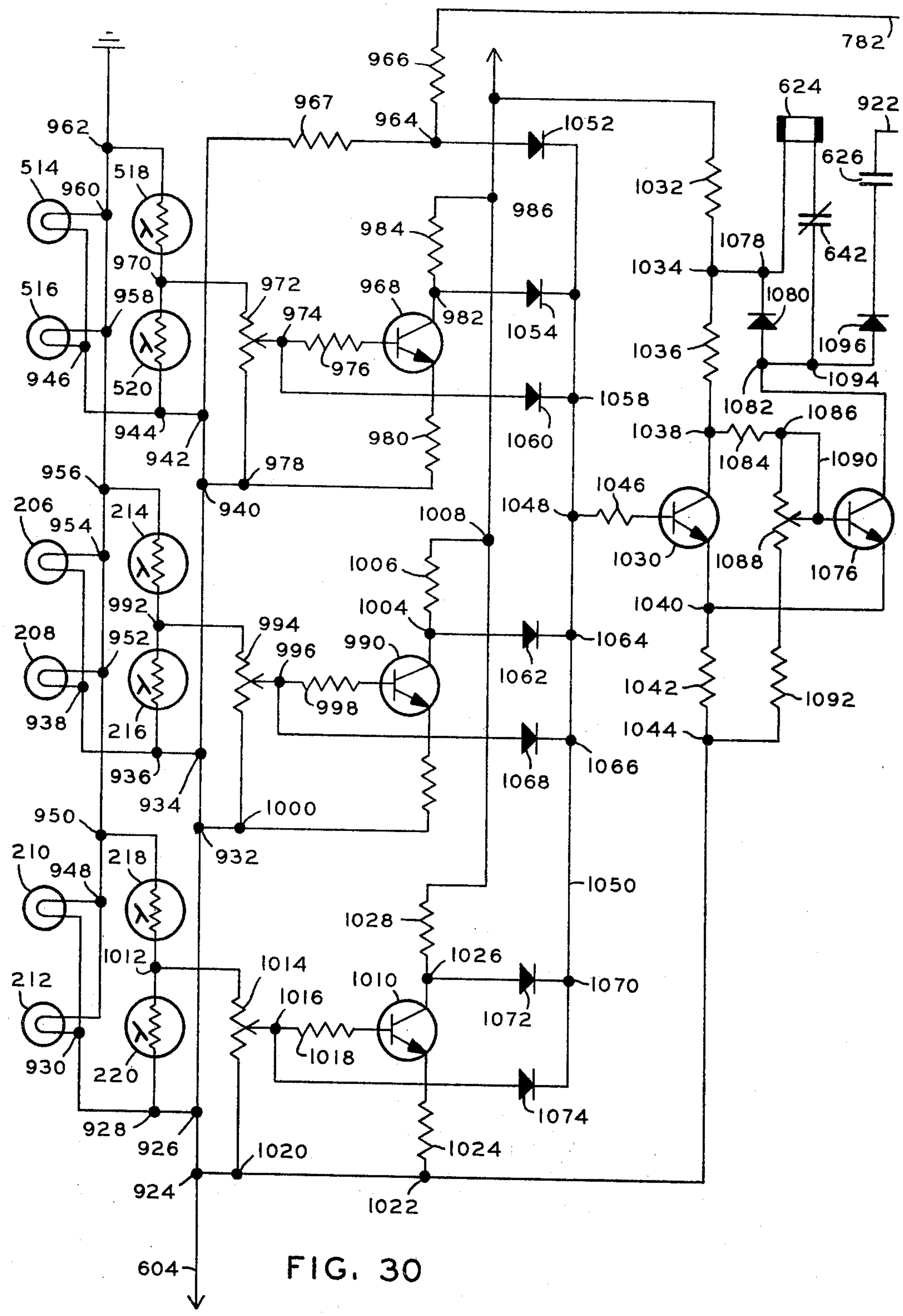

FIG. 16 is a vertical section through the currency detector of FIG. 1, and it is taken along the broken plane indicated by the broken line 16—16 in FIG. 5, FIG. 17 is another vertical section taken along the broken plane indicated by the broken line 16—16 in FIG. 5, but it shows the components of the currency detector after the shaft of the timing motor of that currency detector has rotated about ninety degrees, FIG. 18 is a further vertical section through the currency detector of FIG. 1, and it is taken along the broken plane indicated by the broken line 18—18 in FIG. 5, FIG. 19 is a transverse vertical section through the currency detector of FIG. 1, and it is taken along the plane indicated by the line 19—19 in FIG. 5, FIG. 20 is a sectional view through part of the currency detector of FIG. 1, it is taken along the broken plane indicated by the broken line 20—20 in FIG. 7, and it shows an accepted bill engaging both of the levers of the actuator for the switch of FIG. 20, FIG. 21 is another sectional view along the broken plane indicated by the broken line 20—20 in FIG. 7, but it shows an accepted bill engaging just the rearmost of the levers of the actuator for the switch of FIGS. 20 and 21, FIG. 22 is another transverse vertical section through the currency detector of FIG. 1, and it is taken along the plane indicated by the line 22—22 in FIG. 5, FIG. 23 is a further transverse vertical section through the currency detector of FIG. 1, and it is taken along the plane indicated by the line 23—23 in FIG. 5, FIG. 24 is a partially broken-away, perspective view of part of the change-dispensing structure of a change-making device with which the currency detector of the present invention can be used, FIG. 25 is part of an overall schematic diagram which shows the circuitry of the currency detector of FIG. 1 and of a change-making device with which that currency detector can be used, and it shows the power supply for that currency detector, FIG. 26 is another part of the said diagram, and it shows the payout electromagnets and motor of the change-making device, FIG. 27 is a further part of the said overall schematic diagram, and it shows the coin-actuated switches and the relay coils of the change-making device, FIG. 28 is yet another part of the said overall schematic diagram, and it shows the motors of the currency detector plus cams, switches and relay contacts, FIG. 29 is a still further part of the said overall schematic diagram and it shows the portion of the circuitry which is associated with the magnetic head of the currency detector, FIG. 30 is the last part of the said overall schematic diagram, and it shows the portion of the circuitry which is associated with the photocells of the currency detector, and FIG. 31 shows how FIGS. 25–30 are interrelated.

*Components of currency detector*

Referring to the drawing in detail, the numeral 50 denotes the lower section of one preferred form of currency detector that is made in accordance with the principles and teachings of the present invention. That lower section has a front wall, has a rearwardly-extending side wall 52, and has a rearwardly-extending side wall 54. An opening 56 is provided in the side wall 52 to accommodate a bushing 58; and that opening is adjacent the front wall of the lower section 50, as shown by FIG. 8. Similarly, an opening 60 is provided in the side wall 54 to accommodate a bushing 62; and that opening is adjacent the front wall of that lower section, as shown by FIG. 8. The openings 56 and 60 are in alinement with each other, and the bushings 58 and 62 are coaxial.

An opening 64 is provided in the side wall 52 adjacent the rear of that side wall; and that opening accommodates a bushing 66, as shown by FIG. 8. An opening 68 is provided in the side wall 54 adjacent the rear of that side wall; and that opening accommodates a bushing 70, as shown FIG. 8. The openings 64 and 68 are in alinment with each other, and the bushings 66 and 70 are coaxial.

An opening 72 is provided in the side wall 52 intermediate the openings 56 and 64, as shown by FIG. 8. An opening 74 is provided in the side wall 54 intermediate the openings 60 and 68, as shown by FIG. 8. The openings 72 and 74 are in alinement.

An opening 76 is provided in the side wall 52 immediately adjacent the rear edge of that side wall; and that opening accommodates a bushing 78, as shown by FIG. 8. An opening 80 is provided in the side wall 54 immediately adjacent the rear edge of that side wall; and that opening accommodates a bushing 82, as shown by FIG. 8. The openings 76 and 80 are in alinement, and the bushings 78 and 82 are coaxial.

The openings 56, 64, 72 and 76 in the side wall 52 are at same level. Similarly, the openings 60, 68, 74 and 80 in the side wall 54 are at the same level. Furthermore, the openings 56, 64, 72 and 76 in the side wall 52 are at the same level as the openings 60, 68, 74 and 80 in the side wall 54.

The numeral 84 denotes an opening in the side wall 52 immediately adjacent the rear edge of that side wall; and that opening is shown in FIG. 10. That opening is disposed above the level of the opening 76, and it is larger in diameter than the latter opening. A threaded opening 86 is provided in the side wall 54 immediately adjacent the rear edge of that side wall; and that opening is shown in FIG. 10. That opening is disposed above the level of the opening 80 in the side wall 54. The center of the opening 86 is spaced a short distance rearwardly of a vertical line which extends through the center of the opening 80. A corresponding opening, not shown, is provided in the side wall 52; and that opening is disposed above the level of the opening 84 in that side wall. The center of that corresponding opening is spaced a short distance rearwardly of a vertical line which extends through the center of the opening 76.

The numeral 88 denotes a cylindrical stud which is secured to, and which projects outwardly from, the side wall 52. As indicated particularly by FIG. 2, that stud is located above the level of the opening 72, and it is spaced a short distance rearwardly of a vertical line extending through the center of that opening. A similar cylindrical stud 90 is secured to, and projects outwardly from, the side wall 54. As indicated particularly by FIG. 3, that stud is disposed above the level of the opening 74, and it is spaced a short distance rearwardly of a vertical line extending through the center of that opening. Those studs are sturdy, and they are rigidly secured to the side walls 52 and 54.

The numeral 92 denotes a platen for the lower section 50; and that platen has an offset 94 which is generally L-shaped in plan, as shown particularly by FIG. 7. That offset inclines forwardly and downwardly from the front of the platen 92, as shown particularly by FIG. 19; and that offset also inclines laterally and downwardly from the left-hand side of that platen, as that platen is viewed in FIG. 13. That offset spaces a bill-receiving platform 96 and an extension 98 of that platform a short distance below the level of the upper surface of the platen 92. As shown particularly by FIG. 19, the offset 94 is largely disposed rearwardly of the front wall of the lower section 50. As indicated particularly by FIG. 7, the offset 94 and the extension 98 project outwardly beyond the side wall 52.

A guide 100 is formed on the upper surface of the bill-receiving platform 96, and that guide forms a line of demarkation between that platform and the extension 98 of that platform. The guide 100 is approximately triangular in elevation, as shown by FIG. 2; and the upper surface of that guide inclines downwardly from the front to the rear of that guide. The rear of the guide 100 approaches those parts of the surfaces of the platform 96 and of the extension 98 which are immediately adjacent the offset 94.

An upturned flange 102 is provide on the bill-receiving platform 96, as shown particularly by FIGS. 1 and 7. The distance between the confronting faces of the guide 100 and of the flange 102 is just slightly greater than the length of the longest bill that is to be accepted by the currency detector. As a result, the guide 100 and the flange 102 can help patrons position the leading edges of bills on the bill-receiving platform 96 prior to the time those leading edges are pushed toward the testing area of the currency detector.

The guide 100 is low enough in height to enable a patron to rest part of a bill on the bill-receiving platform 96 and to rest a further part of that bill on the extension 98. At such time, the leading edge of the bill will be inclined to the long arm as well as to the short arm of the offset 94. This is desirable because it means that the bill will initially have point contact rather than line contact with that offset as that bill is moved toward the testing area. This also is desirable because it permits a patron to move the bill both laterally and longitudinally as that bill is moved toward the testing area.

The numeral 104 denotes two shallow, concave recesses in the upper surface of the platen 92; and the curvatures of those recesses are indicated particularly by FIG. 23. The centers of those recesses define a straight line which is parallel to the front edge of the bill-receiving platform 96 and to the long arm of the offset 94, all as shown by FIG. 7. Also as shown by FIG. 7, the forwardmost portions of the recesses 104 are disposed forwardly of a line defined by the rear edge of the extension 98 of the bill-receiving platform 96.

Four alined openings 106 are provided in the platen 92 adjacent the long arm of the offset 94. As indicated particularly by FIGS. 13–15, the openings 106 are frusto-conical; and those openings are larger where they open to the upper face of the platen 92 than they are where they open to the lower face of that platen. The openings 106 are spaced apart substantially equal distances.

Four alined openings 108 are provided in the platen 92 adjacent the rear edge of that platen. As indicated particularly by FIG. 7, the endmost openings 108 are alined with the endmost openings 106. However, the centermost openings 108 are spaced apart a greater distance than are the centermost openings 106. The openings 108 are frusto-conical; and those openings are larger where they open to the upper face of the platen 92 than they are where the open to the lower face of that platen.

The platen 92 has a side flange 110 which extends upwardly above the level of the upper surface of that platen. That side flange abuts the inner face of the side wall 52, and it will be suitably secured to that side wall, as by welding. The platen 92 also has a side flange 112 which extends upwardly above the level of the upper surface of that platen. That side flange abuts the inner face of the side wall 54, and it will be suitably secured to that side wall as by welding. The platen 92 coacts with the side walls 52 and 54 to make the lower section 50 sturdy and rugged.

The numeral 114 denotes a circular recess in the platen 92; and that recess is approximately half-way between the long arm of the offset 94 and the rear edge of the platen 92. The bottom of that recess is flat, and that recess accommodates a resilient disc 116 which has a shallow, convex, upper face. The uppermost portion of the shallow, convex, upper face of the disc 116 lies close to the plane of the upper surface of the platen 92.

The numeral 118 denotes two rectangular slots in the platen 92; and one of those slots is intermediate one endmost opening 106 and the adjacent centermost opening 106. The other of those slots is intermediate the other endmost opening 106 and the other centermost opening 106. Both slots 118 have the long axes thereof extending transversely of the forward edge of the platform 96 and of the long arm of the offset 94; and the forward edges of the slots 118 are immediate adjacent the rear edge of that long arm. The geometric centers of the slots 118 are alined with the geometric centers of the openings 106.

The numeral 120 denotes two rectangular slots in the platen 92; and those slots are spaced short distances from the rear edge of that platen, as shown particularly by FIG. 7. The slots 120 are in alinement with the slots 118; and the long axes of the slots 120 extend transversely of the forward edge of the platform 96 and of the long arm of the offset 94. The geometric centers of the slots 120 are generally alined with the centers of the openings 64 and 68, respectively, in the side walls 52 and 54.

The numeral 122 denotes three notches in the rear edge of the platen 92; and those notches have the long axes thereof extending transversely of the forward edge of the platform 96 and of the long arm of the offset 94. Those slots are spaced apart approximately equal distances, as shown by FIG. 7; and the outermost slots 122 are disposed outwardly of the slots 120 and the remaining slot 122 is disposed intermediate the slots 120.

The numeral 124 denotes a shallow notch in the rear edge of the platen 92. As shown particularly by FIG. 7, that notch is disposed to the right of the centermost notch 122. A slot 126 is provided in the platen 92 to the right of, and forwardly of, the notch 124, as that slot and notch are viewed in FIG. 7. The long axes of the notch 124 and of the slot 126 extend transversely of the forward edge of the platform 96 and of the long arm of the offset 94.

The numeral 128 denotes an opening in the side flange 110 of the platen 92; and that opening is shown in FIG. 10. That opening is as large as the opening 84 in the side wall 52, and it is in register with that opening.

The numeral 130 denotes a threaded opening in the side flange 112 of the platen 92; and that opening is in register with the opening 86 in the side wall 54, as shown by FIG. 10. A corresponding threaded opening, not shown, is provided in the side flange 110 of the platen 92; and the opening 130 and its corresponding opening in the side flange 110 are in register with each other.

The numerals 132, 134, 136 and 138 denote further openings in the platen 92. Those openings are frusto-conical; and those openings are larger where they open to the upper face of the platen 92 than they are where they open to the lower face of that platen. As indicated particularly by FIG. 7, the openings 132 and 134 are close to each other and are disposed to the left of the recess 114. The opening 136 is intermediate the recess 114 and the slot 126; and the openings 138 is intermediate the recess 114 and the side flange 110 of the platen 92.

Referring particularly to FIG. 6, the numeral 140 denotes a gear housing with studs 142 thereon that abut the inner face of the side wall 52. Screws 144 extend through openings in that side wall and seat in those studs to hold that gear housing fixed relative to that side wall. A reversible motor 146 is mounted on the gear housing 140; and that motor has a capacitor 148 connected to it. That capacitor is secured to the rear face of the front wall of the lower section 50 by a generally U-shaped bracket 150. Nut and bolt combinations 152 maintain that bracket and the capacitor 148 in assembled relation with the front wall of the lower section 50. The output shaft of the gear housing 140 is denoted by the numeral 154; and a sprocket pinion 156 is fixedly secured to that shaft.

The numeral 158 denotes a sprocket pinion which is mounted on a shaft 160. The opposite ends of that shaft are rotatably supported by the bushings 78 and 82 which are disposed respectively, within the openings 76 and 80 in the side walls 52 and 54. Securing members 162, such as C-washers, abut the outer faces of the bushings 78 and 82 and are fixed to the shaft 160 to prevent axial shifting of that shaft while permitting ready rotation of that shaft. A sprocket chain 164 encircles and meshes with the sprocket pinions 156 and 158; and that chain will enable the motor 146 to rotate the shaft 160.

Three rollers 166 are mounted on and secured to the shaft 160; and hence those rollers will rotate with that shaft. Each of those rollers has a bill-engaging surface which has a high coefficient of friction. For example, each of those rollers has a bill-engaging surface of a material such as rubber, synthetic rubber, elastomeric plastic, or the like. The rollers 166 are spaced apart distances that are approximately equal; and the forward portions of those rollers extend into the notches 122 in the rear edge of the platen 92, as shown by FIG. 7. The tops of those rollers will be close to the upper surface of the platen 92.

A spur gear 168 is secured to the right-hand end of the shaft 160 as that shaft is viewed in FIG. 7; and that spur gear will rotate with that shaft. A sprocket pinion 170 is mounted on the shaft 160 intermediate the left-handmost and the centermost rollers 166, as those rollers are viewed in FIG. 7.

The numeral 172 denotes a sprocket pinion which is fixedly mounted on a shaft 174; and the ends of that shaft are rotatably held by the bushings 66 and 70 which are disposed, respectively, within the openings 64 and 68 in the side walls 52 and 54. The shaft 174 is parallel to, but is disposed forwardly of, the shaft 160. Securing members 176, such as C-washers, abut the outer faces of the bushings 66 and 70 and are fixed to the shaft 174 to prevent axial shifting of that shaft while permitting ready rotation of that shaft.

Two rollers 178 are fixedly mounted on the shaft 174, and hence those rollers will rotate with that shaft. Each of those rollers will have a bill-engaging surface with a high coefficient of friction. The rollers 178 are mounted in register with the slots 120 in the platen 92; and the upper portions of the peripheries of those rollers will extend far enough into those slots to make the upper surface of the platen 92 approximately tangential to the tops of those rollers, as shown by FIGS. 16 and 17.

A sprocket chain 181 encircles and meshes with the sprocket pinions 170 and 172. As a result, rotation of the shaft 160 and of the sprocket pinion 170 will cause rotation of the sprocket pinion 172 and of the shaft 174. The sprocket pinions 170 and 172 are formed and dimensioned so that shafts 160 and 174 will rotate at the same angular rate. A sprocket pinion 183 is mounted on and secured to the left-hand end of the shaft 174, as that shaft is viewed in FIG. 7; and that pinion will rotate with that shaft.

The numeral 185 denotes a sprocket pinion which is mounted on and is secured to the left-hand end of a shaft 186, as that shaft is viewed in FIG. 7. The ends of that shaft are supported by the bushings 58 and 62 which are, respectively, disposed within the openings 56 and 60 in the side walls 52 and 54. The shaft 186 is parallel to, but is disposed forwardly of the shafts 174 and 160. The sprocket pinion 185 is alined with the sprocket pinion 183; and a sprocket chain 192 encircles and meshes with those sprocket pinions. As a result, the shaft 186 will rotate whenever the shafts 174 and 160 rotate. Securing members 188, such as C-washers, abut the outer faces of the bushing 58 and 62 and are fixed to the shaft 186 to prevent axial shifting of that shaft while permitting free rotation of that shaft.

Two rollers 190 are mounted on and secured to the shaft 186; and those rollers will rotate with that shaft. Each of those rollers has a bill-engaging surface that has a high coefficient of friction. The rollers 190 are mounted in register with the slots 118 in the platen 92; and the upper portions of the peripheries of those rollers will extend far enough into those slots to make the upper surface of the platen 92 aproximately tangential to the tops of those rollers, as shown by FIGS. 13–15.

Referring particularly to FIGS. 6, 8, 9 and 19, the numeral 194 denotes a platform which has downwardly-extending flanges at the front and rear thereof. That platform also has downwardly-extending side flanges 196 that abut the inner faces of the side walls 52 and 54, as shown by FIG. 6. Bolt and nut combinations 198 secure those side flanges, and hence the platform 194, to those side walls. Four rectangular slots are formed in the platform 194; and the long axes of those slots extend transversely of the forward edge of the platform 96 and of the long arm of the offset 94.

Each of the slots in the platform 194 accommodates a molded housing 200 for a photocell and a lamp; and each molded housing 200 has a partition which keeps the light from the lamp from passing directly to the photocell. Generally U-shaped brackets 202 accommodate portions of the molded housings; and those brackets have fingers which extend into the slots in the platform to hold those brackets in assembled relation with that platform. Screws 204 extend through openings in the closed ends of the brackets 202 and seat in threaded sockets within the said portions of the molded housings 200; and hence those screws will coact with the brackets 202 to fixedly secure the molded housings 200 to the platform 194.

A lamp 206 and a photocell 214 are mounted in one molded housing 200, a lamp 208 and a photocell 216 are mounted in the second molded housing 200, a lamp 210 and a photocell 218 are mounted in the third molded housing 200, and a lamp 212 and a photocell 220 are mounted in the fourth molded housing 200. As indicated particularly by FIG. 7, the lamp 206 directs its light toward the opening 132 in the platen 92, and the photocell 214 will receive the light which is reflected back from that portion of a bill which overlies that opening. The lamp 208 directs its light toward the opening 134 in the platen 92, and the photocell 216 will receive the light which is reflected back from that portion of a bill which overlies that opening. The lamp 210 directs its light toward the opening 136 in the platen 92, and the photocell 218 will receive the light which is reflected back from that portion of the bill which overlies that opening. The lamp 212 directs its light toward the opening 138 in the platen 92, and the photocell 220 will receive the light which is reflected back from the portion of the bill which overlies that opening. The molded housings 200 are vertically-directed and have the upper ends thereof close to the under face of the platen 92, as shown by FIG. 18.

The numeral 222 generally denotes a bill-blocking member; and that member is shown in front elevation in FIG. 13, and it is shown in cross section in FIGS. 19 and 23. That member has end portions 224 which are generally horizontally-directed; and those end portions have upwardly-extending arms 226. Pivots 228 project outwardly from the outer faces of the arms 226; and those pivots are lodged within the openings 72 and 74 in the side walls 52 and 54, as shown by FIG. 8. A flange 230 is provided adjacent the front of the bill-blocking member 222, and that flange extends downwardly to help stiffen that bill-blocking member. Four arms 232 extend upwardly from the front of the bill-blocking member 222; and those arms incline rearwardly, as shown by FIGS. 19 and 23. A finger 234 is provided at the upper end of each of the arms 232; and those fingers are in register with the openings 106 in the platen 92, as shown by FIG. 7. Four arms 236 extend upwardly from the rear of the bill-blocking member 222; and those arms incline rearwardly, as shown by FIGS. 19 and 23. A finger 238 is provided on the upper end of each of the arms 236; and those fingers are in register with the openings 108 in the platen 92, as shown by FIG. 7. The arms 232 and 236 and the fingers 234 and 238 of the bill-blocking member 222 are dimensioned so the fingers 238 will project above the level of the upper surface of the platen 92 whenever the upper ends of the fingers 234 are below that level, and so the fingers 234 will project above that level whenever the upper ends of the fingers 238 are below that level. The pivots 228 enable the bill-blocking member 222 to rotate easily between the solid-line position and the dotted-line position shown in FIG. 23.

The numeral 240 denotes an L-shaped bracket which is secured to the bill-blocking member 222 adjacent the rear of that member; and that bracket is shown by FIGS. 6 and 22. That bracket has a vertically-directed portion which has a horizontally-directed slot therein, and that slot accommodates a fastener 246 such as a cotter key. That fastener extends through a yoke formed in the upper end of the plunger of a solenoid 242, and also extends through the slot in the vertically-directed portion of the bracket 240. The solenoid 242 is secured to the side wall 54 by screws 244. A helical compression spring 248 bears against the upper surface of the solenoid 242 and also bears against the lower surface of the fastener 246; and that spring urges that fastener, the bracket 240, and the rear of the bill-blocking member 222 upwardly. The bill-blocking member 222 will normally be in the solid-line position shown by FIG. 23; but whenever the solenoid 242 is energized, the plunger of that solenoid will pull the fastener 246 downwardly and will act through the bracket 240 to rotate the bill-blocking member 222 to the dotted-line position shown in FIG. 23. This means that the fingers 238 will normally be in bill-blocking position and the fingers 234 will normally be out of bill-blocking position; but that whenever the solenoid 242 is energized the fingers 238 will be moved out of bill-blocking position and the fingers 234 will be moved into bill-blocking position.

The numeral 250 denotes a second platen; and that platen is part of the upper section of the currency detector. That platen has an upwardly-extending side wall 252, and it also has an upwardly-extending side wall 254. In addition, that platen has an upwardly-extending front wall 260. As indicated particularly by FIGS. 5 and 6, the side walls 252 and 254 are spaced apart a smaller distance than are the side wall 52 and 54.

A generally horizontally-directed offset 262 is provided in the front wall 260 adjacent the lower edge of that wall; and that lower edge merges into a downwardly-extending offset 256 at the front of the platen 250. The offset 256 is arcuate in cross section, as shown by FIG. 19; and that offset is generally in register with the long arm of the offset 94 of the platen 92. The offset 256 extends to, and merges with, an offset 258 at the right-hand side of the platen 250 as that platen is viewed in FIG. 10. The offset 258 is formed at the laterally-offset bottom of an extension 259 of the side wall 252. The offset 258 is arcuate in cross section, as shown by FIGS. 13–15; and that offset is generally in register with the short arm of the offset 94 of the platen 92. An ear 261 on the extension 259 is suitably secured to the outer surface of the side wall 252 to help support and strengthen that extension. The platen 250, the side walls 252 and 254, the front wall 260, and the extension 259 constitute the upper section of the currency detector. The offsets 94, 256 and 258 coact to define a corner entry slot for the currency detector; and such an entry slot is desirable because it can initially provide point contact rather than line contact with the leading edge of a bill.

The platen 250 has a downwardly-inclined trailing edge 263; and the inclination of that trailing edge is shown by FIG. 19. That trailing edge has three notches 314 therein, as shown by FIG. 10; and those notches extend forwardly into the horizontally-directed portion of the platen 250.

The numeral 265 in FIG. 10 denotes an opening in the side wall 254 adjacent the rear edge of that side wall; and that opening is disposed a short distance above the upper surface of the platen 250. A similar opening, not shown, is provided in the side wall 252; and that opening and the opening 265 are alined. Washers 268 are disposed at the outer faces of the walls 252 and 254 immediately adjacent the opening 265 and its counterpart. Screws 269 with reduced-diameter, smooth ends extend through the openings 86 and 130 in side wall 54 and in side flange 112 and through the counterparts of those openings in side wall 52 and in side flange 110, and then extend through the washers 268 to seat in the opening 265 and in its counterpart in the side wall 252. Those reduced-diameter, smooth ends serve as pivots for the upper section of the currency detector.

The numeral 271 denotes an opening in the side wall 252, and that opening is indicated by dotted lines in FIG. 16. That opening is below the level of the opening which is the counterpart of the opening 265; and, further, the opening 271 is in register with the openings 84 and 128, respectively, in the side wall 52 and in the side flange 110.

The numeral 273 denotes two L-shaped brackets which are disposed at the outer faces of the side walls 252 and 254. The long arms of those brackets abut those outer faces, and the short arms of those brackets project outwardly at right angles from those outer faces. Springs 274 which have upper and lower semi-cylindrical sockets therein are secured to the brackets 273 and to the side walls 252 and 254 by fasteners 277, such as screws. The brackets 273 have oversized openings therein to accommodate the shanks of the screws 277; and those openings permit those brackets to be moved up and down short distances relative to the side walls 252 and 254. The short arms of those brackets rest upon the upper edges of the side walls 52 and 54, whenever the upper section of the currency detector is in the closed position of FIGS. 1 and 3, to hold the platen 250 parallel to, and a short distance above, the platen 92.

The semi-cylindrical sockets of the springs 274 are dimensioned to accommodate the surfaces of the studs 88 and 90 which project outwardly from the side walls 52 and 54 of the lower section of the currency detector. The uppermost of the semi-cylindrical sockets of the springs 274 will accommodate the studs 88 and 90 whenever the upper section of the currency detector is in the closed position shown by FIGS. 1 and 3. The lowermost sockets of the springs 274 will accommodate the studs 88 and 90 whenever the upper section of the currency detector is in the open position shown by FIG. 2. The springs 274 are stiff, and they will strongly resist accidental movement of the upper section of the currency detector to its open position. Further, once that upper section has been moved to that open position, those springs will strongly resist accidental movement of that upper section to its closed position. However, the semi-cylindrical configurations of the sockets of those springs enable a firm and steady application of force to the upper section of the currency detector to cause that upper section to move to its open position or to its closed position.

When the upper section of the currency detector is in the closed position of FIGS. 1 and 3, the platen 250 will be parallel to and closely adjacent the platen 92. As a result, those platens will define the upper and lower limits of a shallow testing area for paper currency. Further, those platens and the offsets thereof will strongly resist the insertion of undesired objects into that testing area. When the upper section of the currency detector is moved to the open position shown by FIG. 2, the platens 92 and 250 will provide access to the testing area of the currency detector, and will thereby permit any undesired objects to be removed.

The numeral 278 denotes part of the front wall of a change-making device with which the currency detector of the present invention can be used. That front wall is vertically-directed; and the rear face of that wall will abut the front face of the front wall 260 of the upper section of the currency detector whenever that upper section is in its normal, closed position, as shown by FIG. 3. As a result, the front walls 278 and 260 will normally coact to prevent access to the interior of the housing for the change-making device. An L-shaped bracket 279 is fixedly secured to the rear face of the front wall 278; and the short arm of that bracket has a slot 281 therein. The bracket 279 and the slot 281 therein are shown particularly by FIG. 4.

The numeral 284 denotes a lock which is held within a hole in the front wall 260 of the upper section of the currency detector. That lock has a latch 286 secured to and movable with the rotatable part thereof; and that latch and that movable part can be rotated whenever the proper key 288 is inserted in the lock 284. An ear 290 on the latch 286 is dimensioned to fit within the slot 281 in the L-shaped bracket 279; and an offset 292 of the latch 286 is intended to underlie the short arm of the bracket 279. The latch 286, the ear 290 thereof, and the offset 292 thereof are shown in detail in FIG. 4.

In the normal position of the latch 286, the offset 292 will underlie the short arm of the bracket 279 and thereby prevent upward movement of the upper section of the currency detector of the present invention. Whenever that offset underlies that short arm, the ear 290 will the upper section of the currency detector of the present invention to its open position, it is only necessary to insert the key 288 into the lock 284 and to rotate that key in the counter clockwise direction in FIG. 1. That rotation will move the ear 290 out of the slot 281 and will move the offset 292 out from under the short arm of the bracket 279. At such time, the application of an upwardly-directed force to the offset 256 or the application of rearwardly-directed force to the upper part of the front wall 260 will cause the upper section of the currency detector to move from its normal closed position to the open position shown by FIG. 2. To permit that upper section to move all the way to the position shown by FIG. 2, the key 288 should be removed before that upper section is moved.

Four alined openings 294 are provided in the platen 250 adjacent the offset 256, as shown particularly by FIG. 10. Those openings are frusto-conical; and they are larger where they open to the lower face of the platen 250 than they are where they open to the upper face of that platen. Those openings will be in register with the openings 106 in the platen 92, as shown by FIGS. 13–15, whenever the upper section of the currency detector is in its closed position. The openings 294 will accommodate the upper ends of the fingers 234 on the arms 232 of the bill-blocking member 230 whenever that member is moved to the dotted-line position of FIG. 23.

Two slots 296 are provided in the platen 250; and the long axes of those slots extend transversely of the offset 256. One of the slots 296 is between one of the endmost and one of the centermost openings 294; and the other of those slots is between the other endmost opening 294 and the other centermost opening 294. The slots 296 will be in register with the slots 118 in the platen 92, as shown by FIGS. 13–15, whenever the upper section of the currency detector is in its normal, closed position.

The numeral 298 denotes two frusto-conical openings in the platen 250; and those openings are spaced rearwardly of the slots 296 in that platen. Those openings will be in register with the shallow concave recesses 104 in the platen 92, as shown by FIG. 23, whenever the upper part of the currency is in its normal, closed position. A frusto-conical opening 300 is provided in the platen 250 to the right of the left-handmost opening 298, as those openings are viewed in FIG. 10. A second frusto-conical opening 302 is provided in the platen 250 to the right of the opening 300, as those openings are viewed in FIG. 10. A third frusto-conical opening 304 is provided in the platen 250; and that opening is spaced to the right of the opening 302, as those openings are viewed in FIG. 10. The openings 298, 300, 302 and 304 are larger where they open to the lower face of the platen 250 than they are where they open to the upper face of that platen.

A large rectangular opening 306 is formed in the platen 250; and that opening has the long axis thereof parallel to the offset 256. That opening is disposed to the right of the opening 302 but is disposed to the left of the right-handmost opening 298, as those openings are viewed in FIG. 10. A flange 308 is bent upwardly adjacent the rear edge of the opening 306; and that flange is shown in cross section in FIG. 19. That flange will serve as an inclined plane to any part of an inserted bill which engages that flange; and that flange will thus keep any part of an inserted bill from rising up and jamming within the opening 306.

Two slots 310 are provided in the platen 250; and the long axes of those slots are alined with the long axes of the slots 296 in that platen. The slots 310 are disposed rearwardly of the slots 296; and they will be in register with the slots 120 in the platen 92, as shown by FIGS. 16 and 17, whenever the upper section of the currency detector is in its normal, closed position.

Four alined openings 312 are formed in the platen 250 adjacent the trailing edge 263 of that platen. Those openings are frusto-conical; and they are larger where they open to the lower face of the platen 250 than they are where they open to the upper face of that platen. The openings 312 will be in register with the openings 108 in the platen 92, as shown by FIG. 23, whenever the upper section of the currency detector is in its normal, closed position. The openings 312 will accommodate the upper ends of the fingers 238 on the arms 236 of the bill-blocking member 222 whenever that member is in the solid-line position of FIG. 23.

A slot 316 is formed in the platen 250 intermediate the slots 310 and rearwardly of the opening 306. The long axis of that slot extends transversely of the offset 256; and the rear edge of that slot is spaced forwardly of the trailing edge 263 of the platen 250. A slot 318 is formed in the platen 250, and that slot extends into the trailing edge 263 of that platen. The slot 318 is disposed to the left of the slot 316, as those slots are viewed in FIG. 10. The slot 316 overlies and is in register with the slot 126 in the platen 92; and the slot 318 overlies and is in register with the notch 124 in the platen 92.

Two pivots 320 are mounted on the side walls 252 and 254; and those pivots extend inwardly from the inner faces of those side walls. Those pivots are spaced short distances rearwardly of the brackets 273, as shown by FIGS. 5 and 11; and those pivots are spaced only short distances above the upper face of the platen 250, as shown by FIGS. 18 and 23. Spacers 324 encircle those pivots and space levers 322 inwardly from the inner faces of those side walls. Those levers are maintained in assembled relation with the pivots 320 by securing members 326, such as C-washers. The levers 322 are generally horizontal, as shown by FIG. 23.

The levers 322 have openings therein adjacent the trailing ends thereof; and those openings accommodate bushings 328. Those bushings are alined with each other; and they accommodate the ends of an elongated shaft 330. One end of that shaft is immediately adjacent the inner face of the side wall 254, while the other end of that shaft extends freely through opening 271 in side wall 252, opening 128 in side flange 110, and opening 84 in side wall 52. Those openings are alined and are large enough to permit the shaft 330 to move radially within them as the upper section of the currency detector is moved between its closed and open positions. Securing members 332, such as C-washers, abut the outer faces of the bushings 328 and are fixed to the shaft 330 to prevent axial shifting of that shaft while permitting free rotation of that shaft relative to the levers 322.

Pins 334 are secured to and extend inwardly from the side walls 252 and 254. Those pins are disposed forwardly of, and above the level of, the pivots 320, as shown by FIG. 23. Helical extension springs 336 have the upper ends thereof hooked around the pins 334 and have the lower ends thereof hooked through openings in the front ends of the levers 322, as shown by FIG. 23. Those springs bias the levers 322 for rotation in the clockwise direction in FIG. 23, and thus urge the shaft 330 downwardly toward the shaft 160.

A spur gear 339 is mounted on and rotatable with the righthand end of the shaft 330 as that shaft is viewed in FIG. 11. The teeth of that spur gear fully mesh with the teeth of the spur gear 168 whenever the upper section of the currency detector is in its closed position. The teeth on the spur gears 168 and 339 will move away from each other as the upper section of the currency detector is moved to the open position shown by FIG. 2. The spur gears 168 and 339 are formed and dimensioned so the shafts 160 and 330 will rotate at the same angular rate whenever the teeth of those gears fully mesh.

Three rollers 341 are mounted on and rotate with the shaft 330; and each of those rollers has a surface with a high coefficient of friction. The rollers 341 are disposed within the notches 314 in the platen 250 and in the trailing edge 263 of that platen, as shown by FIG. 10. Those rollers are in vertical registry with the rollers 166 on the shaft 160; and, whenever the upper section of the currency detector is in its closed position, the surfaces of the rollers 341 will engage the surfaces of the rollers 166. However, when the upper section of the currency detector is moved to its open position, the surfaces of the rollers 341 will be spaced a short distance away from the surfaces of the rollers 166.

The numeral 342 denotes two bushings which are mounted on the shaft 330; and there is enough clearance between the inner surfaces of those bushings and the surface of the shaft 330 to permit free relative rotation of that shaft and those bushings. Securing members 344, such as C-washers, abut the outer faces of the bushings 342 and are fixed to the shaft 330 to prevent axial movement of the bushings 342.

A lever 346 has a hub that loosely telescopes over the shaft 330, and that lever is shown in FIGS. 19–21. That lever has an ear 348 adjacent the upper end thereof, and that ear has an opening therein. The lower end of the lever 346 normally extends through the slot 318 in the platen 250, across the space between the platens 250 and 92, and into the notch 124 in the latter platen. A securing member 349, such as a C-washer, abuts the hub of the lever 346 and is fixed to the shaft 330 to prevent axial movement of that lever relative to that shaft while permitting free rotation of that lever relative to that shaft.

The numeral 350 denotes a lever which has a hub that loosely telescopes over the shaft 330; and that lever is shown in FIGS. 19–21. One end of the hub of the lever 350 abuts one end of the hub of the lever 346, as shown by FIG. 11. A securing member 357, such as a C-washer, abuts the other end of the hub of the lever 350 and is fixed to the shaft 330 to prevent axial movement of that lever relative to that shaft while permitting free relative rotation of that lever relative to that shaft. A foot 352 is provided on the forward end of the lever 350; and that foot is in register with the slots 316 and 126, respectively, in the platens 250 and 92. That foot can extend through the slot 316, across the space between the platens 250 and 92, and into the slot 126 in the latter platen, all as shown by FIG. 21. The lever 350 has an ear 354 adjacent the rear end thereof; and that ear has an opening therein which is in alinement with the opening in the ear 348 on the lever 346. A second ear 356 is provided on the lever 350 adjacent the rear end of that lever; and that ear extends to the right from the lever 350, as that ear and lever are viewed in FIG. 11. A helical extension spring 364 has one end thereof hooked through the opening in the ear 348 on the lever 346 and has the other end thereof hooked through the opening in the ear 354 on the lever 350. That spring biases the upper end of the lever 346 toward the right-hand end of the lever 350, as those levers are viewed in FIG. 19; and that spring will normally hold the ear 348 on the lever 346 in engagement with the upper edge of the lever 350. However, that spring can yield to permit the upper end of the lever 346 to move away from the right-hand end of the lever 350, as shown by FIGS. 20 and 21.

The numeral 358 denotes a bracket which is secured to, and which extends upwardly and rearwardly from, the upper face of part of the trailing edge 263 of the platen 250, as shown by FIG. 19. That bracket supports a switch 360; and that switch has an arm 362 which extends forwardly from that switch and overlies the ear 356 on the lever 350. The internal spring, not shown, of the switch 360 biases the forward end of the switch arm 362 downwardly, and thus causes that arm to apply a downward force to the ear 356 of the lever 350. That lever will normally respond to that force to bear against the upper surface of the platen 92, as shown by FIG. 19. The lever 346 will normally respond to the spring 364 to assume the generally vertical position shown by FIG. 19. The levers 346 and 350 coact to constitute a bill-responsive actuator for the switch 360.

The numeral 366 denotes a sub-frame which is disposed above the platen 250 and is intermediate the slots 310 in that platen, as shown by FIG. 11. That sub-frame is shown in plan view in FIG. 11, in longitudinal section in FIGS. 16 and 17, and in transverse section in FIG. 22. That sub-frame has a downwardly-extending flange at the front edge thereof to stiffen that sub-frame, and it has downwardly-directed flanges at the opposite ends thereof. The downwardly-extending flanges at the opposite ends of the sub-frame 366 extend rearwardly beyond the rear edge of that sub-frame, and those flanges serve as arms 368 which are pivotally secured to the shaft 330 by the bushings 342. Those bushings and those arms permit the sub-frame 366 to move up and down relative to the platen 250. Pivots 370 are secured to, and project outwardly from, the downwardly-directed flanges at the opposite ends of the sub-frame 366. Those pivots are alined, and they rotatably support rollers 372 which have surfaces with high coefficients of friction. The sub-frame 366 holds the rollers 372 in register with the slots 310 in the platen 250, as shown particularly by FIGS. 16 and 17; and this means that the rollers 372 are in register with the rollers 178 which are mounted on the shaft 174. Securing members 373, such as C-washers, abut the outer faces of the rollers 372 and are fixed to the pivots 370 to prevent axial movement of those rollers relative to those pivots while permitting free rotation of those rollers relative to those pivots. A bracket 374 is secured to the upper surface of the sub-frame, and that bracket had a portion thereof which is offset above that upper surface; and that offset portion has an opening therein. A slot 376 is formed in the sub-frame 366 at a point to the left of the bracket 374, as that slot and bracket are viewed in FIGS. 16 and 17.

The numeral 378 denotes a bracket which is U-shaped in plan, and which has the closed end thereof secured to the rear face of the front wall 260. Threaded studs 384 are secured to and project rearwardly from the front wall 260, and openings in the closed end of the bracket 378 telescope over those studs. Nuts 382 are threaded onto the studs 384; and those nuts and studs hold the bracket 378 is assembled relation with the front wall 260. An elongated pivot 386 is supported by the arms of the bracket 378; and that pivot is disposed below the level of the offset 262 in front wall 260, as shown by FIG. 3.

The numeral 388 denotes a sub-frame which is disposed above the platen 250 and is intermediate the slots 296 in that platen, as shown by FIG. 11. That sub-frame is shown in plan view in FIG. 11, in longitudinal section in FIGS. 13–15, and in transverse section in FIG. 19. That sub-frame has a downwardly extending flange at the rear edge thereof, and that flange helps stiffen that sub-frame. That sub-frame also has downwardly-extending flanges at the opposite ends thereof; and those flanges extend forwardly beyond the front edge of that sub-frame to serve as arms 390. Those arms have openings therein which telescope over the elongated pivot 386; and those arms and that pivot permit that sub-frame to move up and down relative to the platen 250. Pivots 392 are secured to, and project outwardly from, the downwardly-extending flanges at the opposite ends of the sub-frame 388. Those pivots are alined, and they rotatably support rollers 394 which have surfaces with high coefficients of friction. The sub-frame 388 holds the rollers 394 in register with the openings 296, as shown by FIGS. 13–15; and this means that the rollers 394 are in register with the rollers 190 which are mounted on the shaft 186. Securing members 396, such as C-washers, abut the outer faces of the rollers 394 and are fixed to the pivots 392 to prevent axial shifting of those rollers relative to those pivots while permitting free rotation of those rollers relative to those pivots. A bracket 398 is secured to the upper surface of the sub-frame 388; and that bracket has a portion thereof which is offset above that upper surface; and that offset portion has an opening therein. A slot 400 is formed in the sub-frame 388 at a point to the left of the bracket 398, as that slot and bracket are viewed in FIGS. 13–15.

A helical extension spring 402 has one end thereof hooked through the opening in the offset portion of the bracket 398 on the sub-frame 388, and has the other end thereof hooked through the opening in the offset portion of the bracket 374 on the sub-frame 366. That spring is under tension at all times, and will thus bias the brackets 374 and 398 toward each other—thereby biasing both of the sub-frames 366 and 388 downwardly toward the platen 250. However, that spring can yield to permit movement of the sub-frame 366 or movement of the sub-frame 388 upwardly away from the platen 250.

The numeral 404 denotes a bracket which is secured to the side wall 252 by screws 405, and that bracket is shown in FIG. 11. That bracket has an offset which spaces the front portion of that bracket inwardly of the plane defined by the side wall 252. That front portion has a switch 406 bolted to it; and that switch has an arm 408. A semi-spherical, bill-receiving button 410 is secured to the free end of the arm 408; and that button is in register with the right-hand opening 298 in the platen register with the right-hand opening 298 in the platen 250, as that platen is viewed in FIG. 11. Normally, the lower surface of the button 410 will extend downwardly through the said opening 298 and rest within the shallow, concave recess 104 which is below and in register with the said opening 298, as shown particularly by FIG. 23. However, the button 410 can be raised upwardly to the dotted-line position shown in FIG. 23 by an inserted bill; and when it is so raised, that button will cause the arm 408 to actuate the switch 406.

The numeral 412 denotes a bracket which is similar to the bracket 404; but the bracket 412 is secured to the side wall 254, as by screws 413. The bracket 412 has a switch 414 bolted to it; and that switch has an arm 416. A semi-spherical, bill-receiving button 418 is secured to the free end of the arm 416; and that button is in register with the left-hand opening 298 in the platen 250, as that platen is viewed in FIG. 11. The lower portion of the button 418 normally extends through the said opening 298 and rests within the shallow, concave recess 104 is below and in register with the said opening 298. However, the button 418 can be raised to a position comparable to the dotted-line position shown in FIG. 23 by an inserted bill; and when it is so raised, that button will cause the arm 416 to actuate the switch 414.

The numeral 420 denotes a vertically-directed wall that has flanges at the opposite ends thereof, and those flanges abut the confronting faces of the walls 252 and 254 of the upper section of the currency detector, as shown by FIG. 18. Those flanges extend rearwardly from the wall 420; and that wall also has a rearwardly-extending flange at the top thereof, as shown by FIGS. 18 and 23. Screws 422 extend through openings in the side walls 252 and 254 and seat in threaded openings in the flanges at the ends of the wall 420 to secure that wall to those side walls. The wall 420 has an arcuate slot 424 therein; and that slot is shown in FIGS. 13–15 and 18. That slot extends from upper left to lower right in FIGS. 13–15. A circular opening 425 is provided in the wall 420 above the level of the slot 424, as that opening and slot are viewed in FIGS. 13–15.

A vertically-directed wall 426 has flanges at the opposite ends thereof which abut the inner faces of the walls 252 and 254. That wall is spaced rearwardly of the wall 420, but is parallel to the wall 420. The flanges on the wall 426 extend rearwardly from that wall, as shown particularly by FIG. 23; and screws 428 extend through openings in the side walls 252 and 254 and seat in threaded openings in the flanges at the opposite ends of the wall 426 to secure that wall to those side walls.

A gear housing 430 is secured to the wall 426 by screws 432; and that gear housing has a motor 434 secured to it. The output shaft of the gear housing 430 is denoted by the numeral 436; and that shaft extends forwardly through an opening in the wall 426 and into a bushing 438 which is disposed within an opening in the wall 420.

The numeral 440 denotes a bracket that is generally U-shaped, as shown by FIG. 5; and that bracket has the closed end thereof secured to the inner face of the wall 254 by screws 442. That bracket is intermediate the wall 420 and the wall 426, and it is also disposed above the level of the shaft 436. That bracket supports five switches 444, 446, 448, 450 and 452; and the terminals of those switches extend upwardly and project above the upper edges of the side wall 254. As shown by FIGS. 27–29, switches 444 and 446 are single pole, double throw switches and switches 448, 450 and 452 are single pole, single throw switches. However, for simplicity of manufacture, all of those switches can be single pole, double throw switches and one pole of each of the switches 448, 450 and 452 can be left unconnected. Each of the switches 444, 446, 448, 450 and 452 has a movable arm; and each of those arms has a roller rotatably mounted at the free end thereof.

Cams 454, 456, 458, 460, 462, 465 and 467 are mounted on and rotate with the output shaft 436 of the gear housing 430. The cam 454 is disposed forwardly of the wall 420, as shown by FIG. 12; and that cam is a single lobe cam. The lobe of that cam has an effective length of about one hundred and twenty-five degrees. The cams 456, 458, 460, 462, 465 and 467 are all disposed intermediate the walls 420 and 426, as indicated particularly by FIG. 22. The cam 456 is a single notch cam, and the notch in that cam has an effective length of about thirty-five degrees. The notch of that cam is displaced approximately forty-five degrees forwardly of the lobe on the cam 454. The cam 458 also is a single notch cam, and the notch of that cam has an effective length of about thirty degrees. The configurations of the cams 456 and 458 are similar; but the notch of the cam 458 is displaced approximately ten degrees rearwardly of the notch of the cam 456. The cam 460 has a long notch and a short notch; and the short notch has an effective length of forty degrees whereas the long notch has an effective length of about one hundred and fifty-five degrees. A short dwell, that has an effective length of about sixty degrees, precedes the short notch; and a long dwell, that has an effective length of about one hundred and five degrees, follows that notch. The short notch of the cam 460 is displaced approximately thirty-five degrees rearwardly of the notch in the cam 458. The cam 462 is another single notch cam, and the notch of that cam has an effective length of about thirty degrees. The notch of the cam 462 is displaced approximately one hundred and twenty degrees rearwardly of the short notch in the cam 460. The cam 465 also is a single notch cam, and the notch of that cam has an effective length of about one hundred and fifty-five degrees. The notch of the cam 465 is displaced approximately twenty-five degrees rearwardly of the notch in the cam 462. The cam 467 is a single lobe cam, and that cam is shown particularly by FIGS. 16 and 17. The lobe of that cam has an effective length of about two hundred and thiry-five degrees. The lobe of the cam 467 is displaced approximately eighty degrees rearwardly of the lobe on the cam 454. The roller on the arm of switch 444 engages the cam 456, the roller on the arm of switch 446 engages the cam 458, the roller on the arm of switch 448 engages the cam 460, the roller on the arm of switch 450 engages the cam 462, and the roller on the arm of switch 452 engages the cam 465.

The numeral 468 denotes a bolt which is held in assembled relation with the wall 420 by a nut 469; and that bolt is shown in plan view in FIGS. 5 and 12 and in front elevation in FIGS. 13–15. That bolt extends forwardly from the wall 420; and it has an annular groove 470 therein adjacent the front thereof. As indicated by FIGS. 13–15, the bolt is disposed to the left of, and slightly below the level of, the output shaft 436.

The numeral 474 denotes an elongated lever which has a circular loop adjacent the right-hand end thereof, as that lever is viewed in FIGS. 13–15. That loop surrounds and is supported by an eccentric 473, which is mounted on and rotates with the output shaft 436. That eccentric is mounted intermediate the bushing 438 and the cam 454 as shown by FIG. 5. The lower edge of the lever 474 is lodged within and guided by the annular groove 470 in the bolt 468; and that groove serves as a fulcrum for that lever. A notch 476 is provided in the lower edge of the lever 474 adjacent the left-hand end of that lever, as that lever is viewed in FIGS. 13–15.

The numeral 478 denotes a bracket which is secured to the rear face of the wall 420 by screws 480; and FIG. 12 shows the bottom of that bracket, FIG. 18 shows the rear of that bracket, and FIG. 19 shows a cross section of that bracket. The bracket 478 has an ear 479 which extends rearwardly from the upper edge of that bracket; and that ear has a vertically-directed, threaded opening therein. The screws 480 extend through over-sized openings in the wall 420; and hence those screws and the bracket 478 can be moved up and down short distances. A notch 482 is formed in the rear edge of the rearwardly-extending flange at the top of the wall 420; and that notch overlies, and is in register with, the threaded opening in the ear 479 on the bracket 478. That notch accommodates an annular groove in the head of a screw 484; and the shank of that screws is threaded into the threaded opening in the ear 479 on the bracket 478. As a result, rotation of the screw 484 will adjust the vertical position of the bracket 478. Once the desired vertical position has been attained, the screws 480 can be tightened to fixedly hold the bracket 478 in that position. A pivot 486 is carried by, and extends rearwardly from, the bracket 478. The front end of that pivot projects forwardly a short distance from the front face of the bracket 478; and that front end extends into the opening 425 in the wall 420, as shown particularly by FIG. 19. The diameter of the opening 425 is large enough to accommodate movement of the pivot 486 as the bracket 478 is moved up and down by rotation of the screw 484.

The numeral 488 denotes a pendulum which has a hub that is rotatably supported on the pivot 486; and that hub spaces that pendulum rearwardly of the wall 420, as shown particularly by FIG. 19. A securing member 499, such as a C-washer, is fixed to the pivot 486 and will hold the pendulum 488 in assembled relation with the pivot 436 while permitting ready oscillation of that pendulum relative to that pivot. A massive weight 490 is secured to the rear face of the pendulum 488 by nut and bolt combinations 491; and that weight is below the level of the pivot 486. A magnetic head 492 is secured to the rear face of the pendulum 488, adjacent the lower end of that pendulum, by a nut 493. A thickness detector 494, shown as an elongated screw, is held within a threaded passage in the weight 490.

Whenever the pendulum 488 is vertical, the lower end of the thickness detector 494 will be disposed above the level of the lower-most portion of the magnetic head 492 a distance which is a simple fraction of the thickness of an authentic bill. Also, when that pendulum is vertical, the lowermost portion of the magnetic head 492 will be spaced above the upper surface of the pad 116 in the recess 114 a distance that is a simple fraction of the thickness of an authentic bill. To set the distance between the lowermost portion of the magnetic head 492 and the upper surface of the pad 116, an authentic bill will be placed on the platen 92 and the pendulum will be rotated in the clockwise direction in FIG. 13, until it is only about forty degrees below the horizontal, and will then be released. If the magnetic head 492 generates voltage variations of too high a frequency, the screw 484 will be rotated to lower the bracket 478. On the other hand, if the magnetic head 492 generates voltage variations of too low a frequency, the screw 484 will be rotated to raise that bracket. To set the distance by which the lower end of the thickness detector 494 should be disposed above the level of the lowermost portion of the magnetic head 492, an object of undesired thickness will be placed on the platen 92 and the pendulum will be rotated in the clockwise direction in FIG. 13, until it is only about forty degrees below the horizontal, and will then be released. If the magnetic head 492 generates voltage variations of the frequency specified for the currency detector, the thickness detector 494 will be rotated to lower the lower end thereof. That lower end will be properly set when it permits the magnetic head 492 to generate voltage variations of the specified frequency as that magnetic head senses an authentic bill, but causes that magnetic head to generate voltage variations of too low a frequency as that magnetic head senses an object of undesired thickness.

The mass of the weight 490, the mass of the magnetic head 492, and the mass of the thickness detector 494 coact to bias the pendulum 488 to the position shown by FIG. 15. However, that pendulum can be moved in the clockwise and counter clockwise directions relative to that position. The closer the pendulum 488 is moved to the horizontal, the greater the bias on that pendulum will be.

When the lowermost portion of the magnetic head 492 engages an inserted bill, that magnetic head will be in register with the lever 350. This means that the portion of an inserted bill which is engaged by the magnetic head 492 will, if that bill is accepted, subsequently be engaged by the foot 352 of the lever 350.

The numeral 496 denotes a pin that is secured to and that projects forwardly from the pendulum 488. The forward end of the pin 496 extends through the arcuate slot 424 in the wall 420 and projects forwardly beyond the front face of that wall. As indicated by FIGS. 5 and 19, the front end of the pin 496 extends through the plane in which the lever 474 lies. As indicated by FIG. 13, the notch 476 in the lower edge of the lever 424 can accommodate the forward end of the pin 496.

The numeral 498 denotes a pivot which extends forwardly from the front face of the wall 420; and a nut 501 is threaded onto that portion of the shank of that pivot which extends rearwardly from the rear face of that wall. That nut will hold that pivot in assembled relation with that wall. The pivot 498 rotatably supports an L-shaped lever 500; and that lever is disposed rearwardly of the lever 474. The long arm of the lever 500 depends downwardly from the pivot 498, and that arm is disposed to the right of the pin 496, as that lever and pin are viewed in FIGS. 13–15. The short arm of the lever 500 extends to the left from the pivot 498, as that arm and pivot are viewed in FIGS. 13–15. An ear 502 on that short arm projects forwardly from that arm and overlies the upper edge of the lever 474.

The numeral 504 denotes a female connector which can accommodate a male connector, not shown. The connector 504 is connected to the magnetic head 492 by flexible leads, not shown; and the male connector is connected to the magnetic sensing circuitry of the currency detector. The connector 504 is secured to the wall 426 by nut and bolt combinations 506.

The numeral 508 denotes an L-shaped bracket which has the short arm thereof vertically directed and in abutting relation with the lower part of the rear face of the wall 420, as shown by FIG. 18. The long arm of that bracket extends horizontally and rearwardly from that wall. Screws 510 extend through openings in the short arm of the bracket 508 and seat in threaded openings in the wall 420. The long arm of the bracket 508 has two, generally-rectangular openings therein; and each of those openings accommodate a molded housing 512. The molded housings 512 are similar to the molded housings 200 which are supported by the platform 194 which is disposed below the platen 92. Generally U-shaped brackets 522 and screws 524 hold the molded housings 512 in position within the openings in the bracket 508. One of those molded housings contains a lamp 514 and a photocell 518, and the other of those molded housings contains a lamp 516 and a photocell 520. Each of those molded housings has a partition which keeps the light from the lamp therein from directly engaging the photocell therein.

The numeral 526 denotes a pivot which is secured to and extends forwardly from the wall 420; and that pivot is disposed to the right of, and below the level of, the bolt 468, as that pivot and bolt are viewed in FIGS. 13–15. That pivot rotatably supports an elongated lever 528; and a securing member 530, such as a C-washer, holds the lever 528 in assembled relation with the pivot 526 while permitting ready rotation of that lever relative to that pivot. The right-hand end of the lever 528 underlies the cam 454, as that lever is viewed in FIGS. 13–15. The left-hand end of that lever extends through a slot in a vertically-directed connecting bar 532; and the upper end of that slot fits down into a notch in the upper edge of that left-hand end. The lower end of the connecting bar 532 extends downwardly through the slot 400 in the sub-frame 388; and a pin 536 extends through an opening in that lower end. That pin underlies the upper surface of the sub-frame 388; and it will enable upward movement of the connecting bar 532 to raise that sub-frame.

The numeral 538 denotes a pivot which is secured to and extends forwardly from the wall 426; and that pivot is disposed to the left of, and below the level of, the shaft 436, as that pivot and shaft are viewed in FIGS. 16 and 17. A lever 540, which is similar to the lever 528, is rotatably mounted on the pivot 538; and a securing member 542, such as a C-washer, maintains the lever 540 in assembled relation with the pivot 538 while permitting rotation of that lever relative to the pivot. The right-hand end of the lever 540 underlies the cam 467, as that lever and cam are viewed in FIGS. 16 and 17. The left-hand end of that lever extends into a slot in a connecting bar 544; and the upper end of that slot fits down into a notch in the upper edge of that left-hand end. The lower end of the connecting bar 544 extends downwardly through the slot 376 in the sub-frame 366; and a pin 548 extends through an opening in the lower end of the connecting bar 544. That pin underlies the upper surface of that sub-frame; and it will enable upward movement of the connecting bar 544 to raise the sub-frame 366.

*Components of change-making device*

Referring particularly to FIG. 24, the numeral 31 denotes the base of one embodiment of change-making device with which the currency detector of the present invention can be used. That change-making device is not part of the present invention; and it is being disclosed herein primarily to illustrate one way in which the currency detector of the present invention can be used. The base 31 is elongated; and it has downwardly-directed flanges at the front and rear edges thereof. As a result, the base 31 has the configuration of a shallow channel. A number of brackets 167, 169, 171, 173 and 175 are secured to the upper face of that base; and those brackets extend transversely of the long axis of that base. The bracket 167 supports a tube 180 for nickels; and it also guides and confines an ejector 157 for those nickels. The bracket 169 supports a tube 182 for dimes; and it also guides and confine an ejector 159 for those dimes. The bracket 171 supports a tube 184 for quarters; and it also guides and confines an ejector 161 for those quarters. The brackets 173 and 175 suport tubes 187 and 189 for quarters; and they also guide and confine ejectors 163 and 165 for those quarters.

Actuators 338 are rotatably mounted adjacent the brackets 167, 169, 171, 173 and 175; and those actuators have ears 340 which extend through slots, not shown, in those brackets, extend through slots, not shown, in the ejectors 157, 159, 161, 163 and 165, and extend into slots, not shown, in the base 31. Those actuators are biased for rotation in the counter clockwise direction by springs, as shown by FIG. 24; and when those actuators are permitted to rotate in that direction they will cause the ejectors 157, 159, 161, 163 and 165 to dispense coins from the tubes 180, 182, 184, 187 and 189. However, abutments on the armatures of electromagnets 451, 453, 455, 457 and 459 normally lie in the paths of further ears on the actuators 338 to normally prevent counter clockwise rotation of those actuators. A rotatable shaft 207 extends adjacent the actuators 338; and cams 209, 211, 213, 215 and 217 are mounted on that shaft in register with rollers carried by the actuators 338. Those cams can respond to clockwise rotation of the shaft 207 to force the actuators 338 to rotate to the positions shown by FIG. 24. Subsequently, those cams will respond to continued rotation of the shaft 207 to release the rollers on the actuators 338; and, if the electromagnets 451, 453, 455, 457 and 459 are energized, the abutments on the armatures of those electromagnets will be out of the paths of the further ears on the actuators 338, and those actuators will be able to move the ejectors 157, 159, 161, 163 and 165 to coin-ejecting position. However, if any of the electromagnets 451, 453, 455, 457 and 459 is not energized, the abutment on the armature of that electromagnet will intercept and hold the further ear on the adjacent actuator 338; and will thereby keep that actuator from moving the corresponding ejector to coin-ejecting position.

The base 31, the ejectors 157, 159, 161, 163 and 165, the brackets 167, 169, 171, 173 and 175, the tubes 180, 182, 184, 187 and 189, the shaft 207, the cams 209, 211, 213, 215 and 217, the actuators 338, and the electromagnets 451, 453, 455, 457 and 459 are substantially identical to the base, ejectors, brackets, shaft, cams, actuators and electromagnet disclosed in Gustav F. Erickson application Ser. No. 225,027 for Money Handling Devices which was filed September 20, 1962. In fact, the base, the nickel tube, the dime tube, one of the quarter tubes, the shaft, and the actuators of this application and of the said Erickson application bear the same numerals.

The numeral 264 denotes a notched plate which is mounted on and rotates with the shaft 207. A second notched plate 266 is mounted on and rotates with that shaft; and a third notched plate 466 is mounted on and rotates with that shaft. A switch 464 is mounted adjacent the notched plate 466, switches 270 and 272 are mounted adjacent the notched plate 266, and a lever 282 is mounted adjacent the notched plate 264. The lever 282 is mounted on a shaft 280; and a roller 283 on that lever is disposed adjacent the periphery of the notched plate 264. A switch 276 has the arm thereof mounted adjacent the lower end of the lever 282; and whenever that lever rotates from the solid-line position to the dotted-line position in FIG. 24, the switch 276 will be actuated. The notched plates 264, 266 and 466, the switches 270, 272, 276 and 464, the shaft 280, the lever 282, and the roller 283 are similar to the identically-numbered notched plates, switches, shaft, lever, and roller of the said Erickson application.

The tubes 180, 182, 184, 187 and 189 can have hopper associated with them, in the manner disclosed by the said Erickson application; and those hoppers would tend to keep the tube 180 filled with nickels, would tend to keep the tube 182 filled with dimes, and would tend to keep the tubes 184, 187 and 189 filled with quarters. If the level of the coins in any of those tubes should ever fall below a predetermined level, the shaft 280 would be biased for rotation in the counted clockwise direction in FIG. 24; and the roller 283 would respond to that bias to move into the notch in the notched plate 264. As that roller so moved, it would cause the movable contact of the switch 276 to shift out of engagement with the lower contact thereof and into engagement with the upper contact thereof, as those contacts are viewed in FIG. 28.

*Circuitry*

Referring to FIG. 25, the numeral 554 denotes a male plug which can be inserted into the usual outlet socket for one hundred and fifteen volts A.C. A conductor 556 extends from the left-hand prong of the plug 554, and a conductor 558 ertends from the right-hand prong of that plug. The conductors 556 and 558 extend from FIG. 25 through FIGS. 26 and 27 into FIG. 28. The numeral 560 denotes a transformer which has the primary winding thereof connected to the conductors 556 and 558; and that transformer has a high voltage secondary winding 566 and a low voltage secondary winding 568. One end of the secondary winding 566 is connected to ground by a conductor 572; and the other end of that secondary winding is connected to a conductor 570 by a diode 569. The conductor 570 extends into FIG. 29. A capacitor 574 is connected between the conductors 570 and 572; and that capacitor will provide a filtering action. Conductors 576 are connected to the ends of the secondary winding 568; and those conductors extend into FIG. 29.

The numeral 578 denotes a second transformer; and that transformer has the primary winding thereof connected to the conductors 556 and 558. The secondary winding of that transformer has one end thereof connected to ground by a conductor 584 and junctions 606 and 612. The other end of that secondary winding is connected to a conductor 596 by a diode 588, a junction 586, a junction 590, a resistor 592, and a junction 594; and the conductor 596 extends into FIGS. 29 and 30. That other end of the secondary winding of the transformer 578 also is connected to a conductor 604 by diode 588, junction 586, a junction 598, a resistor 600, and a junction 602; and the conductor 604 extends into FIGS. 29 and 30. A capacitor 608 is connected between the junctions 590 and 606, and a capacitor 610 is connected between the junctions 598 and 606. A Zener diode 614 is connected between the junctions 594 and 612, and a Zener diode 616 is connected between the junctions 612 and 602.

In one preferred embodiment of the present invention, the secondary winding 566 and the diode 569 provide a D.C. voltage of about one hundred and fifty volts between the conductor 570 and ground. The secondary winding 568 provides an A.C. voltage of about six and three tenths volts between the conductors 576. The transformer 578 and the diode 588 coact with the Zener diodes 614 and 616 to make conductor 596 fifteen volts positive relative to ground and to make conductor 604 fifteen volts negative relative to ground.

Referring to FIG. 29, the numeral 618 denotes a relay coil; and that coil controls normally-open relay contacts 620 in FIG. 28 and normally-closed relay contacts 622 in FIG. 27. The numeral 624 in FIG. 30 denotes a relay coil which controls normally-open contacts 626 in FIG. 30, normally-closed contacts 628 in FIG. 29, and normally-open contacts 630 in FIG. 27. The numeral 632 in FIG. 29 denotes a relay coil which controls normally-open contacts 634 in FIG. 29, normally-open contacts 636 in FIG. 28, normally-closed contacts 638 in FIG. 28, normally-closed contacts 640 in FIG. 27, and normally-closed contacts 642 in FIG. 30. The numeral 644 in FIG. 27 denotes a relay coil which controls normally-open contacts 646 in FIG. 27, normally-open contacts 648 in FIG. 26, normally-closed contacts 650 in FIG. 26, normally-closed contacts 652 in FIG. 28, and normally-closed contacts 653 in FIG. 28. The numeral 654 in FIG. 27 denotes a relay coil which controls normally-open contacts 656 in FIG. 27, normally-open contacts 658 in FIG. 27, normally-closed contacts 660 in FIG. 28, and normally-open contacts 662 in FIG. 26. The numeral 664 in FIG. 27 denotes a relay coil which controls normally-open contacts 666 in FIG. 27, normally-open contacts 668 in FIG. 27, normally-closed contacts 670 in FIG. 28, and normally-open contacts 672 in FIG. 26.

As shown by FIG. 28, the motor 146 of the currency detector has one terminal thereof directly connected to conductor 558. One of the other terminals of that motor is connectable to conductor 556 by junction 673, relay contacts 636, and junction 674. The remaining terminal of the motor 146 is connectable to conductor 556 by junction 675, normally-open switch 448, relay contacts 638, and junction 674. Whenever the switch 448 and the relay contacts 638 are closed, the motor 146 will rotate in the forward direction and will thus rotate the rollers 166, 178 and 190 in the clockwise direction in FIG. 19. Whenever the relay contacts 636 are closed, the motor 146 will rotate in the reverse direction and will thus rotate the rollers 166, 178 and 190 in the counter clockwise direction in FIG. 19.

The numeral 678 in FIG. 28 denotes a lamp that will, whenever it is illuminated, indicate that there is not sufficient change to enable the change-making device to make change. That lamp will be mounted so patrons will readily note it whenever it is illuminated. One terminal of that lamp is directly connected to conductor 558; and the other terminal of that lamp is connectable to conductor 556 by the upper and movable contacts of switch 276 and junction 680.

As shown by FIG. 28, the motor 434 of the currency detector has the right-hand terminal thereof directly connected to conductor 558 by junction 682. The left-hand terminal of that motor is connectable to conductor 556 by junction 684, relay contacts 620, 652, 660 and 670, junctions 686 and 688, the lower and movable contacts of switch 276, and junction 680. That left-hand terminal also is connectable to conductor 556 by junction 684, the upper and movable contacts of switch 446, junctions 686 and 688, the lower and movable contacts of switch 276, and junction 680. The output shaft 436, which is driven by that motor through the medium of the gears within the gear housing 430, is indicated by dotted lines in FIGS. 27–29.

The numeral 692 in FIG. 28 denotes an electromagnet which will have the armature thereof mounted adjacent the passages through which quarters and half-dollars must move after those quarters and half-dollars have been introduced into the change-making device. Whenever that electromagnet is energized, it will hold its armature away from those passages so quarters and half-dollars will be able to move freely through those passages. However, whenever that electromagnet is de-energized, the armature thereof will block those passages, and will cause subsequently-inserted quarters and half-dollars to be returned to the patrons who inserted them. One terminal of the electromagnet 692 is directly connected to conductor 558 by a junction 690; and the other terminal of that electromagnet is connectable to conductor 556 by contacts 653, the lower and movable contacts of switch 446, junctions 686 and 688, the lower and movable contacts of switch 276, and junction 680.

As shown by FIG. 27, the solenoid 242 of the currency detector has the right-hand terminal thereof directly connected to conductor 558 by junction 696. The left-hand terminal of that solenoid is connectable to conductor 556 by junction 698, contacts 630 and junction 629.

The numeral 694 denotes a conductor which extends downwardly from junction 688 in FIG. 28 and which extends into FIGS. 27 and 26. A diode 704 in FIG. 27 has the cathode thereof connected to that conductor by a junction 706, a capacitor 708, and a junction 710; and the anode of that diode is connected to conductor 558 by a resistor 702 and a junction 700. The right-hand terminals of relay coils 664, 654 and 644 are connected to the cathode of diode 704 by junctions 706, 714 and 722. The left-hand terminal of relay coil 644 is connectable to conductor 694 by junctions 730 and 732, normally-open quarter switch 742, and junction 738. That left-hand terminal also is connectable to conductor 694 by junctions 730 and 732, contacts 646, junctions 728 and 720, switch 272, and junction 734. The left-hand terminal of relay coil 654 is connectable to conductor 694 by junctions 724 and 726, normally-open, half-dollar switch 740, and junction 736. That left-hand terminal also is connectable to conductor 694 by junctions 724 and 726, contacts 656, junctions 728 and 720, switch 272, and junction 736. The left-hand terminal of relay coil 664 is connectable to conductor 694 by junctions 716 and 718, contacts 666, junction 720, switch 272, and junction 734. That left-hand terminal also is connectable to conductor 556 by junction 716, switch 452, contacts 622 and 640, switch 360, junction 698, contacts 630 and junction 629.

As shown by FIG. 26, a motor 746 has the right-hand terminal thereof directly connected to conductor 558 by junction 744; and the left-hand terminal of that motor is connectable to conductor 694 by the movable and upper contacts of switch 270, junction 752, contacts 648, and junctions 750 and 748. That left-hand terminal also is connectable to conductor 694 by the movable and lower contacts of switch 270, the movable and lower contacts of switch 464, and junction 754. In addition, that left-hand terminal is connectable to conductor 694 by the movable and lower contacts of switch 270, the movable and upper contacts of switch 464, contacts 650, and junctions 750 and 748. The motor 746 is connected to, and will rotate, the shaft 207 of FIG. 24; and that shaft is indicated by dotted lines in FIGS. 26–28.

The diode 704 in FIG. 27 permits current to flow through capacitor 708 whenever conductor 558 is positive relative to conductor 556 and the movable contact of switch 276 is in its lower position. That current, which will be limited by resistor 702 will charge capacitor 708 and make junction 706 positive relative to junction 710. As a result, that diode and that capacitor can coact to effectively supply direct current to the relay coils 644, 654 and 664.

Electromagnets 451 and 453 of FIG. 24 have the right-hand terminals thereof directly connected to conductor 558 by junctions 758 and 760, respectively. The left-hand terminals of those electromagnets are connected together and are connectable to conductor 694 by junctions 756 and 752, contacts 648, and junctions 750 and 748. The right-hand terminal of electromagnet 455 of FIG. 24 is directly connected to conductor 558 by junction 764; and the left-hand terminal of that electromagnet is connectable to conductor 694 by contacts 662 and junction 762. The hight-hand terminals of electromagnets 457 and 459 of FIG. 24 are connected to conductor 558 by junctions 768 and 770, respectively. The left-hand terminals of those electromagnets are connected together and are connectable to conductor 694 by junction 767, contacts 672, and junction 766.

The numeral 774 denotes a lamp that can be mounted adjacent a panel which exhibits instructions to guide patrons in their operation of the change-making device. The right-hand terminal of that lamp is directly connected to conductor 558; and the left-hand terminal of that lamp is directly connected to conductor 694.

Referring particularly to FIG. 29, the right-hand terminal of relay coil 618 is connected to the conductor 596 which extends from FIG. 25; and that conductor will supply a positive fifteen volts to that terminal. The left-hand terminal of relay coil 618 is connectable to ground by switches 414 and 406 of the currency detector and by junction 776. The right-hand terminal of relay coil 632 is connected to the conductor 570 which extends from FIG. 25; and that conductor will supply a positive voltage of about one hundred and fifty volts to that terminal. The left-hand terminal of that relay coil is connectable to ground by junction 920, switch 450, contacts 628, junction 918, the right-hand and movable contacts of switch 444, and junction 776. That left-hand terminal also is connectable to ground by junction 920, contacts 634, junction 918, the right-hand and movable contacts of switch 444, and junction 776.

The left-hand contact of switch 444 is connected to a junction 786 by a capacitor 778, a junction 780, and a conductor 784.

The right-hand contact of switch 444 is connected to a conductor 922; and that conductor extends into FIG. 30. A conductor 782 is connected to the conductor 784 by the junction 780, and that conductor also extends into FIG. 30.

The junction 786 in FIG. 29 is connected to the lower terminal of a resistor 788; and the upper terminal of that resistor is connected to the conductor 570 which extends from FIG. 25. That conductor will supply a positive voltage of about one hundred and fifty volts to the upper terminal of that resistor. The junction 786 is directly connected to the plate of a thyratron 790; and the screen grid and cathode of that thyratron are connected to ground by a conductor 792. In one preferred embodiment of the circuitry of the present invention, that thyratron is a 2D21.

The numeral 794 denotes a one thousand ohm resistor; and the right-hand terminal of that resistor is connected to the conductor 596 which extends from FIG. 25. That conductor will supply a positive fifteen volts to that terminal. The left-hand terminal of resistor 794 is connected to the upper terminal of the winding of the magnetic head 492 of the currency detector by junctions 796, 798, 800 and 802, a one thousand ohm resistor 804, junction 806, and a ten thousand ohm resistor 808. The lower terminal of the winding of the magnetic head 492 is connected to ground by junctions 812 and 814, and conductor 792. A twenty-five microfarad capacitor 816 is connected between junctions 806 and 812; and that capacitor coacts with the resistor 804 to provide de-coupling. The magnetic head is a Brush BK 1090 magnetic head.

The numeral 824 denotes a TI 495 transistor which has the emitter thereof connected to ground by a one hundred ohm resistor 826, junctions 828 and 814, and conductor 792. The collector of that transistor is connected to the junction 802 by junctions 822 and 820 and a thirty-nine thousand ohm resistor 818. The base of that transistor is coupled to the upper terminal of the winding of the magnetic head 492 by junctions 834 and 832, and a forty-seven thousandths microfarad capacitor 830. A two hundred and seventy micromicrofarad capacitor 823 is connected between the junctions 822 and 832 to provide high frequency regenerative feed-back.

The numeral 836 denotes a fifty microfarad capacitor which is connected between junction 800 and a junction 838 in conductor 792. That capacitor coats with the resistor 794 to provide de-coupling.

The numeral 844 denotes a second TI 495 transistor; and the emitter of that transistor is connected to ground by junctions 846 and 848, a fifteen hundred ohm resistor 850, junctions 852, 838, 828 and 814, and conductor 792. An eight microfarad capacitor 854 is connected to junction 848 and to the conductor 792 by a junction 856; and that capacitor serves as a by-pass capacitor. The collector of the transistor 844 is connected to the junction 798 by a junction 842 and a forty-seven hundred ohm resistor 840. The base of the transistor 844 is directly connected to the collector of the transistor 824 by junctions 820 and 822. A four hundred and seventy thousand ohm resistor 858 is connected between the base of transistor 824 and the emitter of transistor 844 by junctions 834 and 846.

The numeral 866 denotes a third TI 495 transistor; and that transistor has the emitter thereof connected to ground by junction 868, a twenty-two hundred ohm resistor 870, junctions 872, 886, 856, 852, 838, 828 and 814, and conductor 792. The collector of that transistor is connected to the junction 796 by junctions 864 and 862 and a ten thousand ohm resistor 860. The base of that resistor is coupled to the collector of the transistor 844 by junctions 882 and 880, a one hundredth mircrofarad capacitor 878, and the junction 842. A forty-seven thousand ohm resistor 884 is connected between the junction 882 and the junction 886 in the conductor 792. A one hundred thousand ohm resistor 888 is connected between the resistors 860 and 884 by the junctions 862 and 864 and by the junctions 880 and 882. That resistor coacts with the resistors 860 and 884 to constitute a voltage divider. A two hundred and seventy micromicrofarad capacitor 890 is connected in parallel with the resistor 888, and will thus provide high frequency, degenerative feed-back. An eight microfarad capacitor 874 is connected in parallel with the resistor 870 by junction 868 and a junction 876 in the conductor 792; and that capacitor serves as a bypass capacitor.

The numeral 902 denotes a one henry inductor which coacts with a twenty-five microfarad capacitor 908, a one-hundredth microfarad capacitor 896, and an eighteen hundred micromicrofarad capacitor 898 to constitute a tuned circuit. The lower terminals of the capacitors 896 and 908 are, respectively, connected to conductor 792 by junctions 901 and 910. A trimmer capacitor 904 is connected in parallel with the inductor 902. The input junction 894 of the tuned circuit is connected to the collector of the transistor 866 by a forty-seven hundred ohm resistor 892 and junctions 862 and 864. The output junction 900 of the tuned circuit is connected to the control grid of the thyratron 790 by the upper section of a one megohm potentiometer 912. The lower terminal of that potentiometer is connected to the lower terminal of the inductor 902 by junctions 914 and 906. That lower terminal of that potentiometer also is connected to the conductor 604 in FIG. 25 by a 1N540 diode 916; and that conductor will supply a negative voltage of fifteen volts. The filament of the thyratron 790 is connected to the conductors 576 from FIG. 25.

Referring to FIG. 30 in detail, junctions 924, 926, 928 and 930 connect the lower terminals of the lamps 210 and 212 of the currency detector to the conductor 604 from FIG. 25; and that conductor will supply a negative voltage of fifteen volts. Junctions 924, 926, 932, 934, 936 and 938 connect the lower terminals of the lamps 206 and 208 of the currency detector to the conductor 604. Junctions 924, 926, 932, 934, 940, 942, 944 and 946 connect the lower terminals of the lamps 514 and 516 of the currency detector to the conductor 604. The upper terminals of the lamps 514, 516, 206, 208, 210 and 212 are connected to ground by junctions 962, 960, 958, 956, 954, 952, 950 and 948. As a result, those lamps will be illuminated whenever the plug 554 in FIG. 25 is plugged into the outlet socket. Those lamps are preferably Sylvania ES18 lamps.

The photocells 518 and 520 of the currency detector are connected in series between junctions 944 and 962 by junction 970 and thus have fifteen volts applied across them. The photocells 214 and 216 of the currency detector are connected in series between the junctions 936 and 956 by junction 992 and thus have fifteen volts applied across them. The photocells 218 and 220 of the currency detector are connected between the junctions 928 and 950 by junction 1012 and thus have fifteen volts applied across them. The photocells 214, 216, 218, 220, 518 and 520 are preferably RCA C70306 photocells; and they will conduct current whenever the plug 554 in FIG. 25 is plugged into the outlet socket. The resistance of each of those photocells will increase as the amount of light striking that photocell decreases; and, conversely, the resistance of each of those photocells will decrease as the amount of light striking that photocell increases. The photocells 214, 218 and 518 will receive light that is reflected from light areas on an authentic bill disposed within the testing area of the currency detector and the photocells 216, 220 and 520 will receive light that is reflected from dark areas on an authentic bill disposed within that testing area.

A twenty-five thousand ohm potentiometer 972 is connected in parallel with the photocell 520, a twenty-five thousand ohm potentiometer 994 is connected in parallel with the photocell 216, and a twenty-five thousand ohm potentiometer 1014 is connected in parallel with the photocell 220.

The numeral 968 denotes a TI 494 transistor which has the emitter thereof connected to conductor 604 of FIG. 25 by a twenty-seven hundred ohm resistor 980, and junctions 978, 940, 934, 932, 926 and 924. The collector of that transistor is connected to conductor 596 of FIG. 25 by a junction 982, a twelve thousand ohm resistor 984, and junctions 986 and 988. The base of the transistor 968 is connected to the movable contact of potentiometer 972 by an eighteen hundred ohm resistor 976 and a junction 974.

The numeral 990 denotes a second TI 494 transistor; and that transistor has the emitter thereof connected to conductor 604 of FIG. 25 by a twenty-seven hundred ohm resistor 1002 and junctions 1000, 932, 926 and 924. The collector of that transistor is connected to conductor 596 of FIG. 25 by a junction 1004, a twelve thousand ohm resistor 1006, and junctions 1008, 986 and 988. The base of that transistor is connected to the movable contact of potentiometer 994 by an eighteen hundred ohm resistor 998 and a junction 996.

The numeral 1010 denotes a third TI 494 transistor; and the emitter of that transistor is connected to conductor 604 of FIG. 25 by a twenty-seven hundred ohm resistor 1024 and junctions 1022, 1020 and 924. The collector of that transistor is connected to conductor 596 of FIG. 25 by junction 1026, a twelve thousand ohm resistor 1028, and junctions 1008, 986 and 988. The base of that transistor is connected to the movable contact of potentiometer 1014 by an eighteen hundred ohm resistor 1018 and a junction 1016.

The numeral 1030 denotes a fourth TI 494 transistor; and the emitter of that transistor is connected to conductor 604 of FIG. 25 by junction 1040, an eight hundred and twenty ohm resistor 1042, and junctions 1044, 1022, 1020 and 924. The collector of that transistor is connected to conductor 596 of FIG. 25 by junction 1038, a fifteen hundred ohm resistor 1036, junction 1034, a six hundred and eighty ohm resistor 1032, and junction 988.

The conductor 782 of FIG. 29 is connected to conductor 604 of FIG. 25 by a one hundred thousand ohm resistor 966, a junction 964, a thirty-three thousand ohm resistor 967, and junctions 942, 940, 934, 932, 926 and 924. The conductor 782 also is connected to conductor 604 of FIG. 25 by resistor 966, junction 964, a Zytan diode 1052, conductor 1050, junctions 1056, 1058 and 1048, a ten thousand ohm resistor 1046, the base-emitter circuit of transistor 1030, junction 1040, resistor 1042, and junctions 1044, 1022, 2020 and 924.

The collector of transistor 968 is connected to conductor 1050 by junction 982, a Zytan diode 1054, and junction 1056. The junction 974 is connected to conductor 1050 by a Zytan diode 1060 and junction 1058. The collector of transistor 990 is connected to conductor 1050 by junction 1004, a Zytan diode 1062, and junction 1064. The junction 996 is connected to conductor 1050 by a Zytan diode 1068 and junction 1066. The collector of transistor 1010 is connected to conductor 1050 by junction 1026, a Zytan diode 1072, and junction 1070. The junction 1016 is connected to conductor 1050 by a Zytan diode 1074.

The numeral 1076 denotes a fifth TI 494 transistor; and the emitter of that transistor is connected to conductor 604 by junction 1040, resistor 1042, and junctions 1044, 1022, 1020 and 924. The collector of that transistor is connected to conductor 596 by junctions 1082 and 1094, contacts 642, relay coil 624, junctions 1078 and 1034, the six hundred and eighty ohm resistor 1032, and junction 988. The base of that transistor is connected to the movable contact of a five thousand ohm potentiometer 1088; and the upper terminal of that potentiometer is connected to the collector of transistor 1030 by junction 1086, a twelve thousand ohm resistor 1084, and junction 1038. The lower terminal of that potentiometer is connected to the junction 1044 by a forty-seven hundred ohm resistor 1092. A shunt 1090 is connected between the upper terminal and the movable contact of the potentiometer 1088 by the junction 1086. The transistors 1030 and 1076 and the resistors associated with them constitute a Schmitt trigger.

The numeral 1080 denotes a Zytan diode which has the anode thereof connected to the right-hand terminal of the relay coil 624 by junctions 1082 and 1094 and contacts 642 and which has the cathode thereof connected to the left-hand terminal of that relay coil by junction 1078. The numeral 1096 denotes a 1N 540 diode which has the anode thereof connected to the collector of transistor 1076 by junctions 1094 and 1082 and which has the cathode thereof connected to the conductor 922 of FIG. 29 by contacts 626.

*Normal positions of components of currency detector and of change-making device*

In the normal position of the currency detector, the upper section of that currency detector will be in its closed position. This means that the short arms of the brackets 273 will abut the upper edges of the walls 52 and 54, and that the uppermost semi-cylindrical recesses of the springs 274 will engage the studs 88 and 90. The platens 250 and 92 will be close to, and parallel to, each other and will define the upper and lower limits of the area in which an inserted bill 1100 can be tested. The offsets 256 and 258 of the upper section will be adjacent the offset 94 of the lower section, and they will co-act with that offset to define a corner slot into which bills 1100 can be inserted.

The fingers 234 on the arms 232 of the bill-blocking member 222 will have the upper ends thereof disposed below the level of the upper surface of the platen 92; and the upper ends of the fingers 238 on the arms 236 of that member will be disposed within the openings 312 in the platen 250. As a result, a bill 1100 can be inserted into the area between the platens 92 and 250 but cannot be moved rearwardly of the fingers 238.

The levers 346 and 350 will be in the positions shown by FIG. 19. As a result, the switch 360 will be open, as shown by FIG. 27. Also, as a result, the lower end of the lever 346 will be in the path of an inserted bill 1100.

The bill-receiving buttons 410 and 418 will have the lower faces thereof extending downwardly through the openings 298 in the platen 250 and resting within the shallow, concave recesses 104 in the platen 92. This means that those buttons will be in the path of an inserted bill 1100; and it also means that the switches 406 and 414 will be open, as shown by FIG. 29.

The cam 454 will be in the position shown by FIG. 13; and it will hold the lever 528 with the right-hand end thereof down and with the left-hand end thereof up. That left-hand end will cause the connecting bar 532 to hold the sub-frame 388 in raised position. As a result, the rollers 394 will be held up out of engagement with the rollers 190. This means that the rollers 394 will be held up out of the path of an inserted bill 1100.

The eccentric 473 will be in the position shown by FIG. 13; and that eccentric will hold the lever 474 generally horizontal. The notch 476 in the lower edge of that lever will engage the pin 496 on the pendulum 488; and that notch and pin will hold that pendulum in the inclined position shown by FIG. 13. This means that the magnetic head 492 will be held out of the path of an inserted bill 1100.

The cam 467 will be in the position shown by FIG. 16; and it will hold the lever 540 with the right-hand end thereof down and with the left-hand end thereof up. That left-hand end will cause the connecting bar 544 to hold the sub-frame 366 in raised position. As a result, the rollers 372 will be held up out of engagement with the rollers 178. This means that the rollers 372 will be held up out of the path of an inserted bill 1100.

The notch of the cam 456 will permit the movable contact of the switch 444 to be in engagement with the left-hand contact of that switch, as shown by FIG. 29. The notch of the cam 458 will permit the movable contact of the switch 446 to be in engagement with the lower contact of that switch, as shown by FIG. 28. The short dwell of the cam 460 will hold the switch 448 open, as shown by FIG. 28. The periphery of the cam 462 will hold the switch 450 open, as shown by FIG. 29. The periphery of the cam 465 will hold the switch 452 open, as shown by FIG. 27.

Spur gears 168 and 339 will be fully meshed, as shown by FIG. 6. The rollers 341 will be in engagement with the rollers 166, as shown by FIG. 22.

The lamps 206, 208, 210, 212, 514 and 516 will be illuminated. The light from the lamp 206 will pass through the openings 132 and 300 and fall upon the lamp 514; and, similarly, the light from the lamp 514 will pass through the openings 300 and 132 and fall upon the lamp 206. This means that the photocells 214 and 518 will normally receive substantially no light. The light from the lamp 208 will pass through the openings 134 and 302 and fall upon the lamp 516; and, similarly, the light from the lamp 516 will pass through the openings 302 and 134 and fall upon the lamp 208. This means that the photocells 216 and 520 will normally receive substantially no light. Light from the lamp 210 will pass through the openings 136 and 304 into the upper section of the currency detector, and substantially none of that light will be reflected onto the photocell 218. Consequently, that photocell normally receives substantially no light. Light from the lamp 212 will pass through the opening 138 and strike the lower face of the platen 250, and some of that light will be reflected back through that opening onto the photocell 220. As a result, the photocell 220 will normally receive a substantial amount of light.

The coin tubes 180, 182, 184, 187 and 189 will have sufficient coins therein to enable the change-making device to make change. Consequently, the lever 282 will be in the position shown by FIG. 24; and hence the movable contact of the switch 276 will be in engagement with the lower fixed contact of that switch, as shown by FIG. 28. As a result, the coin return electromagnet 692 in FIG. 28 will be energized, and the lamp 774 in FIG. 26 will be illuminated.

The notch of the notched plate 266 will permit the movable contact of the switch 270 to be in engagement with the upper contact of that switch, as shown by FIG. 26. The periphery of the notched plate 266 will hold the switch 272 closed, as shown by FIG. 27. The periphery of the notched plate 466 will hold the movable contact of the switch 464 in engagement with the lower contact of that switch, as shown by FIG. 26. The cams 209, 211, 213, 215 and 217 will hold the actuators 338 in the retracted positions shown by FIG. 24.

The motor 146 will be de-energized; and hence the rollers 166, 178 and 190 will be at rest. The motor 434 also will be de-energized; and hence the output shaft 436 will be stationary.

*Operation of magnetic sensing system*

The conductor 604 of FIG. 25 applies a negative voltage of fifteen volts to the cathode of diode 916 in FIG.

29; and the conductor 596 of FIG. 25 applies a positive voltage of fifteen volts to the right-hand terminal of resistor 794 of FIG. 29. The lower terminal of potentiometer 912 is directly connected to the anode of diode 916 by junction 914; and the upper terminal of that potentiometer is connected to resistor 794 by junction 900, capacitor 898, junction 894, resistor 892, junction 862, resistor 860, and junction 796. As a result, appropriate setting of the movable contact of that potentiometer can apply a voltage of the desired polarity and magnitude to the control grid of the thyratron 790; and normally that movable contact will be set to bias that thyratron beyond cut-off.

The conductor 570 of FIG. 25 will supply a positive voltage of about one hundred and fifty volts to the upper terminal of resistor 788 in FIG. 29; and that voltage will be applied across three current paths—one of those current paths extending from resistor 788 via junction 786, thyratron 790, conductor 792, junctions 910, 901, 876, 872, 886, 856, 852, 838, 828 and 814, and ground to conductor 572 in FIG. 25, a second of those current paths extending from resistor 788 via junction 786, conductor 784, junction 780, conductor 782, resistor 966 in FIG. 30, junction 964, resistor 967, junctions 942, 940, 934, 932, 926 and 924, conductor 604, junction 602 in FIG. 25, Zener diode 816, junction 612, and ground to the conductor 572, and the third of those current paths extending from resistor 788 via junction 786, conductor 784, junction 780, conductor 782, resistor 966, junction 964, diode 1052, conductor 1050, junctions 1056, 1058 and 1048, resistor 1046, the base-emitter circuit of transistor 1030, junction 1040, resistor 1042, junctions 1044, 1022, 1020 and 924, conductor 604, junction 602 in FIG. 25, Zener diode 816, junction 612, and ground to the conductor 572.

The thyratron 790 is normally biased beyond cut-off, as explained hereinbefore; and hence that thyratron normally acts as a high resistance. That thyratron is essentially connected in parallel with series-connected resistors 966 and 967 in FIG. 30 and in parallel with series-connected resistors 966, 1046 and 1042 in FIG. 30. The total of the resistances of resistors 966 and 967 is one hundred and thirty-three thousand ohms and the total of the resistances of resistors 966, 1046 and 1042 is one hundred ten thousand eight hundred and twenty ohms; and the normal resistance of thyratron 790 is higher than either of those totals. Consequently, a substantial voltage is normally developed across that thyratron; and that voltage will cause a positive voltage of about five volts to normally appear at the junction 964 in FIG. 30.

As long as thyratron 790 is non-conductive, current will flow from conductor 570 in FIG. 25 via resistor 788 in FIG. 29, junction 786, conductor 784, junction 780, conductor 782, resistor 966 in FIG. 30, junction 964, diode 1052, conductor 1050, junctions 1056, 1058 and 1048, resistor 1046, the base-emitter circuit of transistor 1030, junction 1040, resistor 1042, junctions 1044, 1022, 1020 and 924, conductor 604, junction 602 in FIG. 25, Zener diode 816, junction 612, and ground to conductor 572. The transistor 1030 will respond to that flow of current through the base-emitter circuit thereof to be conductive to the point of saturation. Consequently, a substantial amount of current will normally flow from conductor 596 in FIG. 25 via junction 988 in FIG. 30, resistor 1032, junction 1034, resistor 1036, junction 1038, transistor 1030, junction 1040, resistor 1042, junctions 1044, 1022, 1020 and 924, and conductor 604 in FIG. 25. Current will also flow from conductor 596 in FIG. 25 via junctions 988 in FIG. 30, resistor 1032, junction 1034, resistor 1036, junction 1038, resistor 1084, junction 1086, shunt 1090 and the lower section of potentiometer 1088, resistor 1092, junctions 1044, 1022, 1020 and 924, and conductor 604 in FIG. 25. The flow of current through resistor 1042 will develop a voltage drop across that resistor, and the flow of current through the lower section of potentiometer 1088 and resistor 1092 will develop a voltage drop across that lower section and that resistor; and those voltage drops will coact to bias the transistor 1076 beyond cut-off. Consequently, insufficient current will be able to flow from conductor 596 in FIG. 25 via junction 988 in FIG. 30, resistor 1032, junctions 1034 and 1078, relay coil 624, contacts 642, junctions 1094 and 1082, transistor 1076, junction 1040, resistor 1042, junctions 1044, 1022, 1020 and 924, and conductor 604 in FIG. 25 to energize that relay coil. All of this means that as long as the thyratron 790 remains non-conductive the relay coil 624 will remain de-energized.

The conductor 596 in FIG. 25 will supply a positive fifteen volts to the right-hand terminal of resistor 794 in FIG. 29; and hence current will flow via that resistor, junctions 796, 798, 800 and 802, resistor 804, junction 806, resistor 808, the winding of magnetic head 492, junctions 812 and 814, and conductor 792 to ground. That current will bias the magnetic head 492.

Current also will flow via resistor 794, junctions 796, 798, 800 and 802, resistor 818, junction 820, the base-emitter circuit of transistor 844, junctions 846 and 848, resistor 850, junctions 852, 838, 828 and 814, and conductor 792 to ground. That transistor will respond to that current flow through the base-emitter circuit thereof to be conductive. Hence, current also will flow via resistor 794, junctions 796 and 798, resistor 840, junction 842, transistor 844, junctions 846 and 848, resistor 850, junctions 852, 838, 828 and 814, and conductor 792 to ground. That flow of current through resistor 850 will provide the bias for the transistor 824—the lower terminal of that resistor being connected to the emitter of that transistor by junctions 852, 838 and 828 and resistor 826, and the upper terminal of that resistor being connected to the base of that transistor by junctions 848 and 846, resistor 885, and junction 834. Consequently, current will flow via resistor 794, junctions 796, 798, 800 and 802, resistor 818, junctions 820 and 822, transistor 824, resistor 826, junctions 828 and 814, and conductor 792 to ground. The resulting current flow through resistor 826 will develop a voltage drop that will tend to reduce the conductivity of the transistor 824.

In addition, current will flow via resistor 794, junction 796, resistor 860, junctions 862, and 864, resistor 888, junctions 880 and 882, resistor 884, junctions 886, 856, 852, 838, 828 and 814, and conductor 792 to ground. The resistors 860, 888 and 884 will serve as a voltage divider, and the voltage at the junction 882 will bias the transistor 866. As a result, current will flow via resistor 794, junction 796, resistor 860, junctions 862 and 864, transistor 866, junction 868, resistor 870, junctions 872, 886, 856, 852, 838, 828 and 814, and conductor 792 to ground.

The resistor 808 serves as a voltage-dropping resistor; and that resistor will set the bias on the magnetic head 492 at the desired level. The resistor 804 and the capacitor 816 will by-pass noise and other transients, and will thereby free the winding of the magnetic head 492 of those transients. The resistor 794 and the capacitor 836 will by-pass noise and other transients, and will thereby free the transistor 824 of those transients.

Whenever the magnetic head 492 is moved into engagement with the black-ink lines on an authentic bill, voltage variations will be generated in the winding of that magnetic head. Those voltage variations will be coupled to the base of transistor 824 by capacitor 830, and they will vary the conductivity of that transistor. The transistor 824 will act as a pre-amplification stage. The output of transistor 824 is directly connected to the base of transistor 844; and the output of transistor 824 will vary the conductivity of transistor 844. The latter transistor will act as a second pre-amplification stage. The output of transistor 844 is coupled to the base of transistor 866 by capacitor 878; and that output will vary the conductivity of the latter transistor. The transistors 824 and 844 will operate as linear amplifiers, but the transistor 866 will operate as an over-driven amplifier and will thus act as a limiter. This means that the transistor 866 will limit the amplitude of the voltage variations which will appear at the junction 862 and which will be supplied to the tuned circuit by the resistor 892.

The tuned circuit, which includes the inductor 902 and the capacitors 896, 898 and 908, has a characteristic frequency; and that frequency will be substantially equal to the rate at which the magnetic head 492 moves past the grid lines on an authentic bill of the proper denomination. When the repetition rate, the phase, and the duration of the voltage variations generated in the winding of the magnetic head 492 are substantially the same as those which will be generated in that winding by an authentic bill of the proper denomination, the transistors 824, 844 and 866 will supply to the tuned circuit a succession of quantums of energy that have a repetition rate and phase which substantially coincide with those of the tuned circuit. Furthermore, the maximum quantitative value of each of those quantums of energy will be fixed; and the value of the energy in each of those quantums of energy will exceed the losses of the tuned circuit at a predetermined current value of that tuned circuit. As a result, the voltage across the inductor 902 will experience a controlled cumulative growth. After a predetermined number of the quantums of energy have been injected into the tuned circuit, the voltage across that inductor will rise to the point where the thyratron 790 will be fired.

That Thyratron will be so biased, by the setting of the movable contact of potentiometer 912, that it can coact with the characteristic wave form of the tuned circuit to determine the repetition rates of the voltage variations which can effect firing of that thyratron. Specially, the movable contact of the potentiometer 912 will be set to establish the range of frequencies which can provide sufficient cumulative growth of the voltage across the inductor 902 to cause the thyratron 790 to fire.

The theory on which the magnetic sensing system of FIG. 29 operates is substantially identical to that disclosed in Smith et al. application Serial Number 849,066 for Currency Detectors which was filed on October 27, 1959, and which has been abandoned. Further, the transistors 824 and 844 of FIG. 29 are similar in theory and operation to the transistors disclosed in Danko application Serial No. 35,355 for Currency Detectors which was filed June 10, 1960 and which was granted December 14, 1965 as Letters Patent No. 3,223,988.

The magnetic sensing system of FIG. 29 of the present application is intended to respond to voltage variations which have a materially-higher frequency than do the voltage variations in the said Smith et al. and Danko applications, because the magnetic head 492 of the currency detector of the present invention moves more rapidly relative to the inserted bill 1100 than the bill was moved relative to the magnetic heads of the said Smith et al. and Danko applications. Specifically, the magnetic head 492 will preferably have a tangential speed of about thirty inches per second as that magnetic head engages the inserted bill 1100. Hence, the voltage variations to which the tuned circuit of the magnetic sensing system of FIG. 29 will respond will be in the range of thirty-six hundred to thirty-seven hundred cycles per second.

Because the tuned circuit of the magnetic sensing system of FIG. 29 responds to voltage variations in the range of thirty-six hundred to thirty-seven hundred cycles per second, that system must be protected against high frequency transients; and that system is so protected by the capacitors 823 and 890. Specifically, the capacitor 823 provides degenerative feed-back from the collector to the base of transistor 824; and that degenerative feed-back will reduce high frequency transients. The capacitor 890 provides degenerative feed-back from the collector to the base of transistor 866; and that degenerative feed-back will reduce high frequency transients. Because of the capacitors 823 and 890, the magnetic sensing system of FIG. 29 is able to provide a signal that has a minimum of high frequency transients.

All of this means that whenever the magnetic head 492 of the currency detector engages the black-ink face of an authentic bill of the proper denomination, the magnetic sensing system of FIG. 29 will fire the thyratron 790. As that thyratron fires, the resistance of that thyratron will fall from a high value to a very low value; and hence the voltage at junction 786 will decrease substantially. As the voltage at junction 786 falls, the voltage at junction 964 in FIG. 30 also will fall; and the voltage at the latter junction will become negative and will have a value of about eight and six-tenths volts. Such a negative voltage will be unable to cause sufficient current to flow through the base-emitter circuit of transistor 1030 to keep that transistor conductive. Consequently, unless the optical sensing system of FIG. 30 can cause sufficient current to flow through the base-emitter circuit of transistor 1030 to keep that transistor conductive, that transistor will become non-conductive.

The diode 916 in FIG. 29 co-acts with the capacitor 908 to constitute a bias-sustaining network; and that network will keep the thyratron 790 non-conductive, whenever that thyratron is supposed to be kept non-conductive, even if a temporary power failure occurs or the plug 554 of FIG. 25 is momentarily removed from the outlet socket. Specifically, the capacitor 908 will, during temporary power failures or while the plug 554 is momentarily removed from the outlet socket, act to supply to the lower terminal of potentiometer 912 a negative voltage which is comparable to the negative voltage that is normally supplied to that terminal by conductor 604 and diode 916. In the absence of that, or a similar, bias-sustaining network, the thyratron 790 could not always be depended upon to remain non-conductive if a power failure occurred or the plug 554 was momentarily removed from the outlet socket.

*Operation of optical sensing system*

Whenever the currency detector of the present invention is at rest, the lamps 206, 208, 210, 212, 514 and 516 will be illuminated; but substantially no light will fall upon the photocells 214, 216, 518 and 520, because the light from lamp 206 will be directed toward lamp 514, and vice versa, and the light from lamp 208 will be directed toward lamp 516, and vice versa. Also, substantially no light will fall upon the photocell 218 because the light from lamp 210 will pass through the openings 136 and 304, respectively, in the platens 92 and 250. However, a substantial amount of light will fall upon the photocell 220—that light passing from lamp 212 through opening 138 in platen 92, being reflected by platen 250, and then passing back through opening 138 to fall upon photocell 220. This means that until a bill is inserted in the currency detector, the photocells 214, 218 and 518 will receive substantially no light; although those photocells will receive substantial amounts of light from an inserted bill if that bill is authentic and of the proper denomination. Until a bill is inserted in the currency detector, the photocells 216 and 520 also will receive substantially no light; although those photocells will receive some light from an inserted bill if that bill is authentic and of the proper denomination. Until a bill is inserted in the currency detector, photocell 220 will receive a substantial amount of light; although that photocell will receive only a little light from an inserted bill if that bill is authentic and of the proper denomination. The optical sensing system of FIG. 30 will be set to permit the transistor 1030 to be rendered non-conductive only when the photocells 214, 218 and 518 receive substantial amounts of light and the photocells 216, 220 and 520 receive only small amounts of light; and hence that sensing system will not permit that transistor to become non-conductive whenever the currency detector is at rest.

In setting the optical sensing system of FIG. 30, the movable contact of potentiometer 1088 will initially be moved down to the lower end of that potentiometer to make sure that the transistor 1076 will be non-conductive. Also, the movable contact of potentiometer 912 in FIG. 29 will be moved up toward the upper end of that potentiometer to make sure that the thyratron 790 will be conductive—and thus make sure that the voltage at junction 964 in FIG. 30 is negative and is greater than eight and one-half volts. Then an authentic bill of the proper denomination, with average cleanness and light reflectivity, will be set in the testing area of the currency detector with its black-ink face up and with its leading edge abutting the fingers 238 of bill-blocking member 222.

At this time, a D.C. voltmeter will be connected between junctions 982 and 924 in FIG. 30; and the movable contact of potentiometer 972 will be moved to provide a minimum reading on that voltmeter. The settings of the movable contacts of potentiometers 994 and 1014 are not significant while the voltmeter is so connected; and hence those movable contacts can have random settings. Once the movable contact of potentiometer 972 has been set to establish a minimum voltage between junctions 982 and 924, the voltmeter will be connected between junctions 1004 and 924; and then the movable contact of potentiometer 994 will be moved to provide a minimum reading on that voltmeter. The setting of the movable contact of potentiometer 1014 is not significant while the voltmeter is so connected; and hence that movable contact can have a random setting. After a minimum voltage has been established between junctions 1004 and 924, the voltmeter will be connected between junctions 1026 and 924; and then the movable contact of potentiometer 1014 will be moved to provide a minimum reading on that voltmeter. Once that minimum reading has been established, the movable contact of potentiometer 1014 will be shifted until the reading on the voltmeter increases by about one to about one and two-tenths volts. At this time, the movable contact of potentiometer 1088 will be moved upward just far enough to render transistor 1076 conductive. Thereafter, the movable contact of potentiometer 912 in FIG. 29 will be moved downwardly to render thyratron 790 non-conductive. Thereupon, the voltage at junction 964 in FIG. 30 will become about five volts positive; and current will flow from conductor 570 in FIG. 25 via resistor 788 in FIG. 29, junction 786, conductor 784, junction 780, conductor 782, resistor 966, junction 964, diode 1052, conductor 1050, junctions 1056, 1058, and 1048, resistor 1046, the base-emitter circuit of transistor 1030, junction 1040, resistor 1042, junctions 1044, 1022, 1020 and 924, conductor 604 in FIG. 25, junction 602, Zener diode 816, junction 612, and ground to conductor 572. The resulting flow of current through the base-emitter circuit of transistor 1030 will render that transistor conductive; and, as that transistor becomes conductive, the transistor 1076 will again become non-conductive.

Thereupon, the voltmeter will again be connected between junctions 1026 and 924; and the movable contact of potentiometer 1014 will again be moved to provide a minimum reading on that voltmeter. At this time, the optical sensing system of FIG. 30 will be properly set; and the inserted bill 1100 will be removed.

The offsetting of the movable contact of potentiometer 1014, and the setting of the movable contact of potentiometer 1088 while the former movable contact is offset, make it possible for the currency detector to accept authentic bills which have values of cleanness and light reflectivity that are greater or less than average but that fall within a predetermined range, and to reject all bills with values of cleanness and light reflectivity outside of that range.

With no bill in the testing area of the currency detector, the photocells 518 and 520 will establish a negative voltage of about four volts at the junction 970; and a negative voltage of less than seven and eight-tenths volts will appear at the junction 974. Because the junction 1044 is fifteen volts negative, current will tend to flow from ground via junction 962, photocell 518, junction 970, the upper section of potentiometer 972, junction 974, diode 1060, junctions 1058 and 1048, resistor 1046, base-emitter circuit of transistor 1030, junction 1040, resistor 1042, and junctions 1044, 1022, 1020, and 924 to conductor 604 in FIG. 25; and such a flow of current would keep that transistor conductive.

The negative voltage at the junction 974 will be more positive than the negative fifteen volts at junction 978; and hence current will flow from ground via junction 962, photocell 518, junction 970, the upper section of potentiometer 972, junction 974, resistor 976, the base-emitter circuit of transistor 968, resistor 980, and junctions 978, 940, 934, 932, 926 and 924 to conductor 604 in FIG. 25. That flow of current will render transistor 968 conductive. The resulting current flow from conductor 596 in FIG. 25 via junctions 988 and 986 in FIG. 30, resistor 984, junction 982, transistor 968, resistor 980, and junctions 978, 940, 934, 932, 926 and 924 to conductor 604 in FIG. 25 will provide a negative voltage at the junction 982 which is greater than eight volts. Such a voltage is too negative to cause current to flow through the base-emitter circuit of transistor 1030; and hence the voltage at junction 982 will tend to permit transistor 1030 to become non-conductive. However, because the voltage at junction 974 is sufficiently positive to tend to cause current to flow through the base-emitter circuit of transistor 1030, the negative voltage at junction 982 can not cause the transistor 1030 to become non-conductive.

With no bill in the testing area of the currency detector, the photocells 214 and 216 will establish a negative voltage of about seven and one-half volts at the junction 992; and a negative voltage of more than seven and eight-tenths volts will appear at the junction 996. Because the junction 1000 is fifteen volts negative, current will tend to flow from ground via junctions 962, 960, 958 and 956, photocell 214, junction 992, the upper section of potentiometer 994, junction 996, resistor 998, the base-emitter circuit of transistor 990, resistor 1002, and junctions 1000, 932, 926 and 924 to conductor 604 in FIG. 25. If the voltage at the base of transistor 990 is not too negative, that transistor will be slightly conductive; but if that voltage is about nine volts negative, that transistor will be biased beyond cut-off. If the transistor 990 is conductive, current will flow from conductor 596 in FIG. 25 via junctions 988, 986 and 1008 in FIG. 30, resistor 1006, junction 1004, transistor 990, resistor 1002, and junctions 1000, 932, 926 and 924 to conductor 604 in FIG. 25 and make the junction 1004 more positive than minus eight volts. If the transistor 990 is biased beyond cut-off, the voltage at junction 1004 will be even more positive. Because the junction 1044 is fifteen volts negative, current will tend to flow from conductor 596 in FIG. 25 via junctions 988, 986 and 1008 in FIG. 30, resistor 1006, junction 1004, diode 1062, junctions 1064 and 1048, resistor 1046, the base-emitter circuit of transistor 1030, junction 1040, resistor 1042, and junctions 1044, 1022, 1020 and 924 to conductor 604 in FIG. 25; and such a flow of current would keep that transistor conductive.

The negative voltage at the junction 996 is too negative to cause current to flow through the base-emitter circuit of transistor 1030; and hence the voltage at junction 996 will tend to permit that transistor to become non-conductive. However, because the voltages at junctions 974 and 1004 are sufficiently positive to tend to cause current to flow through the base-emitter circuit of transistor 1030, the negative voltage at junction 996 can not cause the transistor 1030 to become non-conductive.

With no bill in the testing area of the currency detector, the photocells 218 and 220 will establish a negative voltage of about ten volts at the junction 1012; and a negative voltage of more than ten volts will appear at the junction 1016. As a result, the transistor 1010 will be biased beyond cut-off; and hence the voltage at junction 1026 will be more positive than minus eight volts. Because the junction 1044 is fifteen volts negative, current will tend to flow from conductor 596 in FIG. 25 via junctions 988, 986 and 1008 in FIG. 30, resistor 1028, junction 1026, diode 1072, junctions 1070, 1066, 1064 and 1048, resistor 1046, the base-emitter circuit of transistor 1030, junction 1040, resistor 1042, and junctions 1044, 1022, 1020 and 924 to conductor 604 in FIG. 25; and such a flow of current would keep that transistor conductive.

The negative voltage at the junction 1016 is too negative to cause current to flow through the base-emitter circuit of transistor 1030; and hence the voltage at junction 1016 will tend to permit that transistor to become non-conductive. However, because the voltages at junctions 974, 1004 and 1026 are sufficiently positive to tend to cause current to flow through the base-emitter circuit of transistor 1030, the negative voltage at junction 1016 can not cause the transistor 1030 to become non-conductive.

Also with no bill in the testing area of the currency detector, the thyratron 790 in FIG. 29 will be non-conductive, and the voltage at junction 964 in FIG. 30 will be positive and will have a value of about five volts. If that voltage is more positive than the voltages at the anodes of diodes 1060, 1062 and 1072, it will block those diodes; and it will also cause current to flow through the base-emitter circuit of transistor 1030, thereby keeping that transistor conductive. All of this means that while the photocells 214, 216, 218, 220, 518 and 520 coact, when no bill is present in the testing area of the currency detector, to establish voltages at junctions 982, 996 and 1016 which would tend to permit the transistor 1030 to become non-conductive, those photocells also coact to establish voltages at junctions 974, 1004 and 1026 which would tend to keep the transistor 1030 conductive; and the thyratron 790 establishes a positive voltage at junction 964 which also tends to keep that transistor conductive.

When an authentic bill is in the testing area of the currency detector with its black-ink face up and its leading edge abutting the fingers 238 of the bill-blocking member 222, the photocells 518 and 520 will coact to develop a negative voltage of about seven and eight-tenths volts at junction 974, the photocells 214 and 216 will coact to develop a similar voltage at junction 996, and the photocells 218 and 220 will coact to develop a similar voltage at the junction 1016. The transistors 968, 990 and 1010 will respond to those voltages to develop negative voltages of about eight volts at the junctions 982, 1004 and 1026; and the resulting voltages at the anodes of diodes 1054, 1060, 1062, 1068, 1072 and 1074 will be sufficiently negative to tend to cause the transistor 1030 to become non-conductive. However, until the thyratron 790 becomes conductive, and permits the voltage at junction 964 to become negative and to have a value greater than eight volts, the positive voltage at junction 964 will keep current flowing through the base-emitter circuit of transistor 1030 and will thus keep that transistor conductive.

If a bill, which is inserted in the currency detector of the present invention, causes too much light to strike photocell 518, the resistance of that photocell will be too low, and the voltage at junction 974 will be more positive than minus seven and eight-tenths volts. That voltage will tend to cause current to flow through the base-emitter circuit of transistor 1030 and thereby keep that transistor conductive. However, if the inserted bill causes the photocell 518 to receive too little light, the resistance of that photocell will be too high; and the voltage at junction 974 will be more negative than minus seven and eight-tenths volts. The unduly negative voltage at junction 974 will make transistor 968 less conductive; and hence the voltage at junction 982 will be more positive than minus eight volts. That voltage will tend to cause current to flow through the base-emitter circuit of transistor 1030 and thereby keep that transistor conductive.

If an inserted bill causes photocell 520 to receive too little light, the resistance of that photocell will be too high and will make the voltage at junction 974 more positive than minus seven and eight-tenths volts. That voltage will tend to cause current to flow through the base-emitter circuit of transistor 1030 and thereby keep that transistor conductive. However, if the inserted bill causes photocell 520 to receive too much light, the resistance of that photocell will be too low and will make the voltage at junction 974 more negative than minus seven and eight-tenths volts. The transistor 968 will respond to the unduly negative voltage at the base thereof to become less conductive; and the voltage at junction 982 will become more positive than minus eight volts. That voltage will tend to cause current to flow through the base-emitter circuit of transistor 1030 and thereby keep that transistor conductive.

This means that if photocell 518 receives too much light or if photocell 520 receives too little light, the voltage at the movable contact of potentiometer 972 will be sufficiently positive to tend to cause current to flow through diode 1060 and the base-emitter circuit of transistor 1030. That current will keep that transistor conductive even if the other two pairs of photocells receive the correct amount of light and even if the magnetic head 492 causes the magnetic sensing system of FIG. 29 to fire thyratron 790. If photocell 518 receives too little light or if photocell 520 receives too much light, transistor 968 will become less conductive and the voltage at the collector of that transistor will be sufficiently positive to tend to cause current to flow through diode 1054 and the base-emitter circuit of transistor 1030. That current will keep that transistor conductive even if the other two pairs of photocells receive the correct amount of light and even if the magnetic head 492 causes the magnetic sensing system of FIG. 29 to fire thyratron 790.

It will thus be apparent that the photocells 518 and 520, the transistor 968 and the diodes 1054 and 1060 coact to provide a dual action. Specifically, if those photocells cause the voltage at the movable contact of potentiometer 972 to become unduly positive, current will tend to flow through diode 1060 and the base-emitter circuit of transistor 1030 and keep that transistor conductive. On the other hand, if those photocells make the voltage at the movable contact of potentiometer 972 unduly negative, the transistor 968 will make the voltage at the collector thereof unduly positive; and current will tend to flow through diode 1054 and the base-emitter circuit of transistor 1030 and keep the latter transistor conductive.

The photocells 214 and 216, the transistor 990, and the diodes 1062 and 1068 will operate in the manner in which the photocells 518 and 520, the transistor 968, and the diodes 1054 and 1060 operate. Specifically, if the photocell 214 receives too much light or if the photocell 216 receives too little light, the voltage at the movable contact of potentiometer 994 will become unduly positive; and current will tend to flow through diode 1068 and the base-emitter circuit of transistor 1030 and thereby keep that transistor conductive. On the other hand, if the photocell 214 receives too little light or if the photocell 216 receives too much light, the voltage at junction 996 will become unduly negative and transistor 990 will become less conductive and will make the voltage at the collector thereof unduly positive. That voltage will tend to cause current to flow through diode 1062 and the base-emitter circuit of transistor 1030, and keep that transistor conductive.

The photocells 218 and 220, the transistor 1010, and the diodes 1072 and 1074 also will operate in the manner in which the photocells 518 and 520, the transistor 968, and the diodes 1054 and 1060 operate. Specifically, if the photocell 218 receives too much light or if the photocell 220 receives too little light, the voltage at junction 1016 will become unduly positive; and current will tend to flow through diode 1074 and the base-emitter circuit of transitsor 1030 and thereby keep that transistor conductive. On the other hand, if the photocell 218 receives too little light or the photocell 220 receives too much light, the voltage at junction 1016 will be unduly negative and transistor 1010 will become less conductive and will make the voltage at the collector thereof unduly positive. That voltage will tend to cause current to flow through diode 1072 and the base-emitter circuit of transistor 1030 and thereby keep that transistor conductive. If more than one photocell receives too much light or if more than one photocell receives too little light, the diode which has the least negative voltage on the anode thereof will tend to become conductive and will tend to cause current to flow through the base-emitter circuit of transistor 1030 and keep that transistor conductive.

The resistance values of commercially-available photocells tend to vary rather widely; and hence the resistance values of photocells 214, 216, 218, 220, 518 and 520 could vary widely even if all of those photocells received the exact same amount of light. Furthermore, widely differing amounts of light are reflected onto the various photocells 214, 216, 218, 220, 518 and 520 from an authentic bill. However, by pairing the photocells, by connecting the photocells of each pair in series, and by connecting a potentiometer in parallel with one photocell of each pair of photocells, the present invention fully compensates for inherent differences in the resistances of the various photocells.

*Operation of change-making device when a quarter is inserted*

When a quarter is inserted in the change-making device with which the currency detector is used, that quarter will engage the actuator for the switch 742 in FIG. 27 and thereby close that switch; and then that quarter will pass to the cash box. As that quarter moves beyond the actuator for switch 742, that switch will re-open; but, while that switch is closed, current will flow from the right-hand prong of plug 554 in FIG. 25 via conductor 558, junctions 770, 768, 764, 760, 758, 744 and 700, resistor 702, diode 704, junctions 706, 714, and 722, relay coil 644, junctions 730 and 732, switch 742, junction 738, conductor 694, junctions 736, 734, 710 and 688, lower and movable contacts of switch 276, junction 680, conductor 556, and junction 629 to the left-hand prong of plug 554. The resulting energization of relay coil 644 will close contacts 646 in FIG. 27, will close contacts 648 in FIG. 26, will open contacts 650 in FIG. 26, and will open contacts 652 and 653 in FIG. 28.

The closing of contacts 646 will establish a holding circuit for relay coil 644; and that circuit extends from the right-hand prong of plug 554 via conductor 558, junctions 770, 768, 764, 760, 758, 744 and 700, resistor 702, diode 704, junctions 706, 714 and 722, relay coil 644, junctions 730 and 732, contacts 646, junctions 728 and 720, switch 272, junction 734, conductor 694, junctions 710 and 688, the lower and movable contacts of switch 276, junction 680, conductor 556, and junction 629 to the left-hand prong of plug 554. The closing of contacts 648 energizes motor 746 in FIG. 26 by a starting circuit which extends from the right-hand prong of plug 554 via conductor 558, junctions 770, 768, 764, 760, 758 and 744, motor 746, the movable and upper contacts of switch 270, junction 752, contacts 648, junctions 750 and 748, conductor 694, junctions 738, 736, 734, 710 and 688, the lower and movable contacts of switch 276, junction 680, conductor 556, and junction 629 to the left-hand prong of plug 554. The closing of contacts 648 also energizes electromagnets 451 and 453 by a circuit which extends from the right-hand prong of plug 554 via conductor 558, junctions 770, 768, 764 and 760, in part through electromagnet 453 to junction 756 and in part past junction 758 and through electromagnet 451 to junction 756, junction 752, contacts 648, junctions 750 and 748, conductor 694, junctions 738, 736, 734, 710 and 688, the lower and movable contacts of switch 276, junction 680, conductor 556, and junction 629 to the left-hand prong of plug 554. The opening of contacts 650 in FIG. 26 is not significant at this time. However, the opening of contacts 652 will disconnect the left-hand contact 620 from conductor 556, and will thereby keep the insertion of an authentic bill, of the proper denomination into the currency detector, from initiating a cycle of operation of that currency detector. The opening of contacts 653 in FIG. 28 de-energizes the coin return electromagnet 692, and that electromagnet will prevent the acceptance of further coins as long as it is de-energized.

The motor 746 will rotate the shaft 207 in the clockwise direction in FIGS. 24 and 26–28; and, very quickly, the cam 266 will cause the movable contact of switch 270 to move down into engagement with the lower contact of that switch. Thereupon, a running circuit for motor 746 will be established; and that circuit extends from the right-hand prong of plug 554 via conductor 558, junctions 770, 768, 764, 760, 758 and 744, motor 746, the movable and lower contacts of switch 270, the movable and lower contact of the switch 464, junction 754, conductor 694, junctions 748, 738, 736, 734, 710 and 688, the lower and movable contacts of switch 276, junction 680, conductor 556, and junction 629 to the left-hand prong of plug 554. As the motor 746 continues to rotate the shaft 207, the cams 209, 211, 213, 215 and 217 will engage the rollers on the actuators 338, and will thereby rotate those actuators short distances in the clockwise direction. Continued rotation of the shaft 207 will cause the cams 209, 211, 213, 215 and 217 to release the actuators 338; but the actuators adjacent the electromagnets 455, 457 and 459 will be intercepted and held by the armatures of those electromagnets. Consequently, the ejectors 161, 163 and 165 will remain stationary, and no quarters will be dispensed. However, the actuators 338 adjacent the electromagnets 451 and 453 will rotate in the counter clockwise direction and move the ejectors 157 and 159 relative to the coin tubes 180 and 182; and those ejectors will dispense a nickel and a dime. As the shaft 207 continues to rotate, the second lobe of cam 211 will move the actuator 338, which is adjacent electromagnet 453, back to the position shown by FIG. 24 and will again release that actuator; and that actuator will then cause the ejector 159 to dispense a second dime.

After that second dime has been dispensed, but before the shaft 207 reaches the end of a revolution, the cam 264 will move the notch therein into register with the roller 283 on the lever 282. If the level of the coins in any of the tubes 180, 182, 184, 187 and 189 happened to be too low, the shaft 280 would rotate the lever 282 to the dotted-line position of FIG. 24, and would thereby shift the movable contact of switch 276 into engagement with the upper contact of that switch. Thereupon, the relay coil 644, the motor 746, and the electromagnets 451 and 453 would become de-energized; and no further change would be dispensed. Also, the motor 434 would be de-energized. The coin return electromagnet 692 would remain de-energized; and hence no further coins could be inserted in the change-making device until a service man re-filled the empty tube. However, if a predetermined minimum number of coins is present in each of the tubes 180, 182, 184, 187 and 189, the shaft 280 will hold the lever 282 in the solid-line position of FIG. 24, and the movable contact of switch 276 will remain in engagement with the lower contact of that switch. This means that the relay coil 644, the motors 746 and 434, and the electromagnets 451 and 453 will remain energized.

Shortly before the shaft 207 reaches the end of a revolution, the notch of the cam 266 will permit the switch 272 in FIG. 27 to open; and, thereupon, the holding circuit for the relay coil 644 will be interrupted. This means that the contacts 646 and 648 will re-open and that the contacts 650, 652 and 653 will re-close. The re-opening of the contacts 648 will de-energize the electromagnets 451 and 453 and will enable the armatures of those electromagnets to intercept and hold the actuators 338, which are adjacent the cams 209 and 211, when those cams again move those actuators to the positions shown by FIG. 24. The re-opening of the contacts 648 also will interrupt the starting circuit for the motor 746. The re-opening of the contacts 646 will keep the holding circuit for the relay coil 644 from being re-established when the switch 272 is subsequently permitted to re-close. The re-closing of contacts 650 will re-connect the upper contact of switch 464 with the left-hand prong of plug 554. The re-closing of contacts 652 will re-connect the left-hand contact 620 to conductor 556; and hence the insertion of an authentic bill of the proper denomination into the currency detector will be able to initiate a cycle of operation of that currency detector. The re-closing of contacts 653 will re-energize the coin return electromagnet 692; and hence further coins can be inserted in the change-making device.

Almost immediately after cam 266 opens switch 272, the notch of the cam 466 will permit the movable contact of switch 464 to move up into engagement with the upper contact of that switch; and current will then flow from the right-hand prong of plug 554 via conductor 558, junctions 770, 768, 764, 760, 758 and 744, motor 746, the movable and lower contacts of switch 270, the movable and upper contacts of switch 464, contacts 650, junctions 750 and 748, conductor 694, junctions 738, 736, 734, 710 and 688, the lower and movable contacts of switch 276, junction 680, conductor 556, and junction 629 to the left-hand prong of plug 554. If, by mischance, the quarter switch 742 had become stuck in the closed position or the armature of relay coil 644 had become stuck in the energized position, the contacts 650 would have remained open and the motor 746 would have come to rest; and hence the sticking of that switch or of that armature could not automatically initiate further cycles of operation of the change-making device. However, if contacts 650 are closed, the motor 746 will continue to rotate the shaft 207.

The notch of the cam 266 will permit switch 272 to be open for just a short period of time; and, similarly, the notch of the cam 466 will permit the movable contact of switch 464 to be in engagement with the upper contact of that switch for just a short period of time. Consequently, switch 272 will re-close, and the movable contact of switch 464 will move back into engagement with the lower contact of that switch, before the shaft 207 reaches the end of a revolution. The re-closing of the switch 272 will not be significant at this time because contacts 646 will be open. The moving of the movable contact of switch 464 back into engagement with the lower contact of that switch will re-establish the running circuit for motor 746 which includes the movable and lower contacts of switch 270 and the movable and lower contacts of switch 464; and hence that motor will continue to rotate the shaft 207.

As the shaft 207 reaches the end of its revolution, the notch of cam 266 will permit the movable contact of switch 270 to move back up into engagement with the upper contact of that switch. Because the contacts 648 are open, that movement of that movable contact will de-energize the motor 746; and, thereupon, the shaft 207 will come to rest.

All of this means that the insertion of a quarter in the change-making device initiated a cycle of operation of that change-making device, wherein the shaft 207 made one complete revolution and then came to rest. The coin return electromagnet 692 was de-energized throughout the greatest part of that revolution, and the electromagnets 451 and 453 were energized throughout the greatest part of that revolution. Consequently, any further coins that might have been inserted in the change-making device would have been rejected; and the ejectors 157 and 159 ejected a nickel and two dimes as change. The levels of the coins in the tubes 180, 182, 184, 187, and 189 were checked; and the current path for the motor 746 was transferred from the lower contact to the upper contact of switch 464 to make certain that quarter switch 742 had not become stuck closed and that the armature of relay coil 644 had not become stuck in its energized position. Also additional coins were introduced into any of coin tubes 180, 182, 184, 187 and 189 which required them, all as disclosed by the said Erickson application. Consequently, the change-making device dispensed exact change, in the form of a nickel and two dimes, while fully protecting the patron and also fully protecting the proprietor of that change-making device.

*Operation of change-making device when a half-dollar is inserted*

When a half-dollar is inserted in the change-making device, that half-dollar will engage the actuator for the switch 740 in FIG. 27 and thereby close that switch; and then that half-dollar will pass to the cash box. As that half-dollar moves beyond the actuator for switch 740, that switch will re-open; but while that switch is closed, current will flow from the right-hand prong of plug 554 via conductor 558, junctions 770, 768, 764, 760, 758, 744 and 700, resistor 702, diode 704, junctions 706, 714 and 722, relay coil 654, junctions 724 and 726, switch 740, junction 736, conductor 694, junctions 734, 710 and 688, the lower and movable contacts of switch 276, junction 680, conductor 556, and junction 629 to the left-hand prong of plug 554. The resulting energization of relay coil 654 will close contacts 656 and 658 in FIG. 27, will open contacts 660 in FIG. 28, and will close contacts 662 in FIG. 26. The closing of contacts 656 in FIG. 27 will establish a holding circuit for relay coil 654; and that circuit extends from the right-hand prong of plug 554 via conductor 558, junctions 770, 768, 764, 760, 758, 744 and 700, resistor 702, diode 704, junctions 706, 714, and 722, relay coil 654, junctions 724 and 726, contacts 656, junctions 728 and 720, switch 272, junction 734, conductor 694, junctions 710 and 688, the lower and movable contacts of switch 276, junction 680, conductor 556, and junction 629 to the left-hand prong of plug 554. The opening of contacts 660 will disconnect the left-hand contact 620 from conductor 556, and will thereby keep the insertion of an authentic bill, of the proper denomination into the currency detector, from initiating a cycle of operation of that currency detector. The closing of contacts 662 will cause current to flow from the right-hand prong of plug 554 via conductor 558, junctions 770, 768 and 764, electromagnet 455, contacts 662, junction 762, conductor 694, junctions 754, 748, 738, 736, 734, 710 and 688, the lower and movable contacts of switch 276, junction 680, conductor 556, and junction 629 to the left-hand prong of plug 554. The resulting energization of electromagnet 455 will hold the armature of that electromagnet out of the path of the actuator 338 which is adjacent cam 213 and ejector 161 in FIG. 24. The closing of contacts 658 will establish an energizing and holding circuit for relay coil 644; and that circuit extends from the right-hand prong of plug 554 via conductor 558, junctions 770, 768, 764, 760, 758, 744 and 700, resistor 702, diode 704, junctions 706, 714 and 722, relay coil 644, junction 730, contacts 658, junctions 724 and 726, contacts 656, junctions 728 and 720, switch 272, junction 734, conductor 694, junctions 710 and 688, the lower and movable contacts of switch 276, junction 680, conductor 556, and junction 629 to the left-hand prong of plug 554. The resulting energization of relay coil 644 will initiate a cycle of operation of the change-making device; largely in the manner described in the immediately-preceding section. However, as the shaft 207 rotates the cams 209, 211, 213, 215 and 217 past the rollers of the actuators 338, the actuator 338 which is adjacent the cam 213 will move with the actuators 338 which are adjacent the cams 209 and 211; and hence a quarter, as well as a nickel and two dimes, will be dispensed during the revolution of that shaft. Also, as switch 272 is opened by the cam 266, the relay coil 654, as well as the relay coil 644, will be de-energized. This means that the transference of the current path for motor 746 from the lower to the upper contacts of switch 464 will check to make sure that switch 740 has not become stuck in closed position and that the armature of relay coil 654, as well as the armature of relay coil 644, has not become stuck in the energized position. Consequently, the change-making device will respond to the insertion of a half-dollar to dispense exact change, in the form of a nickel, two dimes and a quarter, while fully protecting the patron and also fully protecting the proprietor of that change-making device.

*Operation of currency detector when acceptable bill is inserted*

To insert a bill 1100 into the currency detector, a patron will place the leading edge of that bill wholly upon the bill-receiving platform 96 or partly upon that platform and partly upon the extension 98 of that platform, and will then push that leading edge into the entry slot of the currency detector. Where the patron places the leading edge of the bill 1100 wholly upon the platform 96, the guide 100 and the flange 102 will help the patron guide that bill into the entry slot; and the arcuate nature of the offset 256, which is emphasized by FIG. 19, will help guide the leading edge of the bill into the entry slot.

If the leading edge of a bill 1100 is heavily wrinkled, it will be desirable to place that leading edge partly upon the bill-receiving platform 96 and partly upon the extension 98 of that platform and to incline that leading edge to the plane of the front wall 260 of the upper section of the currency detector. Where that is done, the leading edge of the bill 1100 will have point contact rather than line contact with the entry slot of the currency detector; and hence it will be a simple matter to push the leading edge of that bill into that entry slot. Wrinkles which are in, and which are spaced along the length of, the leading edge of the bill 1100 and which could impede the insertion of the bill into the entry slot, if the leading edge of the bill were placed wholly upon the platform 96, will readily pass under and be smoothed down by the offsets 256 and 258 as the bill is moved angularly toward the testing area defined by the platens 92 and 250.

Whether the leading edge of the bill 1100 is placed wholly upon the platform 96 or is placed partly upon that platform and partly upon the extension 98 of that platform, the leading edge of that bill will be pushed through the entry slot of the currency detector and will be moved into engagement with the bill-receiving buttons 410 and 418. The semi-spherical configurations of those buttons will enable the leading edge of the bill 1100 to raise those buttons and thereby close switches 406 and 414 in FIG. 29. Current will then then flow from conductor 596 in FIG. 25 via relay coil 618 in FIG. 29, switches 414 and 406, and junction 776 to ground; and the resulting energization of that relay coil will close contacts 620 in FIG. 28 and will open contacts 622 in FIG. 27. The opening of contacts 622 makes certain that the relay coil 664 can not be energized until the bill 1100 has been moved out from under the buttons 410 and 418. The closing of contacts 620 completes a circuit which extends from a right-hand prong of plug 554 via conductor 558, junctions 770, 768, 764, 760, 758, 744, 700, 696, 690 and 682, motor 434, junction 684, contacts 620, 652, 660 and 670, junctions 686 and 688, the lower and movable contacts of switch 276, junction 680, conductor 556, and junction 629 to the left-hand prong of plug 554.

The resulting energization of motor 434 will start the output shaft 436 rotating in the clockwise direction in FIGS. 27–29 and in the counterclockwise direction in FIGS. 13–17. The eccentric 473 will rotate with the shaft 436; and that eccentric will move the lever 474 and will cause that lever to rotate the pendulum 488. Initially, the eccentric 473 will move the lever 474 to the left in FIG. 13 in a generally-horizontal direction. After shaft 436 has rotated about twenty-five degrees, the cam 456 will shift the movable contact of switch 444 in FIG. 29 out of engagement with the left-hand contact and into engagement with the right-hand contact of that switch. That shifting pre-sets energizing circuits for the relay coil 632 in FIG. 29, and it also pre-sets an energizing circuit for the relay coil 624 in FIG. 30. At this time, the eccentric 473 will have shifted the lever 474 far enough to the left to cause that lever to hold the pendulum 488 at an angle which is spaced below the horizontal more than fifty degrees.

After the shaft 436 has rotated a total of about thirty degrees, the cam 458 will shift the movable contact of switch 446 in FIG. 28 out of engagement with the lower contact and into engagement with the upper contact of that switch. Thereupon, the coin return electromagnet 692 will become de-energized and will cause any coins that are subsequently inserted into the change-making device to be returned to the patron. As the movable contact of switch 446 moves into engagement with the upper contact of that switch, it will establish a running circuit for motor 434; and that circuit extends from the right-hand prong of plug 554 via conductor 558, junctions 770, 768, 764, 760, 758, 744, 700, 696, 690 and 682, motor 434, junction 684, the upper and movable contacts of switch 446, junctions 686 and 688, the lower and movable contacts of switch 276, junction 680, conductor 556, and junction 629 to the left-hand prong of plug 554. That running circuit will keep the motor 434 energized even after the contacts 620 re-open.

After the shaft 436 has rotated a total of about thirty-five degrees, the lobe on cam 454 will move beyond the right-hand end of lever 528 in FIG. 13; and, thereupon, the spring 402 will act through bracket 398 to force the sub-frame 388 to move downwardly toward the platen 250. This means that the rollers 394 will be forced downwardly against the bill 1100 and will coact with the rollers 190 to grip that bill.

At this time, the eccentric 473 will have shifted the lever 474 far enough to the left to have rotated the pendulum 488 a few more degrees toward the horizontal. Moreover, that eccentric will have started moving the right-hand end of the lever 474 downwardly; and the fulcrum 468 will have caused the left-hand end of that lever to start moving upwardly.

Also, after the shaft 436 has rotated a total of about thirty-five degrees, the cam 460 will permit switch 448 in FIG. 28 to close; and, thereupon, current will flow from the right-hand prong of plug 554 via conductor 558, junctions 770, 768, 764, 760, 758, 744, 700, 696, 690, 682 and 676, partly through the forward winding of motor 146 to junction 675 and partly through the reverse winding of that motor and junction 673 and capacitor 148 to junction 675, and then through switch 448, contacts 638, junction 674, conductor 556, and junctions 680 and 629 to the left-hand prong of plug 554. The resulting rotation of output shaft 154 will cause sprocket chain 164 to rotate shaft 160, and hence the rollers 166, in the clockwise direction in FIG. 19, because the rollers 341 will be in engagement with the rollers 166, the rollers 341 will rotate in the counterclockwise direction. The sprocket pinions 170 and 172 and sprocket chain 181 will cause shaft 174 and the rollers 178 to rotate in the clockwise direction in FIG. 19. Because sub-frame 366 is holding the rollers 372 up out of engagement with the rollers 178, the rollers 372 will remain at rest. The sprocket pinions 183 and 184 and sprocket chain 192 will rotate shaft 186, and hence the rollers 190, in the clockwise direction in FIG. 19. Those rollers will act through the inserted bill 1100 to force the rollers 394 to rotate in the counterclockwise direction; and sence the rollers 190 and 394 will coact to move the bill 1100 to the right in FIG. 19.

The cam 460 will permit the switch 448 to remain closed, and will thus cause the motor 146 to rotate the rollers 190, until the output shaft 436 has rotated a total of about seventy-five degrees. At this time, the eccentric 473 will have shifted the lever 474 far enough to the left to rotate the pendulum 488 until that pendulum is inclined at an angle which is spaced below the horizontal less than fifty degrees. Also, at this time, the long dwell of cam 460 will re-open switch 448 and de-energize motor 146. However, while that motor was energized, it rotated the rollers 190 through a peripheral distance greater than the maximum width of any bill which should be accepted by the currency detector. This means that the rollers 190 and 394 moved the bill 1100 far enough into the area defined by the platens 92 and 250 to enable the trailing edge of that bill to be spaced inwardly of the points of tangency of those rollers. Consequently, the leading edge of the bill 1100 will be abutting the fingers 238 on the arms 236 of the bill-blocking member 222.

As the bill 1100 moves between the offsets 94 and 256 or between the offsets 94, 256 and 258, successive portions of that bill will be bent along lines that are generally parallel to the long axis of that bill. This is desirable because it will tend to minimize or eliminate all wrinkles that extend transversely of that long axis.

Because the fingers 238 are spaced from the points of tangency of rollers 190 and 394 distances greater than the maximum width of any bill which should be accepted by the currency detector, an acceptable bill that is slightly skewed as it is inserted in the entry slot of the currency detector will be able to aline its leading edge with the alined fingers 238 on the bill-blocking member 222. Specifically, that portion of the trailing edge, of an acceptable bill 1100 which is spaced inwardly of the rest of that trailing edge, will move inwardly of the points of tangency of rollers 190 and 394 and then receive no further inwardly-directed forces; whereas that portion of the trailing edge of the bill, which is spaced outwardly of the first portion of that trailing edge, will continue to receive inwardly-directed forces from rollers 190 and 394 and will thus continue to move inwardly until it too passes inwardly beyond the points of tangency of those rollers. In this way, any acceptable bill which is skewed as it passes through the entry slot will automatically aline the leading edge thereof with the alined fingers 238 on bill-blocking member 222.

Also because the fingers 238 on bill-blocking member 222 are spaced inwardly of the points of tangency of rollers 190 and 394 distances greater than the maximum width of an acceptable bill, those rollers will not be able to engage the trailing edge of an acceptable bill and jam the leading edge of that bill against those fingers. This means that the rollers 190 and 394 cannot bow, wrinkle or crumple an acceptable bill, and thereby prevent proper sensing of that bill. Instead, as an acceptable bill moves inwardly of the points of tangency of rollers 190 and 394, that bill will have a full opportunity to lie flat on the platen 92 with its leading edge abutting the fingers 238 on bill-blocking member 222, and with the buttons 410 and 418 applying relatively-light, downwardly-directed holding forces to that bill.

After the shaft 436 has rotated a total of about one hundred and fifteen degrees, the lobe on cam 467 will move beyond the right-hand end of lever 540 in FIG. 16; and, thereupon, the spring 402 will act through bracket 374 to force the sub-frame 366 to move downwardly toward the platen 250. This means that the rollers 372 will be forced downwardly against the bill 1100 and will coact with the rollers 178 to grip that bill. At this time, the rollers 178 will be stationary, because the switch 448 is open; and hence the rollers 372 also will be stationary. As a result, the bill 1100 will be held stationary within the testing area of the currency detector—the rollers 178 and 372 gripping that bill adjacent the leading edge thereof and the buttons 410 and 418 pressing downwardly on that bill adjacent the trailing edge thereof.

At this time, the eccentric 473 will have moved the lever 474 far enough to the left to cause the pendulum 488 to incline at an angle which is spaced below the horizontal less than forty degrees. Also, that eccentric will have moved the right-hand end of lever 474 downwardly a short distance, and the fulcrum 468 will have caused the left-hand end of that lever to move up a short distance. However, the notch 476 in the lower edge of lever 474 will still be engaging and holding the pin 496 on the pendulum 488.

As the bill 1100 was moved into the testing area of the currency detector, that bill interrupted the light beams from the lamps 206, 208, 210, 212, 514 and 516 and caused the light from those lamps to be reflected, respectively, onto the photocells 214, 216, 218, 220, 518 and 520. The amount of light that was reflected onto those photocells varied as the light and dark portions of the upper and lower faces of the bill passed through the beams of light from those lamps; and hence the resistances of those photocells varied. Even if, while the bill 1100 was being moved toward the fingers 238 of the bill-blocking member 222, some combination or combinations of light and dark portions on the faces of that bill happened to cause negative voltages, equal to or greater than seven and eight-tenths volts, to appear at the anodes of all of diodes 1054, 1060, 1062, 1068, 1072 and 1074, the transistor 1030 would not become conductive. As pointed out hereinbefore, the current which flows from conductor 570 in FIG. 25 via resistor 788 in FIG. 29, junction 786, conductor 784, junction 780, conductor 782, resistor 966 in FIG. 30, junction 964, resistor 967, and junctions 942, 940, 934, 932, 926, and 924, conductor 604 in FIG. 25, junction 602, Zener diode 616, and junction 612 to ground will maintain a positive voltage of about five volts at junction 964 in FIG. 30; and the resulting flow of current through the base-emitter circuit of transistor 1030 will keep that transistor conductive. This is desirable, because it obviates all need of keeping the lamps "off" until after the bill 1100 has moved the leading edge thereof fully into engagement with the fingers 238 on the bill-blocking member 222.

As the leading edge of the bill 1100 reaches the fingers 238 on bill-blocking member 222, the light which is reflected from the faces of that bill onto the photocells 214, 216, 218, 220, 518 and 520 will cause the voltages at the anodes of all of diodes 1054, 1060, 1062, 1068, 1072 and 1074 to be negative and to equal or exceed seven and eight-tenths volts. However, because the thyratron 790 will still be non-conductive, the voltage at the junction 964 in FIG. 30 will be about plus five volts; and the resulting current flow through the base-emitter circuit of transistor 1030 will keep that transistor conductive. This means that even though the optical sensing system of FIG. 30 tends to initiate an accept signal by tending to render the transistor 1030 non-conductive, that transistor cannot become non-conductive until both the magnetic sensing system of FIG. 29 and the optical sensing system of FIG. 30 simultaneously tend to render the transistor 1030 non-conductive.

As the shaft 436 continues to rotate, the eccentric 473 will cause the right-hand end of lever 474 to continue to move downwardly; and the fulcrum 468 will continue to cause the left-hand end of that lever to move upwardly. Also, the eccentric will cause the lever 474 to start moving to the right. After the shaft 436 has rotated a total of about one hundred and thirty degrees, the eccentric 473 will have forced the right-hand end of lever 434 down far enough to cause the notch 476 in the lower edge of that lever to rise upwardly above the level of the pin 496 on the pendulum 488. Thereupon, the masses of that pendulum, of the magnetic head 492, of the thickness detector 494, and of the weight 490 will cause that pendulum to rotate in the counter clockwise direction, and thereby move that thickness detector and that magnetic head toward the inserted bill 1100. The lower end of the thickness detector 494 will just graze the upper surface of that bill, unless that bill has a wrinkle therein; but the magnetic head 492 will engage that bill and force that bill down against the resilient pad 116 within the recess 114 in the platen 92. The convex upper surface of the pad 116 will yield as the magnetic head 492 forces the bill 1100 against it; and that upper surface will coact with the lower face of the magnetic head 492 to cause that portion of the bill 1100 which is engaged by that lower face to progressively bow into intimate engagement with that lower face. The masses of weight 490, of pendulum 488, of magnetic head 492, and of thickness detector 494 will combine to enable that pendulum to act as an inertial member which has a large mass to volume ratio. As a rseult, that pendulum will respond to the force of gravity to move downwardly at a pre-determined speed; and, in the preferred embodiment of the present invention, that speed will be about thirty inches per second. The pendulum 488 will rotate downwardly through the vertical and then continue to rotate in the counter clockwise direction until the weight 490 engages the spring 402. That spring will yield somewhat as it is engaged by the weight 490, and it will thereby provide cushioning for the halting of the counter clockwise rotation of the pendulum 488. Thereafter, that pendulum will respond to the force of gravity to move back into a position which is close to the position shown by FIG. 15. This means that the lower face of the magnetic head 492 will be displaced laterally and upwardly from the resilient pad 116; and hence that magnetic head will not impede movement of the bill 1100 relative to the platens 92 and 250.

As the magnetic head 492 moves into engagement with the bill 1100, the air gap of that magnetic head will move parallel to the long axis of that bill and successively engage some of the ink markings on the bill; and that magnetic head will cooperate with those ink markings and the circuitry in FIG. 29 to cause the thyratron 790 to "fire," all as described hereinbefore. As that thyratron "fires," it will establish a relatively low resistance path between the junction 786 and ground via conductor 792; and hence the voltage at the junction 786 will decrease sharply. Also, and importantly, the voltage to the junction 964 in FIG. 30 will fall until it is negative and has a value in excess of eight volts. Since the lamps and photocells and the circuitry of FIG. 30 have previously established, and will be maintaining, negative voltages at the anodes of diodes 1054, 1060, 1062, 1068, 1072 and 1074 which exceed seven and one-half volts, the drop in voltage at junction 964 will enable the voltage at junction 1048 to become negative and to have a value equal to or in excess of seven and one-half volts. Thereupon, the conductivity of transistor 1030 will decrease.

As the transistor 1030 becomes less conductive, current will flow from conductor 596 in FIG. 25 via junction 988 in FIG. 30, register 1032, junction 1034, resistor 1036, junction 1038, resistor 1084, junction 1086, shunt 1090, the movable contact of potentiometer 1088, the base-emitter circuit of transistor 1076, junction 1040, resistor 1042, and junctions 1044, 1022, 1020 and 924 to conductor 604 in FIG. 25. The transistor 1076 will respond to that flow of current to become conductive; and, because the transistors 1030 and 1076 and the associated resistors constitute a Schmitt trigger, the transistor 1030 will immediately become nonconductive and the transistor 1076 will immediately start conducting heavily. Thereupon, current will flow from conductor 596 in FIG. 25 via junction 988 in FIG. 30, resistor 1032, junctions 1034 and 1078, relay coil 624, contacts 642, junctions 1094 and 1082, transistor 1076, junction 1040, resistor 1042, and junctions 1044, 1022, 1020 and 924 to conductor 604 in FIG. 25. The resulting flow of current will energize relay coil 624 in FIG. 30; and that relay coil will close contacts 626 in FIG. 30, will open contacts 628 in FIG. 29, and will close contacts 630 in FIG. 27. The closing of contacts 626 establishes a holding circuit for relay coil 624 which extends from conductor 596 in FIG. 25 via junction 988 in FIG. 30, resistor 1032, junctions 1034 and 1078, relay coil 624, contacts 642, junction 1094, diode 1096, contacts 626, conductor 922, the right-hand and movable contacts of switch 444 in FIG. 29, and junction 776 to ground. That holding circuit will keep the relay coil 624 energized as long as the dwell of the cam 456 holds the movable contact of switch 444 in FIG. 29 in engagement with the right-hand contact of that switch.

The opening of contacts 628 in FIG. 29 will keep the relay coil 632 from being energized when the switch 450 is subsequently closed. The closing of contacts 630 in FIG. 27 will complete a circuit which extends from the right-hand prong of plug 554 via conductor 558, junctions 770, 768, 764, 760, 758, 744, 700 and 696, solenoid 242, junction 698, contacts 630, junction 629, and conductor 556 to the left-hand prong of plug 554. The resulting energization of solenoid 242 will cause the plunger of that solenoid to rotate the bill-blocking member 222 from the solid-line position to the dotted-line position in FIG. 23. This means that the upper ends of the fingers 238 will move down below the level of the upper surface of platen 92 and that the upper ends of the fingers 234 will move up into the openings 294 in platen 250. Consequently, the bill's path to the cash box will be open, and the bill's return path to the platform 96 will be blocked.

The thyratron 790 will become conductive, the transistor 1030 will become non-conductive, the transistor 1076 will become conductive, the relay coil 624 will become energized, and the solenoid 242 will become energized in just a small fraction of a second. As a result, at the time the bill-blocking member 222 is rotated to the dotted-line position in FIG. 23, the shaft 436 will have rotated a total of less than one hundred and thirty-five degrees. As that shaft continues to rotate, the eccentric 473 will continue to move the right-hand end of lever 474 downwardly, and will thus move the left-hand end of that lever upwardly toward the position shown by FIG. 15. Prior to the time the shaft 436 has rotated a total of one hundred and fifty-five degrees, the eccentric 473 will have forced the upper edge of lever 474 to engage the ear 502 on lever 500 and to rotate that lever in the clockwise direction until the long arm of that lever engages and moves the pin 496 on the pendulum 488. This means that prior to the time the shaft 436 has rotated a total of one hundred and fifty-five degrees, the magnetic head 492 will have been moved laterally and upwardly away from the resilient pad 116 and the bill 1100.

After the shaft 436 has rotated a total of one hundred and fifty-five degrees, the notch in cam 462 in FIG. 29 permit switch 450 to close. However, the closing of that switch will not be significant at this time because contacts 628 will be held open by the relay coil 624.

As the shaft 436 continues to rotate, the eccentric 473 will continue to move the lever 474 to the right. That movement will not, at this time, affect the position of the lever 500; and hence that lever will continue to hold the pendulum 488 in the position shown by FIG. 15.

After the shaft 436 has rotated a total of about one hundred and eighty degrees, the elongated notch in cam 460 will permit the switch 448 to close again and to reestablish the previously-described forward-running circuit for motor 146. Consequently, that motor will again cause the shafts 160, 174 and 186 and the rollers 166, 178 and 190 to rotate in the clockwise direction and will cause the rollers 341, 372 and 394 to rotate in the counterclockwise direction in FIG. 19. The rotation of the rollers 190 and 394 will not be significant at this time because the trailing edge of the bill 1100 will be disposed inwardly of the points of tangency of those rollers. However, the rotation of the rollers 166, 178, 341 and 372 will force the bill 1100 to move to the right in FIG. 19 and thus to move toward the cash box.

At about the time the long notch of cam 460 permits the switch 448 to re-close, the cam 465 permits the switch 452 in FIG. 27 to close. The closing of the latter switch pre-sets an energizing circuit for relay coil 664.

After the shaft 436 has rotated a total of about one hundred and eighty-five degrees, the cam 462 will re-open the switch 450. The re-opening of that switch will not be significant at this time, because the contacts 628 remained open and prevented energization of relay coil 632.

Prior to the time shaft 436 has rotated a total of two hundred degrees, the eccentric 473 will start moving the right-hand end of lever 474 upwardly; and that lever will rotate in the counter clockwise direction about the fulcrum 468, and will permit the left-hand end thereof to move downwardly. The lever 500 will respond to the downward movement of the left-hand end of lever 474 to rotate its long arm away from the pin 496 on the pendulum 488. However, that pendulum will respond to its mass plus the masses of weight 490, magnetic head 492, and of thickness detector 494 to remain in the position shown by FIG. 15. This means that the magnetic head 492 will not impede any movement of the bill 1100.

As the shaft 436 continues to rotate, the eccentric 473 will continue to move the right-hand end of lever 474 upwardly; and the left-hand end of that lever will continue to move downwardly. Prior to the time the shaft 436 rotates a total of two hundred and seventy degrees, the notch 476 in the lower edge of lever 474 will move down into register with the pin 496 on the pendulum 488. This is desirable, because it will enable the further rotation of that shaft to cause that eccentric and that lever to rotate the pendulum 488 toward the position shown by FIG. 13.

After the shaft 436 has rotated a total of about two hundred and seventy degrees, the lobe on cam 454 will re-engage the right-hand end of lever 528 and force that lever to rotate to the position shown in FIG. 13. At such time, that lever will coact with connecting bar 532 and pin 536 to raise the sub-frame 388 upwardly—thereby returning the rollers 394 to their normal raised positions.

When the motor 146 was re-energized and the bill 1100 was started moving toward the cash box, the leading edge of that bill quickly engaged the lower end of lever 346 in FIG. 19 and caused that lever to rotate in the counter clockwise direction. That rotation of lever 346 increased the tension in the spring 364; and lever 350 tended to respond to the tension in that spring to rotate with lever 346. However, lever 350 could not rotate very far in the counter clockwise direction in FIG. 19 because the foot 352 thereof quickly engaged and was held by the bill 1100; and hence lever 350 was unable to move far enough to permit the switch 364 to close.

At the motor 146 continues to run, the bill 1100 will continue to move to the right in FIG. 19; and the leading edge of that bill will continue to move the lower end of lever 346. Even when the lever 346 is rotated to the position shown by FIG. 20, the lever 350 will continue to be held by the bill 1100; and, consequently, the switch 360 will remain open. In fact, as long as the bill 1100 underlies the foot 352 on lever 350, the switch 360 will remain open.

Shortly after the leading edge of the bill 1100 engages lever 346 and starts rotating that lever in the counter clockwise direction, the trailing edge of that bill will move out from beneath the buttons 410 and 418. Thereupon, the switches 406 and 414 in FIG. 29 will re-open and will de-energize relay coil 618; and contacts 620 in FIG. 28 will re-open and contacts 622 in FIG. 27 will re-close. The re-opening of contacts 620 will additionally interrupt the starting circuit of motor 434; but that motor will continue to receive power from the running circuit which includes the upper and movable contacts of switch 446. However, the re-opening of contacts 620 will make certain that motor 434 comes to rest when the movable contact of switch 446 is returned to its normal position in engagement with the lower contact of that switch. The reclosing of contacts 622 in FIG. 27 will connect the stationary contact of switch 360 with the left-hand terminal of relay coil 664.

By the time the shaft 436 has rotated a total of about two hundred and ninety degrees, the trailing edge of the bill 1100 will have moved inwardly beyond the foot 352 on lever 350; and, thereupon, the spring 364 will cause lever 350 to rotate to the position shown by FIG. 21. Such rotation of that lever will dispose the foot 352 in position to block withdrawal of the bill 1100, and also will cause the ear 356 to raise the arm 362 of switch 360 and close that switch. The closing of that switch will complete a circuit which extends from the right-hand prong of plug 554 via conductor 558, junctions 770, 768, 764, 760, 758, 744 and 700, resistor 702, diode 704, junctions 706 and 714, relay coil 664, junction 716, switch 452, contacts 622 and 640, switch 360, junction 698, contacts 630, junction 629, and conductor 556 to the left-hand prong of plug 554. The resulting energization of relay coil 664 will close contacts 666 and 668 in FIG. 27, will open contacts 670 in FIG. 28, and will close contacts 672 in FIG. 26. The opening of contacts 670 in FIG. 28 interrupts the starting circuit for motor 434; but that motor will continue to receive power through the running circuit which includes the upper and movable contacts of switch 446. The closing of contacts 666 in FIG. 27 establishes a holding circuit for relay coil 664; and that circuit extends from the right-hand prong of plug 554 via conductor 558, junctions 770, 768, 764, 760, 758, 744 and 700, resistor 702, diode 704, junctions 706 and 714, relay coil 664, junctions 716 and 718, contacts 666, junction 720, switch 272, junction 734, conductor 694, junctions 710 and 688, the lower and movable contacts of switch 276, junction 680, conductor 556, and junction 629 to the left-hand prong of plug 554. The closing of contacts 668 in FIG. 27 completes a circuit which extends from the right-hand prong of plug 554 via conductor 558, junctions 770, 768, 764, 760, 758, 744 and 700, resistor 702, diode 704, junctions 706, 714 and 722, relay coil 654, junction 724, contacts 668, junction 718, contacts 666, junction 720, switch 272, junction 734, conductor 694, junctions 710 and 688, the lower and movable contacts of switch 276, junction 680, conductor 556, and junction 629 to the left-hand prong of plug 554. The resulting energization of relay coil 654 will initiate a cycle of operation of the motor 746, all as described hereinbefore in the section "Operation of Change-Making Device When Half-Dollar Is Inserted." The closing of contacts 672 in FIG. 26 will complete a circuit which extends from the right-hand prong of plug 554 via conductor 558, junction 770, in part through electromagnet 459 to junction 767 and in part through junction 768 and electromagnet 457 to junction 767, contacts 672, junction 766, conductor 694, junctions 762, 754, 748, 738, 736, 734, 710 and 688, switch 276, junction 680, conductor 556, and junction 629 to the left-hand prong of plug 554. The resulting energization of electromagnets 457 and 459 will hold the armatures of those electromagnets out of the paths of the actuators 338 which are adjacent the cams 215 and 217 in FIG. 24. This means that when the motor 746 causes the shaft 207 to make a complete revolution, all of the actuators 338 will move all of the ejectors; and hence one nickel, two dimes, and three quarters will be dispensed. In this way, the money-changing device will dispense the exact amount of change that is required.

The motor 146 will continue to rotate the rollers 166 in the clockwise direction and the rollers 341 in the counter clockwise direction, and will thus move the bill 1100 wholly to the right of the points of tangency of those rollers, as those rollers are viewed in FIG. 19. As the trailing edge of that bill passes beyond the lower end of lever 346, that lever and lever 350 will respond to the force supplied by the internal spring of switch 360 to return to the positions shown by FIG. 19. The switch 360 will then re-open to interrupt the energizing circuit of relay coil 664; but that relay coil will continue to receive power through the holding circuit which includes the contacts 666. As the bill 1100 is moved inwardly beyond the points of tangency of rollers 166 and 341, that bill will fall to a cash box, not shown, immediately adjacent the rear of the currency detector.

After the shaft 436 has rotated a total of about three hundred and thirty-five degrees, the short dwell on cam 460 will re-open switch 448 and the dwell on cam 465 will re-open switch 452. The re-opening of switch 448 will de-energize motor 146; and the re-opening of switch 452 will additionally interrupt the energizing circuit of relay coil 664; but that coil will continue to receive power through its holding circuit.

When shaft 436 has rotated a total of about three hundred and fifty degrees, cam 456 will permit the movable contact of switch 444 to shift back into engagement with the left-hand contact of that switch and thereby connect junction 786 to ground via junction 786, conductor 784, junction 780, capacitor 778, the left-hand and movable contacts of switch 444, and junction 776. The resulting inrush of current through capacitor 778 will reduce the voltage at the plate of thyratron 790 sufficiently to render that thyratron non-conductive. As the movable contact of switch 444 shifts back, the holding circuit for relay coil 624 will be interrupted; and thereupon, the contacts 626 will re-open, the contacts 628 will re-close, and the contacts 630 will re-open. The re-opening of contacts 626 will not be significant at this time but will be significant in preventing a further energization of relay coil 624 until the transistor 1076 is again rendered conductive. The reclosing of contacts 628 will not be significant at this time because the switch 450 is open; but the re-closing of those contacts will be significant if the motor 146 must be reversed during a subsequent cycle of operation of the currency detector. The re-opening of contacts 630 will re-energize the solenoid 242 and enable the spring 248 to return the bill-blocking member 222 to the solid-line position in FIG. 23. As that bill-blocking member moves to that position, it will enable a further bill to be introduced into the testing area of the currency detector and will cause the fingers 238 to move into positions where they can serve as stops for the leading edge of that bill. The re-opening of contacts 630 also will interrupt the energizing circuit for the relay coil 664.

The diode 1080 in FIG. 30 provides a discharge path for the inductive energy which was stored within the relay coil 624 while that coil was energized. Specifically, as the contacts 626 re-open, current will flow from the right-hand terminal of relay coil 624 via contacts 642, junctions 1094 and 1082, diode 1080, and junction 1078 to the left-hand terminal of that relay coil. The impedance of the discharge path through diode 1080 is so small that substantially no current will tend to flow through the transistor 1076; and, in this way, the diode 1080 will protect the transistor 1076 from hurtful current surges when relay coil 624 is de-energized.

Current initially flows from the right-hand terminal of relay coil 624 via the transistor 1076, and subsequently flows from that right-hand terminal to ground via the right-hand contact of switch 444. To make this possible, the said right-hand terminal must be capable of being connected to that transistor and to that contact; and yet the collector of that transistor must not be connected to that contact because the high voltage conductor 570 of FIG. 25 is connectable to that contact by relay coil 632, junction 920, contacts 634, and junction 918. The present invention makes it possible for the right-hand terminal of relay coil 624 to be connected to transistor 1076 and to the right-hand contact of switch 444, and yet keeps the collector of that transistor from being connected to that contact, by disposing diode 1096 intermediate that contact and that transistor with its cathode directed toward that contact. As a result, the transistor 1076 is protected against the high voltage supplied by conductor 570 in FIG. 25.

At about the time the cam 456 permits the movable contact of switch 444 to shift back into engagement with the left-hand contact of that switch, the lobe of cam 467 will move the lever 540 to the position shown by FIG. 16. As that lever is moved to that position, it will act through connecting bar 544 and pin 548 to raise the sub-frame 366, and thus move the rollers 372 upwardly out of engagement with the rollers 178. In this way, the currency detector enables a subsequently-inserted bill to be moved into engagement with the fingers 238 on the bill-blocking member 222.

As the shaft 436 approaches the end of its revolution, the cam 458 will permit the movable contact of switch 446 to move downwardly out of engagement with the upper contact of that switch and into engagement with the lower contact of that switch. That movement will interrupt the running circuit for the motor 434, and hence that motor will come to rest with the output shaft 436 in the position indicated by FIGS. 13 and 16. The shifting of the movable contact of switch 446 into engagement with the lower contact of that switch will re-energize the coin return electromagnet 692 in the manner indicated hereinbefore.

During the foregoing cycle of operation of the currency detector, the bill 1100 was optically sensed and magnetically sensed and found to be authentic. The change-making device was actuated to dispense one nickel, two dimes, and three quarters; and the bill 1100 was moved to the cash box. At the conclusion of that cycle of operation all of the components of the currency detector returned to their normal positions in readiness for the insertion of another bill.

*Operation of currency detector when unacceptable bill is inserted*

If a bill that is significantly shorter than an authentic bill is inserted in the currency detector, that bill will be unable to simultaneously engage and raise both of the bill-receiving buttons 410 and 418. Such a bill will be unable to simultaneously cose both of the switches 406 and 414 in FIG. 29; and hence the relay coil 618 will remain de-energized. As a result, the motor 146 will remain de-energized; and the rollers 190 will remain motionless. The patron will quickly realize that the bill will not be accepted by the currency detector, and will withdraw that bill from that currency detector.

If a full-size bill or facsimile is inserted in the currency detector, the switches 406 and 414 will be closed and the relay coil 618 will be energized, all as described in the immediately-preceding section. Also, the motor 434 will be energized, the cam 456 will shift the movable contact of switch 444 to the right in FIG. 29, the cam 458 will shift the movable contact of switch 446 up into engagement with the upper contact of that switch, the cam 454 will permit the rollers 394 to move downwardly and engage the bill, the cam 460 will permit switch 448 to close and start the motor 146, the rollers 190 and 394 will move the leading edge of the bill against the fingers 238 on the bill-bocking member 222, the cam 460 will re-open switch 448 to de-energize motor 146, and the eccentric 473 will raise and then release the pendulum 488.

If the bill is spurious or is an authentic bill of an undesired denomination, or if the bill is authentic and of the desired denomination but has the green-ink face thereof up, the optical sensing system and the magnetic sensing system should not coact to render the transistor 1030 non-conductive. If the bill is an authentic bill of an undesired denomination, or if the bill is authentic and of the desired denomination but has the green-ink face thereof up, the amount of light reflected onto the photocells 214, 216, 218, 220, 518 and 520 will be unable to cause the voltages at the anodes of all of the diodes 1062, 1068, 1072, 1074, 1054 and 1060 to be negative and to have values equal to or greater than seven and eight-tenths volts. Instead, the light falling upon those photocells will cause the voltage at the anode of at least one of those diodes to be more positive than negative seven and eight-tenths volts. Where that occurs, the optical sensing system will be capable of holding the voltage at the junction 1048 more positive than the negative seven and one-half volts needed to render the transistor 1030 non-conductive. Also, if the bill is an authentic bill of an undesired denomination, or if the bill is authentic and of the desired denomination but has the green-ink face thereof up, the magnetic head 492 will not be able to coact with the circuitry of FIG. 29 to fire the thyratron 790. Consequently, the resistors 788, 966 and 967 will maintain a positive voltage of about five volts at the junction 964; and that voltage will keep the voltage at junction 1048 more positive than the negative seven and one-half volts needed to render the transistor 1030 non-conductive. If a photograph or photo-copy was inserted, it could not cause the magnetic head 492 and the circuitry of FIG. 29 to fire the thyratron 790; and hence that photograph or photo-copy could not be accepted even if it could cause the proper amounts of light to strike the photo-cells 214, 216, 218, 220, 518 and 520. The over-all result is that the Schmitt trigger, which includes the transistors 1030 and 1076, will not be actuated and the relay coil 624 will not be energized.

Because the relay coil 624 will not be energized, the contacts 626 in FIG. 30 will remain open, the contacts 628 in FIG. 29 will remain closed, and the contacts 630 in FIG. 27 will remain open. The fact that the contacts 628 remain closed is significant because, after the shaft 436 has rotated a total of about one hundred and fifty-five degrees, the cam 462 will permit the switch 450 to close; and, as that switch closes, it will complete a circuit which extends from conductor 570 in FIG. 25 via relay coil 632 in FIG. 29, junction 920, switch 450, contacts 628, junction 918, the right-hand and movable contacts of switch 444, and junction 776 to ground. The resulting energization of relay coil 632 will close contacts 634 in FIG. 29, will close contacts 636 in FIG. 28, will open contacts 638 in FIG. 28, will open contacts 640 in FIG. 27, and will open contacts 642 in FIG. 30. The closing of contacts 634 in FIG. 29 will establish a holding circuit for relay coil 632; and that circuit will extend from conductor 570 in FIG. 25 via relay coil 632, junction 920, contacts 634, junction 918, the right-hand and movable contacts of switch 444, and junction 776 to ground. The closing of contacts 636 in FIG. 28 will complete a circuit which extends from the right-hand prong of plug 554 via conductor 558, junctions 770, 768, 764, 760, 758, 744, 700, 696, 690, 682 and 676, partly through the reverse winding of motor 146 to junction 673 and partly through the forward winding of that motor and junction 675 and capacitor 148 to junction 673, and then through contacts 636, junction 674, conductor 556, and junctions 680 and 629 to the left-hand prong of plug 554. The motor 146 will respond to the resulting flow of current to rotate in the reverse direction, and will rotate the shafts 160, 174 and 186 in the counterclockwise direction in FIG. 19. The resulting rotation of the rollers 178 and 190 in the counterclockwise direction and the resulting rotation of the rollers 372 and 394 in the clockwise direction in FIG. 19 will cause the bill to move back out through the entry slot and onto the platform 96.

The opening of contacts 638 in FIG. 28 will keep the motor 146 from tending to rotate in the forward direction. The opening of contacts 640 in FIG. 27 will prevent energization of the relay coil 664, and will thereby keep the change-making device from initiating a cycle of operation. The opening of contacts 642 in FIG. 30 will make certain that the relay coil 624 is not energized. The overall result of the energization of relay coil 632 is that the motor 146 will start moving the bill back to the patron, and the change-making device and the acceptance circuit of the currency detector will both be disabled.

As the bill moves back toward the platform 96, it will move out from under the bill-receiving buttons 410 and 418; and, thereupon, the energizing circuit of relay coil 618 will be interrupted. Contacts 620 in FIG. 28 will re-open to enable the motor 434 to come to rest when the movable contact of switch 446 is subsequently moved down out of engagement with the upper contact of that switch. The contacts 622 in FIG. 27 will re-close, and will pre-set the energizing circuit for the relay coil 664 during a subsequent cycle of operation of the currency detector.

After the shaft 436 has rotated a total of approximately one hundred and eighty degrees, the long recess in the cam 460 will permit the switch 448 to re-close. However, the contacts 638 will be held open by the continued energization of relay coil 632, and hence the re-closing of switch 448 will not be able to cause the motor 146 to rotate in the forward direction.

At about the time the cam 460 permits switch 448 to re-close, cam 465 will permit switch 452 to close. However, the closing of switch 452 will not be significant at that time because the contacts 640 are held open by the continued energization of relay coil 632.

After the shaft 436 has rotated a total of about one hundred and eighty-five degrees, the cam 462 will re-open the switch 450. However, the re-opening of that switch will not de-energize the relay coil 632, because that coil will continue to receive power through the holding circuit that includes the contacts 634. As a result, relay coil 632 will keep the contacts 636 closed and will thus keep the motor 146 running in the reverse direction. This means that the rollers 190 and 394 will continue to urge the bill back out onto the platform 96 where the patron can retrieve it.

After the shaft 436 has rotated a total of about two hundred and seventy degrees, the cam 454 will cause the sub-frame 388 to raise the rollers 394. After that shaft has rotated a total of about three hundred and thirty-five degrees, the short dwell on cam 460 will re-open switch 448 and the dwell on cam 465 will re-open switch 452. The re-opening of those switches will not be significant at this time but will merely return those switches to their normal positions.

After the shaft 436 has rotated a total of about three hundred and fifty degrees, cam 467 will cause the sub-frame 366 to raise the rollers 372. Also, cam 456 will permit the movable contact of switch 444 to move back into engagement with the left-hand contact of that switch; and thereupon the relay coil 632 will become de-energized. Contacts 634 and 636 will then re-open and contacts 638, 640 and 642 will then re-close. The re-opening of contacts 634 will interrupt the holding circuit for relay coil 632, the re-opening of contacts 636 will de-energize the motor 146, and the re-closing of contacts 638 will subsequently enable that motor to run in the forward direction when a further bill is introduced into the currency detector. The re-closing of contacts 640 and the re-closing of contacts 642 in FIG. 30 will not be significant at this time, but will restore those contacts to their normal positions in readiness for a subsequent cycle of operation of the currency detector.

As the shaft 436 approaches the end of its revolution, cam 458 will permit the movable contact of switch 446 to move down out of engagement with the upper contact of that switch and into engagement with the lower contact of that switch. That movement will interrupt the running circuit of the motor 434; and hence that motor and the shaft 436 will come to rest. The movement of that movable contact down into engagement with that lower contact will re-energize the coin return electromagnet 692, and thereby permit further coins to be introduced into the change-making device.

During the cycle of operation initiated by the unacceptable bill, the motor 434 rotated the shaft 436 and the motor 146 moved the bill into the testing area. The optical sensing system and the magnetic sensing system did not coact to provide the negative voltage at the junction 1048 which is needed to render the transistor 1030 of the Schmitt trigger non-conductive; and hence the relay coil 624 was not energized. Consequently, the motor 146 was caused to rotate in the reverse direction and to return the unacceptable bill to the patron. Also, the change-making device was disabled and hence it did not initiate a cycle of operation. The overall result is that the inserted bill was returned to the patron and no change was dispensed.

*The currency detector will resist efforts to defeat it*

If a patron makes a photograph or a photo-copy of a bill and then pastes a segment of an authentic bill on that portion of the photograph or photo-copy which will be magnetically sensed, the thickness detector 494 will engage that segment of the authentic bill and will so retard the speed of the pendulum 488 that the voltage variations generated within the magnetic head 492 will be unable to cause the circuitry of FIG. 29 to fire the thyratron 790. Consequently, the voltage at the junction 1048 in FIG. 30 will not be permitted to become sufficiently negative to render the transistor 1030 non-conductive. Consequently, the relay coil 624 will remain de-energized; and this means that the motor 146 will be caused to reverse to return the photograph or photo-copy to the patron and that the change-making device will not be permitted to dispense any change.

If a patron attaches a thread, string or tape to an inserted bill and tries to hold that bill against movement toward the cash box, the foot 352 of lever 350 will continue to rest upon that bill and thereby keep switch 360 from closing—thus keeping the change-making device from dispensing any change. Furthermore, solenoid 242 will rotate the bill-blocking member 222 into the dotted-line position of FIG. 23, and thus interpose the fingers 234 between the bill and the entry slot. If the patron attempts to withdraw the bill while those fingers are intermediate that bill and that entry slot, the forces which that bill will apply to those fingers will cause those fingers to act as an inclined plane and will urge those fingers even more solidly into bill-blocking position.

If a patron waits until after an inserted bill has moved inwardly beyond the foot 352 of lever 350, as shown in FIG. 21, so the switch 360 can close and cause the change-making device to dispense change, that patron will be unable to withdraw that bill because the foot 352 will physically block withdrawing movement of that bill. It will be noted that the foot 352 is inclined from upper left to lower right in FIG. 21, and will thus act as an inclined plane to the bill if the patron attempts to withdraw that bill. This means that if the patron attempts to withdraw the bill, the force of the bill will urge the foot 352 of lever 350 even more solidly into bill-blocking position.

*The currency detector is usable with different devices*

The currency detector has been shown and described as it is used with a change-making device which dispenses one nickel, two dimes, and three quarters. However, that currency detector also can be used with change-making devices which dispense other combinations of change. Furthermore, that currency detector can be used with vending machines which vend products or services. Those vending machines can be made to dispense products or services which exactly equal the value of an inserted bill; or those vending machines can be made to incorporate change-making devices so they can dispense products or services with values less than the value of an inserted bill.

*Summation*

The currency detector of the present invention freely permits bills to be inserted into it but precludes the insertion of stiff objects. Also, that currency detector resists the entry of liquids into the testing area of that currency detector. That currency detector requires the inserted bill to have a predetermined minimum length, as by spacing the bill-receiving buttons 410 and 418 apart a predetermined distance. That currency detector also requires the inserted object to have a predetermined minimum width, as by connecting the contacts 622—which are closed only when the inserted object is holding the bill-receiving buttons 410 and 418 in raised position—in series with the switch 360 and with the relay coil 664. In addition, that currency detector prevents the dispensing of change unless the bill is moved out through the exit slot of the currency detector and past the foot 352 of the lever 350.

That currency detector permits the photocells to sense a multitude of areas on the bill as the bill is being moved into the testing area, but keeps those photocells from actuating the Schmitt trigger until the bill has come to rest in the testing position, as by maintaining a positive voltage at the junction 964 as long as the thyratron 790 remains non-conductive. After the bill has come to rest in the testing area it is sensed magnetically while it is still being sensed optically; and, if both the magnetic sensing system and the optical sensing system tend to develop the required negative voltages at the anodes of the diodes 1052, 1054, 1060, 1062, 1068, 1072 and 1074, the Schmitt trigger will be actuated and the circuitry for the change-making device will be conditioned to pay out change when the switch 360 is subsequently actuated. The currency detector then moves the bill toward the exit slot of the currency detector and rotates the bill-blocking member 222 into position to block withdrawal of the inserted bill. Furthermore, that currency detector causes the rollers 166 and 341, adjacent the exit slot, to grip the bill and strongly resist any efforts of a patron to hold the bill or to pull that bill back toward the platform 96. In addition, after the trailing edge of the bill has passed rearwardly of the foot 352 on the lever 350, that foot will additionally block any efforts of a patron to pull the bill back toward the platform 96. If, by mischance, a patron jammed a foreign object into the entry slot or a bill became jammed, an authorized person could easily and quickly insert the key 288 in lock 284 and effect raising of the upper section of the currency detector.

The preferred embodiment of currency detector described hereinbefore is intended to accept authentic one dollar bills of the United States and to reject all other authentic bills of the United States or of foreign countries. In addition, that embodiment of currency detector is intended to reject counterfeit bills. However, if desired, the currency detector of the present invention could be adapted, by appropriate positioning of the openings 132, 134, 136 and 138 in the platen 92 and by appropriate positioning of the openings 300, 302 and 304 in the platen 250, and by appropriate positioning of the pivot 486, to sense other authentic bills of the United States or of foreign countries. While three pairs of photocells are used in the optical sensing system of the present invention, more or fewer pairs of photocells could be used. A tangential speed of thirty inches per second has been found to be desirable for the magnetic head 492, but other tangential speeds also could be used. Similarly, other magnetic sensing circuits could be used.

The lengths of the lobes, notches and dwells of the cams 454, 456, 458, 460, 462, 465 and 467 have been described in detail herein; but those lengths are not critical. Instead, those lengths can be varied rather extensively as long as the cam 454 releases the sub-frame 388 before the cam 458 shifts the movable contact of switch 446 up into enggement with the upper contact of that switch, as long as the cam 467 releases the subframe 366 after the cam 458 shifts the movable contact of switch 446 up into engagement with the upper contact of that switch and before the notch 476 in lever 474 releases the pin 496 on the pendulum 488, and the cams 454 and 467 raise the sub-frames 388 and 366, respectively, before the end of a cycle of operation of the currency detector.

Whereas the drawing and accompanying description have shown and described a preferred embodiment of the present invention, it should be apparent to those skilled in the art that various changes may be made in the form of the invention without affecting the scope thereof.

What I claim is:

1. A currency detector which comprises:

(a) a lower section and an upper section that coact to define a testing area, an entry slot for said testing area, and an exit for said testing area, (b) a platform on one of said sections that is adjacent said entry slot to receive the leading edge of a bill to be introduced into said entry slot, (c) said platform being coextensive with the front of said entry slot and extending forwardly from said entry slot, (d) the other of said sections having walls that are generally normal to said entry slot and that subtend an angle with an apex that is generally normal to said entry slot, (e) said walls making said entry slot a corner slot, (f) an extension on said platform that is coextensive with the side of said entry slot and that extends laterally outwardly from said side of said entry slot, (g) a guide that is intermediate said platform and said extension and that is normal to said front of said entry slot, (h) said guide helping aline a bill for movement into said entry slot, (i) said upper section having a downwardly-directed offset adjacent said entry slot, (j) said lower section having an upwardly-directed offset adjacent said entry slot, (k) said offset on said upper section being disposed outwardly of said offset on said lower section, whereby said offsets define a passage for bills which inclines upwardly and inwardly into said testing area of said currency detector, (l) said offsets in said upper and lower sections coacting to block viewing of the operation of said currency detector, (m) said offset on said lower section tending to keep liquids from flowing into said testing area, (n) said offsets being L-shaped in plan, (o) the long arms of said offsets being adapted to smooth out wrinkles which extend transversely of a bill being introduced into said entry slot, (p) rollers adjacent one side of said testing area and adjacent said entry slot that define points of tangency and that can grip a bill introduced into said entry slot and that can move said bill into said testing area, (q) further rollers adjacent the opposite side of said testing area that can grip said bill and move said bill toward said exit, (r) additional rollers that are adjacent said further rollers but that are displaced from said testing area and that can grip said bill after it has started moving from said testing area toward said exit, (s) a normally-open, bill-sensing switch that has the actuator thereof intermediate the first said and said further rollers, (t) a bill-blocking member that is mounted adjacent said testing area and that has fingers selectively extendable into said testing area, (u) some of said fingers on said bill-blocking member being adjacent the first said rollers and being selectively held out of said testing area to permit a bill to be moved into and withdrawn from said testing area and being selectively extendable into said testing area to block withdrawal of said bill from said testing area, (v) other of said fingers on said bill-blocking member being adjacent said further rollers and being selectively extendable into said testing area to block movement of said bill toward said exit of said currency detector and being selectively held out of said testing area to permit movement of said bill toward said exit of said currency detector, (w) said some and said other of said fingers on said bill-blocking member being spaced apart distances greater than the width of a bill intended to be accepted by said currency detector, (x) said some and said other of said fingers on said bill-blocking member being arranged and dimensioned so said some fingers are held out of said testing area whenever said other fingers are extended into said testing area and so said other fingers are held out of said testing area whenever said some fingers are extended into said testing area, (y) said other fingers being spaced from said points of tangency of the first said rollers distances just greater than the width of a bill intended to be accepted by said currency detector, (z) said bill-locking member initially having said other fingers thereof extending into said testing area, (aa) a pendulum rotatably mounted adjacent said testing area, (ab) a magnetic head mounted on and rotatable with said pendulum, (ac) a thickness detector mounted on and rotatable with said pendulum, (ad) a yieldable and resilient supporting member that is in said testing area, that is in the path of said magnetic head, and that is adjacent the path of said thickness detector, (ae) a mechanism that rotates said pendulum to move said magnetic head and said thickness detector away from said supporting member and to develop a progressively larger biasing force on said pendulum, (af) said mechanism subsequently releasing said pendulum for movement toward said supporting member to enable said magnetic head to sense a bill in said testing area and to enable said thickness detector to determine whether the thickness of said bill exceeds a predetermined value, (ag) said thickness detector being mounted on said pendulum ahead of said magnetic head so said thickness detector moves into register with a bill in said testing area before said magnetic head moves into register with said bill, (ah) said pendulum initially holding said magnetic head and said thickness detector out of the path of bills introduced into said entry slot, (ai) said pendulum being adapted to cause said magnetic head and said thickness detector to approach a bill in said testing area at a predetermined speed, (aj) said thickness detector being adapted to engage objects which are appreciably thicker than an acceptable bill and thereby slow down the speed of movement of said pendulum, (ak) a circuit that can respond to said magnetic head to indicate whether a bill positioned in said testing area is acceptable or unacceptable, (al) said circuit indicating that a bill positioned in said testing area is unacceptable if the pendulum is slowed unduly, (am) said thickness detector responding to objects appreciably thicker than an acceptable bill to unduly slow said pendulum, (an) an element than can respond to said circuit to shift said bill-blocking member and thereby extend said some fingers into said testing area while moving said other fingers out of said testing area, (ao) the first said rollers initially being spaced apart and said further rollers intially being spaced apart, (ap) the first said rollers thereafter moving toward each other to grip an inserted bill, (aq) said actuator for said bill-sensing switch coacting with the first said rollers, after the first said rollers have gripped an inserted bill, to tend to hold said inserted bill against said supporting member, (ar) said further rollers subsequently moving toward each other to grip said bill, (as) said further rollers and said additional rollers coacting to move acceptable bills toward said exit, (at) the first said and said further rollers coacting to move unacceptable bills back to the patrons, (au) the first said and said further rollers being selectively rotatable in opposite directions, (av) a second normally-open, bill-sensing switch that has an actuator adjacent said exit, (aw) said actuator for said second bill-sensing switch including two levers that normally move together but that are individually movable relative to each other, (ax) one of said levers normally being in the path of a bill moving through said exit and the other of said levers normally having a portion disposed forwardly of the first said lever and normally disposed out of the path of a bill moving toward said exit, (ay) the first said lever of said actuator for said second bill-sensing switch being engaged by the leading edge of a bill moving from said testing area and moving to urge said second lever to move toward switch-actuating position, but said portion of said second lever engaging a bill and being held out of switch-actuating position until after said bill has moved rearwardly of and beyond said portion of said second lever, (az) whereby said second bill-sensing switch cannot be actuated until a bill has moved both of said levers and has moved rearwardly of said portion of said second lever, (ba) an actuatable device, (bb) a circuit for said currency detector, (bc) a source of power for said rollers, (bd) said circuit having a sub-circuit that can actuate said source of power only if the first said bill-sensing switch is closed, (be) said circuit having a second sub-circuit that can actuate said actuatable device only if the first said bill-sensing switch has re-opened and said second bill-sensing switch has closed, (bf) the actuator for the first said bill-sensing switch being disposed forwardly of said actuator for said second bill-sensing switch so the first said bill-sensing switch will be able to close while said second bill-sensing switch is open as a bill is being moved through said exit of said testing area, (bg) said currency detector being adapted to be mounted in an enclosed device that has a wall with an opening therein, (bh) said upper section normally being adjacent and substantially closing said opening in said wall, so said upper section and said wall normally prevent access to the interior of said device, (bi) said upper section being moavble relative to said lower section and relative to said wall to provide free access through said opening to said testing area, (bj) a lock that normally prevents movement of said upper section relative to said lower section and relative to said opening in said wall, (bk) abutments mounted on one of said sections and springs mounted on the other of said sections, (bl) said springs having sockets therein that can engage said abutments and can hold said sections against accidental movement from either a closed position or an opened position, (bm) said portion of said second lever of said actuator for said second bill-sensing switch being alined with said supporting member in said testing area, and (bn) a photocell that is adapted to receive light from a bill disposed within said testing area and that is in register with said supporting member, (bo) whereby a bill that is introduced into said testing area will have a transverse section thereof sensed by said photocell and by said magnetic head and said thickness detector and will engage said second lever of said actuator for said second bill-sensing switch.

2. A currency detector which comprises:

(a) members that coact to define a testing area, (b) an inertial member rotatably mounted adjacent said testing area, (c) a sensing element mounted on and rotatable with said inertial member, (d) a thickness detector mounted on and rotatable with said inertial member, (e) a supporting member that is in said testing area, that is in the path of said sensing element, and that is adjacent the path of said thickness detector, (f) said inertial member being adapted to move said sensing element and said thickness detector toward and away from said supporting member, (g) a mechanism that rotates said inertial member to move said sensing element and said thickness detector away from said supporting member and to develop a progressively larger biasing force on said inertial member, (h) said mechanism subsequently releasing said inertial member for movement toward said supporting member to enable said sensing element to sense a bill in said testing area and to enable said thickness detector to determine whether the thickness of said bill exceeds a predetermined value, (i) said intertial member responding to the bias thereon to move said sensing element and said thickness detector relative to said bill at a predetermined speed, and (j) a member that intercepts said inertial member and brings said inertial member to rest after said inertial member has moved said sensing element and said thickness detector past said supporting member, (k) said mechanism rotating said inertial member through less than one revolution, (l) said thickness detector responding to a bill, that is within said testing area and that has a thickness which exceeds said predetermined thickness, to reduce the speed of said inertial member, (m) said supporting member being yieldable and resilient and having a convex upper surface, (n) said inertial member having the axis of rotation thereof disposed above the level of and generally in register with the uppermost part of said convex upper surface of said supporting member, (o) said axis of rotation of said inertial member being vertically adjustable to set the vertical position of said sensing element relative to said upper face of said supporting member, (p) said thickness detector being adjustable relative to said inertial member to set the vertical position of said thickness detector relative to said upper face of said supporting member, (q) said inertial member being a pendulum, (r) said sensing element being a magnetic head, (s) said thickness detector being an elongated screw, (t) said thickness detector being mounted on said inertial member ahead of said sensing element so said thickness detector moves into register with a bill in said testing area before said sensing element moves into register with said bill, (u) said mechanism including a motor-driven eccentric, a lever, and a fulcrum for said lever,
(v) said intercepting member being a spring.

3. A currency detector which comprises:
(a) members that coact to define a testing area,
(b) an inertial member rotatably mounted adjacent said testing area,
(c) a sensing element mounted on and rotatable with said inertial member,
(d) a thickness detector mounted on and rotatable with said inertial member,
(e) a supporting member that is in said testing area, that is in the path of said sensing element, and that is adjacent the path of said thickness detector,
(f) said inertial member being adapted to move said sensing element and said thickness detector toward and away from said supporting member,
(g) a mechanism that rotates said inertial member to move said sensing element and said thickness detector away from said supporting member and to develop a progressively larger biasing force on said inertial member,
(h) said mechanism subsequently releasing said inertial member for movement toward said supporting member to enable said sensing element to sense a bill in said testing area and to enable said thickness detector to determine whether the thickness of said bill exceeds a predetermined value, and
(i) said inertial member responding to the bias thereon to move said sensing element and said thickness detector relative to said bill at a predetermined speed,
(j) said mechanism rotating said inertial member through less than one revolution,
(k) said thickness detector responding to a bill, that is within said testing area and that has a thickness which exceeds said predetermined thickness, to reduce the speed of said inertial member,
(l) said supporting member being yieldable and resilient,
(m) said inertial member having the axis of rotation thereof disposed above the level of and in register with the upper face of said supporting member,
(n) said axis of rotation of said inertial member being vertically adjustable to set the vertical position of said sensing element relative to said upper face of said supporting member,
(o) said thickness detector being adjustable relative to said inertial member to set the vertical position of said thickness detector relative to said upper face of said supporting member,
(p) said inertial member being a pendulum,
(q) said sensing element being a magnetic head,
(r) said thickness detector being an elongated screw,
(s) said thickness detector being mounted on said inertial member ahead of said sensing element so said thickness detector moves into register with a bill in said testing area before said sensing element moves into register with said bill,
(t) said mechanism including a motor-driven eccentric, a lever, and a fulcrum for said lever.

4. A currency detector which comprises:
(a) members that coact to define a testing area,
(b) an inertial member rotatably mounted adjacent said testing area,
(c) a sensing element mounted on and rotatable with said inertial member,
(d) a thickness detector mounted on and rotatable with said inertial member,
(e) a supporting member that is in said testing area, that is in the path of said sensing element, and that is adjacent the path of said thickness detector,
(f) said inertial member being adapted to move said sensing element and said thickness detector toward and away from said supporting member,
(g) a mechanism that rotates said inertial member to move said sensing element and said thickness detector away from said supporting member and to develop a progressively larger biasing force on said inertial member,
(h) said mechanism subsequently releasing said inertial member for movement toward said supporting member to enable said sensing element to sense a bill in said testing area and to enable said thickness detector to determine whether the thickness of said bill exceeds a predetermined value, and
(i) said inertial member responding to the bias thereon to move said sensing element and said thickness detector relative to said bill at a predetermined speed,
(j) said mechanism rotating said inertial member through less than one revolution,
(k) said thickness detector responding to a bill, that is within said testing area and that has a thickness which exceeds said predetermined thickness, to reduce the speed of said inertial member,
(l) said inertial member being a pendulum,
(m) said sensing element being a magnetic head,
(n) said thickness detector being mounted on said inertial member ahead of said sensing element so said thickness detector moves into register with a bill in said testing area before said sensing element moves into register with said bill.

5. A currency detector which comprises:
(a) members that coact to define a testing area,
(b) an inertial member rotatably mounted adjacent said testing area,
(c) a sensing element mounted on and rotatable with said inertial member,
(d) a thickness detector mounted on and rotatable with said inertial member,
(e) a supporting member that is in said testing area, that is in the path of said sensing element, and that is adjacent the path of said thickness detector,
(f) said inertial member being adapted to move said sensing element and said thickness detector toward and away from said supporting member,
(g) a mechanism that rotates said inertial member to move said sensing element and said thickness detector away from said supporting member and to develop a progressively larger biasing force on said inertial member,
(h) said mechanism subsequently releasing said inertial member for movement toward said supporting member to enable said sensing element to sense a bill in said testing area and to enable said thickness detector to determine whether the thickness of said bill exceeds a predetermined value, and
(i) said inertial member responding to the bias thereon to move said sensing element and said thickness detector relative to said bill at a predetermined speed,
(j) said mechanism rotating said inertial member through less than one revolution,
(k) said thickness detector responding to a bill, that is within said testing area and that has a thickness which exceeds said predetermined thickness, to reduce the speed of said inertial member,
(l) said thickness detector being mounted on said inertial member ahead of said sensing element so said thickness detector moves into register with a bill in said testing area before said sensing element moves into register with said bill.

6. A currency detector which comprises:
(a) members that coact to define a testing area,
(b) an inertial member rotatably mounted adjacent said testing area,
(c) a sensing element mounted on and rotatable with said inertial member,
(d) said inertial member being adapted to move said sensing element toward and away from a sensing position, and (e) a mechanism that rotates said inertial member to move said sensing element away from said sensing position and to develop a progressively larger biasing force on said inertial member,
(f) said mechanism subsequently releasing said inertial member for movement toward said sensing position to enable said sensing element to sense a bill in said testing area,
(g) said inertial member responding to the bias thereon to move said sensing element relative to said bill at a predetermined speed,
(h) said mechanism rotating said inertial member gradually to enable said mechanism to include a low torque motor.

7. A currency detector which comprises:
(a) members that define a testing area,
(b) an inertial member rotatably mounted adjacent said testing area,
(c) a sensing element mounted on and rotatable with said inertial member,
(d) said inertial member being adapted to move said sensing element toward and away from a sensing position, and
(e) a mechanism that rotates said inertial member to move said sensing element away from said sensing position and to develop a progressively larger biasing force on said inertial member,
(f) said mechanism subsequently releasing said inertial member for movement toward said sensing position to enable said sensing element to sense a bill in said testing area,
(g) said inertial member responding to the bias thereon to move said sensing element relative to said bill at a predetermined speed,
(h) said mechanism thereafter forcing said inertial member and said sensing element away from said sensing position to keep said sensing element from impeding subsequent movement of said bill.

8. A currency detector which comprises:
(a) members that coact to define a testing area,
(b) an inertial member rotatably mounted adjacent said testing area,
(c) a sensing element mounted on and rotatable with said inertial member,
(d) said inertial member being adapted to move said sensing element toward and away from a sensing position, and
(e) a mechanism that rotates said inertial member to move said sensing element away from said sensing position and to develop a progressively larger biasing force on said inertial member,
(f) said mechanism subsequently releasing said inertial member for movement toward said sensing position to enable said sensing element to sense a bill in said testing area,
(g) said inertial member responding to the bias thereon to move said sensing element relative to said bill at a predetermined speed,
(h) said inertial member being a pendulum,
(i) said inertial member being gravity-biased to rotate said sensing element.

9. A currency detector which comprises:
(a) members that coact to define a testing area,
(b) an inertial member movably mounted adjacent said testing area,
(c) a sensing element mounted on and movable with said inertial member,
(d) said inertial member being adapted to move said sensing element toward and away from a sensing position,
(e) said inertial member being biased to urge said sensing element toward a second position which is close to, but which is spaced away from, said sensing position,
(f) said sensing element permitting relatively free movement of a bill relative to it when it is in said second position, and
(g) a mechanism that moves said inertial member to move said sensing element away from said second position and to develop a progressively larger biasing force on said inertial member,
(h) said mechanism subsequently releasing said inertial member for movement toward said positions to enable said sensing element to sense a bill in said testing area,
(i) said inertial member responding to said biasing force thereon to move said sensing element relative to said bill at a predetermined speed,
(j) said inertial member thereafter urging said sensing element toward said second position so a bill in said testing area can move relatively freely relative to said sensing element.

10. A currency detector which comprises:
(a) members that coact to define a testing area,
(b) an inertial member movably mounted adjacent said testing area,
(c) a sensing element mounted on and movable with said inertial member,
(d) said inertial member being adapted to move said sensing element toward and away from a sensing position, and
(e) a mechanism that moves said inertial member to move said sensing element away from said sensing position and to develop a progressively larger biasing force on said inertial member,
(f) said mechanism subsequently releasing said inertial member for movement toward said sensing position to enable said sensing element to sense a bill in said testing area,
(g) said inertial member responding to the bias thereon to move said sensing element relative to said bill at a predetermined speed.

11. A currency detector which comprises:
(a) members that coact to define a testing area,
(b) an inertial member movably mounted adjacent said testing area,
(c) a sensing element mounted on and movable with said inertial member,
(d) said inertial member being adapted to move said sensing element toward and away from a sensing position, and
(e) a mechanism that moves said inertial member to move said sensing element away from said sensing position and to develop a progressively larger biasing force on said inertial member,
(f) said mechanism subsequently releasing said inertial member for movement toward said sensing position to enable said sensing element to sense a bill in said testing area,
(g) said inertial member responding to the bias thereon to move said sensing element relative to said bill at a predetermined speed,
(h) said sensing element being a magnetic head,
(i) said magnetic head engaging said bill whenever said bill is in said testing area and said magnetic head is in said sensing position.

12. A currency detector which comprises:
(a) members that coact to define a testing area,
(b) an inertial member movably mounted adjacent said testing area,
(c) a sensing element mounted on and movable with said inertial member,
(d) said inertial member being adapted to move said sensing element toward and away from a sensing position, and
(e) a mechanism that moves said inertial member to move said sensing element away from said sensing position and to develop a progressively larger biasing force on said inertial member, (f) said mechanism subsequently releasing said inertial member for movement toward said sensing position to enable said sensing element to sense a bill in said testing area,
(g) said inertial member responding to the bias thereon to move said sensing element relative to said bill at a predetermined speed,
(h) said inertial member being rotatable and having a vertically-adjustable axis of rotation to adjust the frictional force between said sensing element and said bill whenever said bill is in said testing area and said magnetic head is in said sensing position.

13. A currency detector which comprises:
(a) members that coact to define a testing area,
(b) an inertial member movably mounted adjacent said testing area,
(c) a sensing element mounted on and movable with said inertial member,
(d) a supporting member that is in said testing area and that is in the path of said sensing element,
(e) said supporting member being yieldable and resilient,
(f) said inertial member being adapted to move said sensing element toward and away from said supporting member, and
(g) a mechanism that moves said inertial mechanism to move said sensing element away from said supporting member,
(h) said mechanism subsequently releasing said inertial member for gravity-induced movement toward said supporting member to enable said sensing element to sense a bill in said testing area,
(i) said inertial member being a pendulum,
(j) said sensing element being a magnetic head.

14. A currency detector which comprises:
(a) members that coact to define a testing area,
(b) an inertial member movably mounted adjacent said testing area,
(c) a sensing element mounted on and movable with said inertial member,
(d) said inertial member being adapted to move said sensing element toward and away from a sensing position, and
(e) means to move said inertial member to move said sensing element away from said sensing position and to develop a progressively larger biasing force on said inertial member and to subsequently release said inertial member for movement toward said sensing position.

15. A currency detector which comprises:
(a) members that define an area in which a bill can be positioned,
(b) a thickness detector, and
(c) a mechanism that can move said thickness detector relative to a bill positioned in said area,
(d) said mechanism initially holding said thickness detector out of the path through which said bill must be moved to be positioned in said area,
(e) said thickness detector moving toward said bill after said bill has been positioned in said area,
(f) said thickness detector engaging and preventing the acceptance of, objects appreciably thicker than an authentic bill,
(g) said thickness detector being mounted on and carried by a pendulum,
(h) said pendulum being adapted to cause said thickness detector to approach said bill at a predetermined rate of speed,
(i) said thickness detector being adjustable relative to said pendulum to enable said thickness detector to reject bills having thickness greater than the desired thickness.

16. A currency detector which comprises:
(a) members that define an area in which a bill can be positioned,
(b) a thickness detector, and
(c) a mechanism that can move said thickness detector relative to a bill positioned in said area,
(d) said mechanism initially holding said thickness detector out of the path through which said bill must be moved to be positioned in said area,
(e) said thickness detector moving toward said bill after said bill has been positioned in said area,
(f) said thickness detector engaging, and preventing the acceptance of, objects appreciably thicker than an authentic bill,
(g) said thickness detector being mounted on and carried by an inertial member,
(h) said inertial member being adapted to cause said thickness detector to approach said bill at a predetermined rate of speed.

17. A currency detector which comprises:
(a) members that define an area in which a bill can be positioned,
(b) a thickness detector, and
(c) a mechanism that can move said thickness detector relative to a bill positioned in said area,
(d) said mechanism initially holding said thickness detector out of the path through which said bill must be moved to be positioned in said area,
(e) said thickness detector moving toward said bill after said bill has been positioned in said area,
(f) said thickness detector approaching and then moving away from an authentic bill during the testing of the thickness of said authentic bill,
(g) said thickness detector approaching, engaging, and being held by, and thereby preventing the acceptance of, objects appreciably thicker than an authentic bill.

18. A currency detector which comprises:
(a) a lower section and an upper section that coact to define an entry slot,
(b) said entry slot being dimensioned to permit an authentic bill of the proper denomination to pass through it,
(c) a platform on one of said sections that is adjacent said entry slot and that can receive the leading edge of a bill to be introduced into said entry slot,
(d) said platform being coextensive with the front of said slot and extending forwardly from said entry slot,
(e) an extension on said platform that is coextensive with the side of said entry slot and that extends laterally outwardly from said side of said entry slot,
(f) a guide that is intermediate said platform and said extension and that is normal to said front of said slot,
(g) said guide helping aline a bill for movement into said entry slot,
(h) a bill-advancing mechanism to grip a bill introduced into said entry slot and to move said bill into a testing area within said currency detector, and
(i) a testing device to test bills moved into said testing area,
(j) the other of said sections having walls that are generally normal to said entry slot and that subtend an angle with an apex that is generally normal to said entry slot,
(k) said walls making said entry slot a corner slot so an inserted bill can be presented to said entry slot in such a way that it can initially have point contact rather than line contact with said entry slot,
(l) whereby wrinkles in the leading edge of said bill can be presented to said corner slot consecutively rather than simultaneously, and
(m) whereby the leading edge of said bill will have lateral and longitudinal components of movement relative to said entry slot as said bill is moved into said entry slot.

19. A currency detector which comprises:
(a) a lower section and an upper section that coact to define an entry slot,
(b) said entry slot being dimensioned to permit an authentic bill of the proper denomination to pass through it,
(c) a platform on one of said sections that is adjacent said entry slot and that can receive the leading edge of a bill to be introduced into said entry slot,
(d) said platform being coextensive with the front of said slot and extending forwardly from said entry slot,
(e) an extension on said platform that is coextensive with the side of said entry slot and that extends laterally outwardly from said entry slot,
(f) a bill-advancing mechanism to grip a bill introduced into said entry slot and to move said bill into a testing area within said currency detector, and
(g) a testing device to test bills moved into said testing area,
(h) the other of said sections having walls that are generally normal to said entry slot and that subtend an angle with an apex that is generally normal to said entry slot,
(i) said walls making said entry slot a corner slot so an inserted bill can be presented to said entry slot in such a way that it can initially have point contact rather than line contact with said entry slot,
(j) whereby wrinkles in the leading edge of said bill can be presented to said corner slot consecutively rather than simultaneously, and
(k) whereby the leading edge of said bill will have lateral and longitudinal components of movement relative to said entry slot as said bill is moved into said entry slot.

20. A currency detector which comprises:
(a) a lower section and an upper section that coact to define an entry slot,
(b) said entry slot being dimensioned to permit an authentic bill of the proper denomination to pass through it,
(c) a bill-advancing mechanism to grip a bill introduced into said entry slot and to move said bill into a testing area within said currency detector, and
(d) a testing device to test bills moved into said testing area,
(e) one of said sections having walls that are generally normal to said entry slot and that subtend an angle with an apex that is generally normal to said entry slot,
(f) said walls making said entry slot a corner slot so an inserted bill can be presented to said entry slot in such a way that it can initially have point contact rather than line contact with said entry slot,
(g) whereby wrinkles in the leading edge of said bill can be presented to said corner slot consecutively rather than simultaneously, and
(h) whereby the leading edge of said bill will have lateral and longitudinal components of movement relative to said entry slot as said bill is moved into said entry slot.

21. A currency detector which comprises:
(a) a lower section and an upper section that coact to define an entry slot,
(b) said entry slot being dimensioned to permit an authentic bill of the proper denomination to pass through it,
(c) a platform on one of said sections that is adjacent said entry slot and that can receive the leading edge of a bill to be introduced into said entry slot,
(d) said platform being coextensive with the front of said slot and extending forwardly from said entry slot,
(e) the other of said sections having an edge that is rounded and that can guide the leading edge of said bill toward said platform as said bill is being introduced into said entry slot,
(f) a bill-advancing mechanism to grip a bill introduced into said entry slot and to move said bill into a testing area within said currency detector, and
(g) a testing device to test bills moved into said testing area,
(h) said other of said sections having walls that are generally normal to said entry slot and that subtend an angle with an apex that is generally normal to said entry slot,
(i) said walls making said entry slot a corner slot so an inserted bill can be presented to said entry slot in such a way that it can initially have point contact rather than line contact with said entry slot,
(j) whereby wrinkles in the leading edge of said bill can be presented to said corner slot consecutively rather than simultaneously, and
(k) whereby the leading edge of said bill will have lateral and longitudinal components of movement relative to said entry slot as said bill is moved into said entry slot.

22. A currency detector which comprises:
(a) members that define an area in which a bill can be positioned,
(b) a supporting member that is mounted for movement relative to said area,
(c) a thickness detector mounted on and movable with said supporting member,
(d) a sensing element mounted on and movable with said supporting member, and
(e) a circuit that can respond to said sensing element to indicate whether a bill positioned in said area is acceptable or unacceptable,
(f) said circuit indicating that a bill positioned in said area is unacceptable if said supporting member is slowed unduly,
(g) said thickness detector responding to objects appreciably thicker than an authentic bill to unduly slow said supporting member,
(h) said supporting member being a pendulum,
(i) said sensing element being a magnetic head,
(j) said thickness detector being mounted ahead of said sensing element so said thickness detector will move into register with said bill before said sensing element moves into register with said bill,
(k) said thickness detector being adjustable relative to said supporting member to determine the maximum thickness of acceptable bills.

23. A currency detector which comprises:
(a) members that define an area in which a bill can be positioned,
(b) a supporting member that is mounted for movement relative to said area,
(c) a thickness detector mounted on and movable with said supporting member,
(d) a sensing element mounted on and movable with said supporting member, and
(e) a circuit that can respond to said sensing element to indicate whether a bill positioned in said area is acceptable or unacceptable,
(f) said circuit indicating that a bill positioned in said area is unacceptable if said supporting member is slowed unduly,
(g) said thickness detector responding to objects appreciably thicker than an authentic bill to unduly slow said supporting member,
(h) said sensing element being a magnetic head,
(i) said thickness detector being mounted ahead of said sensing element so said thickness detector will move into register with said bill before said sensing element moves into register with said bill.

24. A currency detector which comprises:
(a) members that define an area in which a bill can be positioned, (b) a supporting member that is mounted for movement relative to said area,
(c) a thickness detector mounted on and movable with said supporting member,
(d) a sensing element mounted on and movable with said supporting member, and
(e) a circuit that can respond to said sensing element to indicate whether a bill positioned in said area is acceptable or unacceptable,
(f) said circuit indicating that a bill positioned in said area is unacceptable if said supporting member is slowed unduly,
(g) said thickness detector responding to objects appreciably thicker than an authentic bill to unduly slow said supporting member.

25. A currency detector which comprises:
(a) members that define an area in which a bill can be positioned,
(b) a thickness detector, and
(c) a sensing element,
(d) said thickness detector and said sensing element being simultaneously movable relative to a bill positioned in said area to enable said sensing element to sense said bill and to enable said thickness detector to detect objects which are appreciably thicker than an authentic bill,
(e) said thickness detector engaging and being retarded by said objects which are appreciably thicker than an authentic bill and thereby causing retardation of the movement of said sensing element.

26. A currency detector which comprises:
(a) a lower section and an upper section that coact to define an entry slot,
(b) said entry slot being dimensioned to permit an authentic bill to pass through it,
(c) said upper section having a downwardly-directed offset adjacent said entry slot,
(d) said lower section having an upwardly-directed offset adjacent said entry slot,
(e) said offset on said upper section being disposed outwardly of said offset on said lower section,
(f) whereby said offsets define a passage for bills which inclines upwardly and inwardly into said currency detector,
(g) said offset on said upper section being L-shaped in plan,
(h) said offset on said lower section being L-shaped in plan,
(i) said offsets on said upper and lower sections coacting to block viewing of the operation of said currency detector,
(j) the long arms of said offsets being adapted to smooth out wrinkles which extend transversely of a bill being introduced into said entry slot,
(k) said offset on said lower section tending to keep liquids from flowing into said currency detector,
(l) a platform on said lower section that extends outwardly from the long arm of said offset on said lower section, and
(m) an extension of said platform that is on said lower section and that extends laterally outwardly from the short arm of said offset on said lower section.

27. A currency detector which comprises:
(a) a lower section and an upper section that coact to define an entry slot,
(b) said entry slot being dimensioned to permit an authentic bill to pass through it,
(c) said upper section having a downwardly-directed offset adjacent said entry slot,
(d) said lower section having an upwardly-directed offset adjacent said entry slot,
(e) said offset on said upper section being disposed outwardly of said offset on said lower section,
(f) whereby said offsets define a passage for bills which inclines upwardly and inwardly into said currency detector,
(g) said offsets on said upper and lower sections coacting to block viewing of the operation of said currency detector,
(h) said offset on said lower section tending to keep liquids from flowing into said currency detector,
(i) a platform on said lower section that extends outwardly from said entry slot, and
(j) an extension of said platform that is on said lower section and that extends laterally outwardly from said entry slot.

28. A currency detector which comprises:
(a) a lower section and an upper section that coact to define an entry slot,
(b) said entry slot being dimensioned to permit an authentic bill to pass through it,
(c) said upper section having a downwardly-directed offset adjacent said entry slot,
(d) said lower section having an upwardly-directed offset adjacent said entry slot,
(e) said offset on said upper section being disposed outwardly of said offset on said lower section,
(f) whereby said offsets define a passage for bills which inclines upwardly and inwardly into said currency detector,
(g) said offsets on said upper and lower sections coacting to block viewing of the operation of said currency detector, and
(h) said offset on said lower section tending to keep liquids from flowing into said currency detector.

29. A currency detector which comprises:
(a) a lower section and an upper section that coact to define an entry slot,
(b) said entry slot being dimensioned to permit an authentic bill to pass through it,
(c) said upper section having a downwardly-directed offset adjacent said entry slot,
(d) said lower section having an upwardly-directed offset adjacent said entry slot,
(e) said offsets coacting to define a passage which inclines into said currency detector, and
(f) said offsets being adapted to smooth out wrinkles which extend transversely of a bill being introduced into said entry slot.

30. A currency detector which comprises:
(a) a lower section and an upper section that coact to define an entry slot,
(b) said entry slot being dimensioned to permit an authentic bill to pass through it,
(c) said upper section having a downwardly-directed offset adjacent said entry slot,
(d) said lower section having an upwardly-directed offset adjacent said entry slot,
(e) said offsets coacting to define a passage which inclines into said currency detector,
(f) said offsets being adapted to smooth out wrinkles which extend transversely of a bill being introduced into said entry slot,
(g) said offset on said upper section being L-shaped in plan,
(h) said offset on said lower section being L-shaped in plan,
(i) a platform on said lower section that extends outwardly from the long arm of said offset on said lower section, and
(j) an extension of said platform that is on said lower section and that extends laterally outwardly from the short arm of said offset on said lower section.

31. A currency detector which comprises:
(a) members that define a testing area,
(b) rollers adjacent one side of said testing area that define points of tangency and that can grip a bill and move said bill into said testing area, (c) further rollers adjacent the opposite side of said testing area that can grip said bill and move said bill toward a cash box,
(d) additional rollers that are adjacent said further rollers but that are displaced from said testing area and that can grip said bill after it has started moving from said testing area toward the exit of said currency detector,
(e) a bill-blocking member that is mounted adjacent said testing area and that has fingers selectively extendable into said testing area,
(f) some of said fingers on said bill-blocking member being adjacent the first said rollers and being selectively held out of said testing area to permit a bill to be moved into and withdrawn from said testing area and being selectively extendable into said testing area to block withdrawal of said bill from said testing area,
(g) other of said fingers on said bill-blocking member being adjacent said further rollers and being selectively extendable into said testing area to block movement of said bill toward said exit of said currency detector and being selectively held out of said testing area to permit movement of said bill toward said exit of said currency detector,
(h) said some and said other of said fingers on said bill-blocking member being spaced apart distances greater than the width of a bill intended to be accepted by said currency detector,
(i) said some and said other of said fingers on said bill-blocking member being arranged and dimensioned so said some fingers are held out of said testing area whenever said other fingers are extended into said testing area and so said other fingers are held out of said testing area whenever said some fingers are extended into said testing area,
(j) said other fingers being spaced from said points of tangency of the first said rollers distances just greater than the width of a bill intended to be accepted by said currency detector,
(k) said bill-blocking member initially having said other fingers thereof extending into said testing area,
(l) a testing device adjacent said testing area,
(m) an element that can repsond to said testing device to shift said bill-blocking member and thereby extend said some fingers into said testing area while moving said other fingers out of said testing area,
(n) the first said rollers initially being spaced apart and said further rollers initially being spaced apart,
(o) the first said rollers thereafter moving toward each other to grip an inserted bill,
(p) said further rollers subsequently moving toward each other to grip said bill,
(q) said further rollers and said additional rollers coacting to move acceptable bills toward said exit of said currency detector,
(r) the first said and said further rollers coacting to move unacceptable bills back to the patrons,
(s) the first said and said further rollers being selectively rotatable in opposite directions.

32. A currency detector which comprises:
(a) members that define an area in which a bill can be positioned,
(b) a supporting member movably mounted adjacent said area and initially spaced from said area, and
(c) a magnetic head mounted on and movable with said supporting member,
(d) said supporting member moving said magnetic head appreciable distance both laterally and longitudinally of said area as it moves said magnetic head toward and away from a predetermined portion of said area and initially holding said magnetic head away from said portion of said area to permit free relative movement of a bill and said magnetic head,
(e) said supporting member causing said magnetic head to be spaced above and out of engagement with a portion of a bill positioned in said area as said supporting member moves said magnetic head toward said portion of said area and thereafter causing said magnetic head to move appreciable distances both laterally and longitudinally of said portion of said bill as it causes said magnetic head to engage said portion of said bill,
(f) whereby said magnetic head can approach, engage and sense a bill in one continuous movement and at such a shallow angle that it will not wrinkle or crumple said bill.

33. A currency detector which comprises:
(a) members that define an area in which a bill can be positioned,
(b) a supporting member movably mounted adjacent said area and initially spaced from said area, and
(c) a magnetic head mounted on and movable with said supporting member,
(d) said supporting member moving said magnetic head appreciable distances both laterally and longitudinally of said area as it moves said magnetic head toward and away from a predetermined portion of said area and initially holding said magnetic head away from said portion of said area to permit free relative movement of a bill and said magnetic head,
(e) said supporting member causing said magnetic head to be spaced above and out of engagement with a portion of a bill positioned in said area as said supporting member moves said magnetic head toward said portion of said area and thereafter causing said magnetic head to move appreciable distances both laterally and longitudinally of said portion of said bill as it causes said magnetic head to engage said portion of said bill,
(f) whereby said magnetic head can approach, engage and sense a bill in one continuous movement and at such a shallow angle that it will not wrinkle or crumple said bill,
(g) said bill being movable into said area while said supporting member is spaced from said area and being stationary while said supporting member moves said magnetic head toward said portion of said area.

34. A currency detector which comprises:
(a) members that define an area in which a bill can be positioned,
(b) a supporting member movably mounted adjacent said area and initially spaced from said area, and
(c) a magnetic head mounted on and movable with said supporting member,
(d) said supporting member moving said magnetic head appreciable distances both laterally and longitudinally of said area as it moves said magnetic head toward and away from a predetermined portion of said area and initially holding said magnetic head away from said portion of said area to permit free relative movement of a bill and said magnetic head,
(e) said supporting member causing said magnetic head to be spaced above and out of engagement with a portion of a bill positioned in said area as said supporting member moves said magnetic head toward said portion of said area and thereafter causing said magnetic head to move appreciable distances both laterally and longitudinally of said portion of said bill as it causes said magnetic head to engage said portion of said bill,
(f) whereby said magnetic head can approach, engage and sense a bill in one continuous movement and at such a shallow angle that it will not wrinkle or crumple said bill,
(g) said supporting member moving said magnetic head along a predetermined path in one direction as it moves said magnetic head toward said portion of said area and thereafter moving said magnetic head in the opposite direction along said predetermined path as it moves said magnetic head away from said portion of said area.

35. A currency detector which comprises:
(a) members that define a testing area,
(b) rollers adjacent one side of said testing area that define points of tangency and that can grip a bill and move said bill into said testing area,
(c) a bill-blocking member that is mounted adjacent said testing area and that has fingers selectively extendable into said testing area, and
(d) said fingers being spaced from said points of tangency distances just greater than the width of a bill intended to be accepted by said currency detector,
(e) whereby said rollers and said bill-blocking member can coact to cause bills, that are skewed as they pass between said rollers, to aline the leading edges thereof with said fingers.

36. A currency detector which comprises:
(a) members that define a testing area,
(b) rollers adjacent one side of said testing area that define points of tangency and that can grip a bill and move said bill into said testing area,
(c) further rollers adjacent the opposite side of said testing area that can grip said bill and move said bill toward the exit of said currency detector,
(d) the first said rollers initially being spaced apart and said further rollers initially being spaced apart,
(e) the first said rollers thereafter moving toward each other to grip an inserted bill,
(f) said further rollers subsequently moving toward each other to grip said bill,
(g) the first said and said further rollers being selectively rotatable in opposite directions.

37. A currency detector which comprises:
(a) members that define a testing area,
(b) a bill-blocking member that is mounted adjacent said testing area and that has fingers selectively extendable into said testing area,
(c) some of said fingers on said bill-blocking member being adjacent the inlet to said testing area and being selectively held out of said testing area to permit a bill to be moved into and withdrawn from said testing area and being selectively extendable into said testing area to block withdrawal of said bill from said testing area,
(d) other of said fingers on said bill-blocking member being adjacent the outlet of said testing area and being selectively extendable into said testing area to block movement of said bill toward the exit of said currency detector and being selectively held out of said testing area to permit movement of said bill toward said exit of said currency detector,
(e) said some and said other of said fingers on said bill-blocking member being spaced apart distances greater than the width of a bill intended to be accepted by said currency detector,
(f) said some and said other of said fingers on said bill-blocking member being arranged and dimensioned so said some fingers are held out of said testing area whenever said other fingers are extended into said testing area and so said other fingers are held out of said testing area whenever said some fingers are extended into said testing area,
(g) said bill-blocking member initially having said other fingers thereof extending into said testing area,
(h) a testing device adjacent said testing area, and
(i) an element that can respond to said testing device to shift said bill-blocking member and thereby extend said some fingers into said testing area while moving said other fingers out of said testing area.

38. A currency detector which comprises:
(a) members that define a testing area,
(b) a bill-blocking member that is mounted adjacent said testing area and that has fingers selectively extendable into said testing area,
(c) some of said fingers on said bill-blocking member being adjacent the inlet to said testing area and being selectively held out of said testing area to permit a bill to be moved into and withdrawn from said testing area and being selectively ertendable into said testing area to block withdrawal of said bill from said testing area,
(d) other of said fingers on said bill-blocking member being adjacent the outlet of said testing area and being selectively extendable into said testing area to block movement of said bill toward the exit of said currency detector and being selectively held out of said testing area to permit movement of said bill toward said exit of said currency detector,
(e) said some and said other of said fingers on said bill-blocking member being spaced apart distances greater than the width of a bill intended to be accepted by said currency detector,
(f) said some and said other of said fingers on said bill-blocking member being arranged and dimensioned so said some fingers are held out of said testing area whenever said other fingers are extended into said testing area and so said other fingers are held out of said testing area whenever said some fingers are extended into said testing area,
(g) said bill-blocking member initially having said other fingers thereof extending into said testing area,
(h) a testing device adjacent said testing area, and
(i) an element that can respond to said testing device to shift said bill-blocking member and thereby extend said some fingers into said testing area while moving said other fingers out of said testing area,
(j) said some fingers inclining toward said outlet of said testing area to enable said some fingers to respond to withdrawing forces applied to said bill to urge said some fingers more fully into extended position.

39. A currency detector which comprises:
(a) members that define a testing area,
(b) a bill-sensing switch adjacent the inlet of said testing area that is adapted to be closed by a bill as that bill is moved into said testing area, that is adapted to be held closed as long as said bill is in said testing area, and that is adapted to re-open as said bill is moved through the outlet of said testing area,
(c) a second bill-sensing switch adjacent said outlet of said testing area that is adapted to be closed by a bill as said bill moves outwardly through said outlet of said testing area,
(d) an actuatable device,
(e) bill-gripping members that can grip a bill and move said bill into said testing area,
(f) a source of power for said bill-gripping members, and
(g) a circuit for said currency detector,
(h) said circuit having a sub-circuit that can actuate said source of power only if the first said bill-sensing switch is closed,
(i) said circuit having a second sub-circuit that can actuate said actuatable device only if the first said bill-sensing switch is re-opened while said second bill-sensing switch is closed,
(j) whereby said currency detector can actuate said actuatable device if a bill is moved to close the first said bill-sensing switch, to close said second bill-sensing switch, and then to re-open the first said bill-sensing switch.

40. A currency detector which comprises:
(a) members that define a testing area,
(b) a bill-sensing switch adjacent the outlet of said testing area, and
(c) an actuator for said switch,
(d) said actuator including a lever that normally is disposed in the path which a bill must follow as it moves outwardly through said outlet of said testing area, (e) said actuator also including a second lever that has a portion thereof disposed forwardly of the first said lever and normally disposed out of the path of said bill, (f) said actuator additionally including a spring that biases said levers for conjoint rotation as a unit, (g) the first said lever receiving the leading edge of a bill moving through said outlet of said testing area and responding to that leading edge to rotate, (h) said spring tending to cause said second lever to rotate as a unit with the first said lever but said portion of said second lever engaging said bill and being held by said bill, (i) the first said lever continuing to rotate and said portion of said second lever continuing to be held by said bill and said spring yielding to permit movement of the first said lever relative to said second lever as said bill moves outwardly through said outlet of said testing area, (j) said second lever responding to said spring, after said bill has moved outwardly beyond said portion of said second lever, to rotate toward the first said lever while the first said lever is still held by said bill and thereby actuate said switch, (k) said portion of said second lever thereafter moving into the path, through which said bill moved, to block any effort by a patron to retract said bill.

41. A currency detector which comprises:

(a) members that define a testing area, (b) a bill-sensing switch adjacent said testing area, and (c) an actuator for said switch, (d) said actuator including a lever that normally is disposed in the path which a bill must follow as it moves outwardly through said outlet of said testing area, (e) said actuator also including a second lever that has a portion thereof disposed forwardly of the first said lever and normally disposed out of the path of said bill, (f) said levers normally moving as a unit, (g) the first said lever receiving the leading edge of a bill moving through said testing area and responding to that leading edge to move, (h) said second lever tending to move as a unit with the first said lever but said portion of said second lever engaging said bill and being held by said bill, (i) the first said lever continuing to move and said portion of said second lever continuing to be held by said bill as said bill moves through said testing area, (j) said second lever, after said bill has moved outwardly beyond said portion of said second lever, moving toward the first said lever while the first said lever is still held by said bill and thereby actuating said switch.

42. A currency detector which comprises:

(a) members that define a testing area, (b) a bill-sensing switch adjacent said testing area, and (c) an actuator for said switch, (d) said actuator including two levers that must both be moved to enable said actuator to actuate said switch, (e) one of said levers being in the path of, and being movable by, a bill, (f) the other of said levers being unable to move until said bill has passed a predetermined point, (g) whereby said switch can be actuated only if said bill moves in a predetermined direction and for a predetermined distance.

43. A currency detector which is adapted to be mounted in an enclosed device that has a wall with an opening therein and which comprises:

(a) a lower section and an upper section that normally coact to define a testing area, (b) said upper section normally being adjacent and substantially closing said opening in said wall, so said upper section and said wall normally prevent access to the interior of said device, (c) said upper section being pivoted to said lower section, (d) said upper section being rotatable relative to said lower section to simultaneously open up said testing area and to expose said opened up testing area to said opening in said wall, and (e) a lock and latch that normally hold said upper section adjacent said lower section.

44. A currency detector which is adapted to be mounted in an enclosed device that has a wall with an opening therein and which comprises:

(a) a lower section and an upper section that normally coact to define a testing area, (b) said upper section normally being adjacent and substantially closing said opening in said wall, so said upper section and said wall normally prevent access to the interior of said device, (c) said upper section being movable relative to said lower section and relative to said wall to provide free access through said opening to said testing area, and (d) a lock that normally prevents movement of said upper section relative to said lower section.

45. A currency detector which comprises:

(a) members that define a testing area, (b) bill-gripping members adjacent the inlet of said testing area, (c) further bill-gripping members disposed inwardly of said inlet of said testing area, and (d) a bill-sensing switch having the actuator thereof intermediate the first said and said further bill-gripping members, (e) the first said and said further bill-gripping members normally being spaced apart to facilitate the introduction of a bill into said testing area, (f) the first said bill-gripping members subsequently being moved toward each other to grip a bill in said testing area, (g) said further bill-gripping members thereafter being moved toward each other to grip said bill in said testing area, (h) said actuator for said bill-sensing switch coacting with the first said bill-gripping members to hold said bill prior to the time said further bill-gripping members engage said bill.

46. A currency detector which comprises:

(a) a lower section and an upper section that coact to define an entry slot, (b) said entry slot being dimensioned to permit an authentic bill to pass through it, (c) one of said sections having an offset that can smooth out wrinkles which extend transversely of a bill being introduced into said entry slot, and (d) a sensing element within said currency detector which moves longitudinally of bills introduced into said entry slot, (e) said longitudinal movement of said sensing element coacting with said sensing element in the smoothing out of transversely-extending wrinkles in bills to facilitate accurate sensing of said bills.

47. A currency detector which comprises:

(a) members that define a space in which a bill can be positioned, (b) a magnetic head that can define a sensing area within said space, (c) a bill-sensing switch with an actuator that is in alinement with said sensing area, (d) a photocell that is in alinement with said sensing area, and (e) means to effect relative movement between each bill and said actuator of said bill-sensing switch, (f) whereby a section of each bill introduced into said space will be sensed by said magnetic head and said photocell and will subsequently be engaged by the actuator for said bill-sensing switch as said means provides said relative movement between each bill and said actuator of said bill-sensing switch.

48. A currency detector which comprises:

(a) members that define a space in which a bill can be positioned, (b) a sensing-element that can define a sensing area within said space, (c) a bill-sensing switch with an actuator that is in alinement with said sensing area, and (d) means to effect relative movement between each bill and said actuator of said bill-sensing switch, (e) whereby a section of each bill introduced into said space will be sensed by said sensing element and will subsequently be engaged by the actuator for said bill-sensing switch as said means provides said relative movement between each bill and said actuator of said bill-sensing switch.

References Cited by the Examiner

UNITED STATES PATENTS

| | | | |
|---|---|---|---|
| 2,951,164 | 8/1960 | Timms | 194—4 |
| 2,995,976 | 8/1961 | Weingart | 194—4 |
| 3,080,053 | 3/1963 | Bicknell | 209—88 |
| 3,093,729 | 6/1963 | Price et al. | 235—61.11 |
| 3,132,737 | 5/1964 | Moon et al. | 194—4 X |
| 3,153,483 | 10/1964 | Simjian | 194—4 X |
| 3,180,491 | 4/1965 | Danko | 194—4 X |

FOREIGN PATENTS

| | | |
|---|---|---|
| 1,151,593 | 1/1958 | France. |

M. HENSON WOOD, Jr., *Primary Examiner.*

A. N. KNOWLES, *Assistant Examiner.*